United States Patent
Herzog et al.

(10) Patent No.: US 9,676,397 B2
(45) Date of Patent: Jun. 13, 2017

(54) CLAMP ASSEMBLY

(71) Applicant: Herzog Contracting Corp., St. Joseph, MO (US)

(72) Inventors: Stanley M. Herzog, St. Joseph, MO (US); Ivan E. Bounds, St. Joseph, MO (US); Steven R. Walton, Olathe, KS (US); Lawrence E. Guerra, Mission, KS (US)

(73) Assignee: HERZOG CONTRACTING CORP., St. Joseph, MO (US)

( * ) Notice: Subject to any disclaimer, the term of this patent is extended or adjusted under 35 U.S.C. 154(b) by 18 days.

(21) Appl. No.: 14/204,853

(22) Filed: Mar. 11, 2014

(65) Prior Publication Data

US 2014/0255119 A1    Sep. 11, 2014

Related U.S. Application Data

(63) Continuation-in-part of application No. 13/401,128, filed on Feb. 21, 2012, now abandoned, which is a
(Continued)

(51) Int. Cl.
*B60P 7/08* (2006.01)
*B61D 3/16* (2006.01)
(Continued)

(52) U.S. Cl.
CPC ............ *B61D 3/16* (2013.01); *B60P 3/40* (2013.01); *B61D 45/003* (2013.01); *E01B 29/17* (2013.01); *Y10T 403/4674* (2015.01)

(58) Field of Classification Search
CPC ......... B61D 3/16; B61D 45/003; E01B 29/16; B60P 3/40; Y10T 403/4674

USPC ............ 410/31, 32, 33, 34, 35, 80; 239/151, 239/336, 317, 338, 333, 354, 324, 327 R, 239/328, 332, 341, 361–365; 104/2, 3, 5, 104/7.1, 7.2, 15; 188/43–44
See application file for complete search history.

(56) References Cited

U.S. PATENT DOCUMENTS

| 1,126,517 | A | * | 1/1915 | Liebmann | ............... E01B 9/66 |
| | | | | | 238/281 |
| 1,704,269 | A | | 3/1929 | Wattmann | |

(Continued)

FOREIGN PATENT DOCUMENTS

| CA | 2198784 | 5/2005 |
| CA | 2577357 A1 | 3/2006 |

(Continued)

OTHER PUBLICATIONS

International Search Report mailed Jul. 15, 2014 for corresponding International Application No. PCT/US2014/023656.

(Continued)

*Primary Examiner* — Stephen Gordon
(74) *Attorney, Agent, or Firm* — Erickson Kernell IP, LLC

(57) ABSTRACT

A clamp assembly for supporting multiple elongate rails in a rail tie-down car utilizes spring-loaded, hydraulically actuated clamp assemblies to clamp individual rails to the tie-down car. Each clamp assembly incorporates at least two clamp members which act opposite one another to prevent the rail secured in place by the clamps from sliding in either longitudinal direction.

12 Claims, 47 Drawing Sheets

Related U.S. Application Data continuation-in-part of application No. 13/004,117, filed on Jan. 11, 2011, now Pat. No. 8,590,454, which is a continuation-in-part of application No. 12/545,632, filed on Aug. 21, 2009, now Pat. No. 8,181,577.

(60) Provisional application No. 61/776,407, filed on Mar. 11, 2013.

(51) Int. Cl.
 B60P 3/40 (2006.01)
 B61D 45/00 (2006.01)
 E01B 29/17 (2006.01)

(56) References Cited

U.S. PATENT DOCUMENTS

| | | |
|---|---|---|
| 2,944,492 A | 7/1960 | Clejan |
| 2,951,601 A | 9/1960 | Castoe |
| 3,288,082 A | 11/1966 | Brosnan |
| 3,366,258 A | 1/1968 | Cox |
| 3,376,988 A | 4/1968 | Klosk |
| 3,465,687 A | 9/1969 | Kerns |
| 3,635,164 A | 1/1972 | Patton |
| 3,908,842 A | 9/1975 | Place |
| 4,077,590 A | 3/1978 | Shorey |
| 4,414,454 A | 11/1983 | Zollinger |
| 4,478,155 A | 10/1984 | Cena et al. |
| 4,947,760 A | 8/1990 | Dawson et al. |
| 5,129,327 A | 7/1992 | Snead |
| 5,195,436 A | 3/1993 | Valditerra |
| 5,197,389 A | 3/1993 | Glomski et al. |
| 5,297,482 A | 3/1994 | Cleveland |
| 5,630,365 A | 5/1997 | Hertelendi |
| 6,315,508 B1 | 11/2001 | Nadon |
| 6,695,553 B1 | 2/2004 | Galbreath et al. |
| 7,255,047 B1 | 8/2007 | Coslovi et al. |
| 7,350,467 B2 | 4/2008 | Green et al. |
| 7,370,586 B2 | 5/2008 | McHale et al. |
| 7,780,383 B2* | 8/2010 | Brescia ............... B60P 7/13 410/80 |
| 8,181,577 B2* | 5/2012 | Bounds ............... E01B 29/17 104/2 |
| 8,419,327 B2 | 4/2013 | Muehlbacher |
| 8,590,454 B2* | 11/2013 | Bounds ............... B66C 1/64 104/5 |
| 2003/0205162 A1 | 11/2003 | Herzog et al. |
| 2004/0261650 A1 | 12/2004 | Al-Kaabi et al. |
| 2006/0219123 A1 | 10/2006 | Theurer |
| 2008/0170925 A1 | 7/2008 | Marmur |
| 2008/0232917 A1 | 9/2008 | Hertelendi |
| 2009/0183956 A1 | 7/2009 | Berliant |
| 2011/0129314 A1 | 6/2011 | Bounds |
| 2016/0096533 A1 | 4/2016 | Traintinger et al. |

FOREIGN PATENT DOCUMENTS

| | | |
|---|---|---|
| DE | 3522918 | 4/1986 |
| DE | 4103255 A1 | 6/1992 |
| DE | 29704533 U1 | 6/1997 |
| EP | 0044819 | 1/1982 |
| EP | 0621372 A1 | 10/1994 |
| GB | 2159558 | 12/1985 |
| GB | 2329627 A | 3/1999 |
| WO | 2006023804 A2 | 3/2006 |
| WO | 2011063491 A1 | 6/2011 |

OTHER PUBLICATIONS

Written Opinion of the International Searching Authority mailed Jul. 15, 2014 for corresponding International Application No. PCT/US2014/023656.

\* cited by examiner

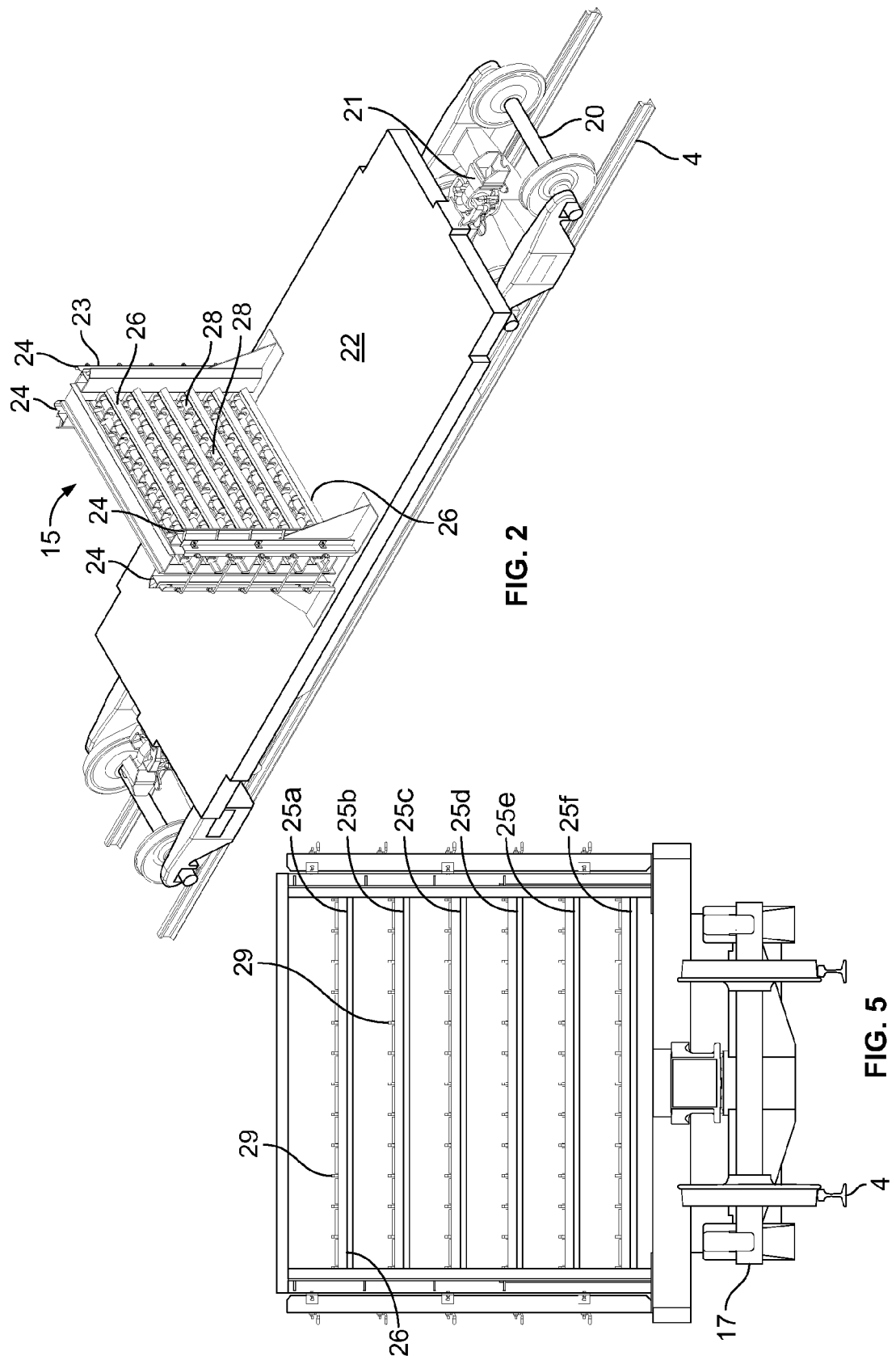

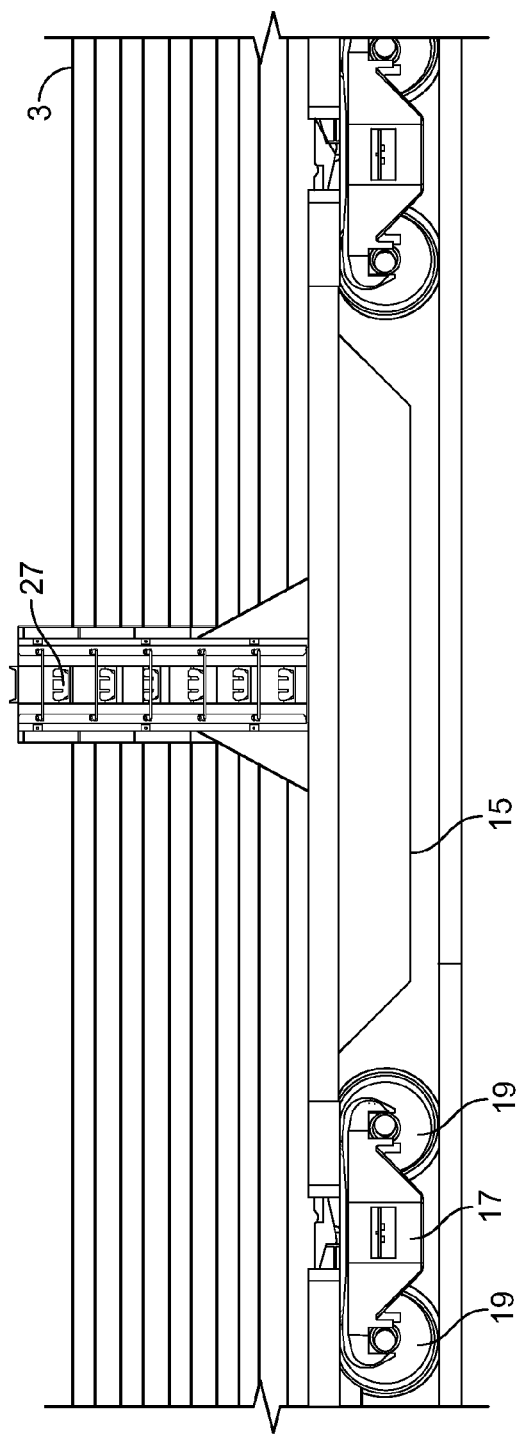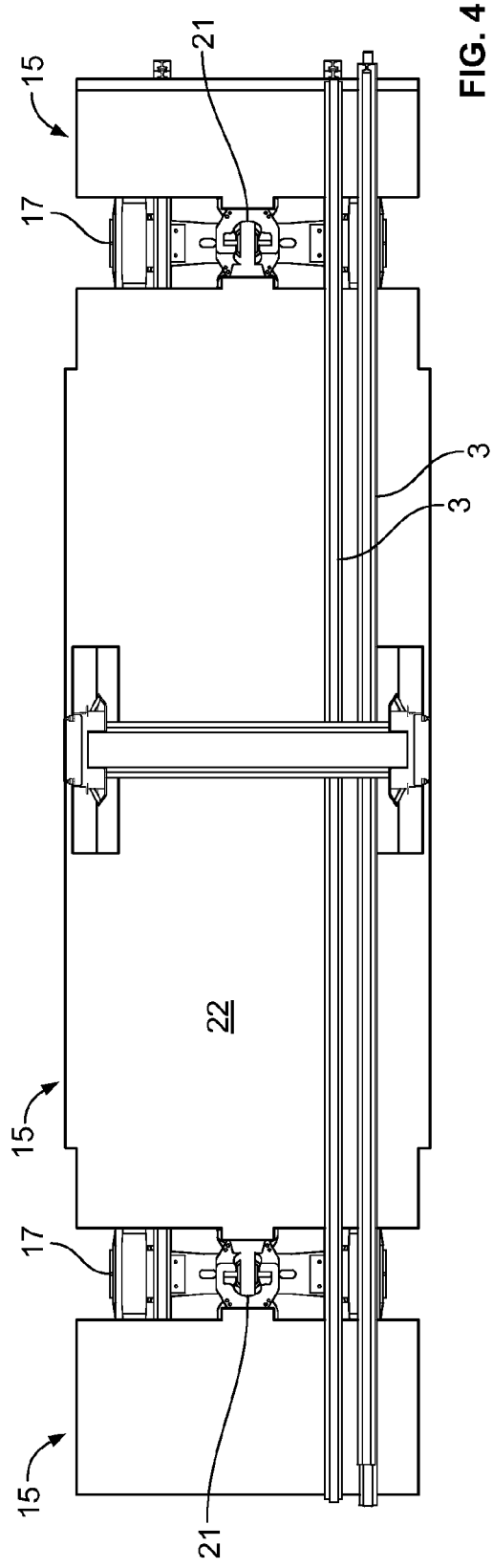

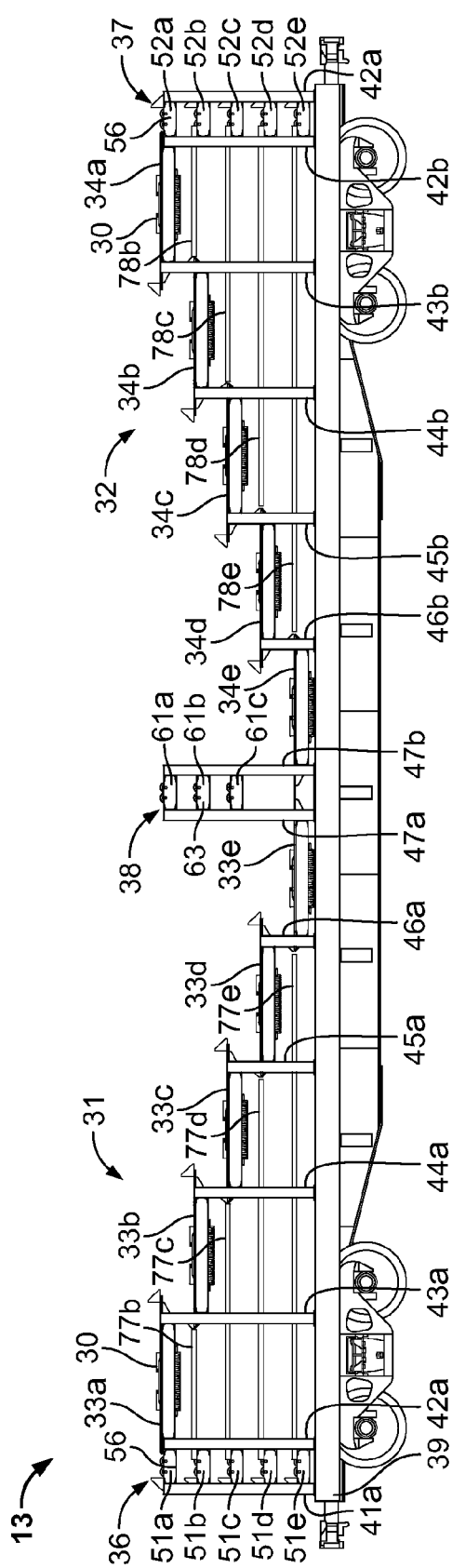
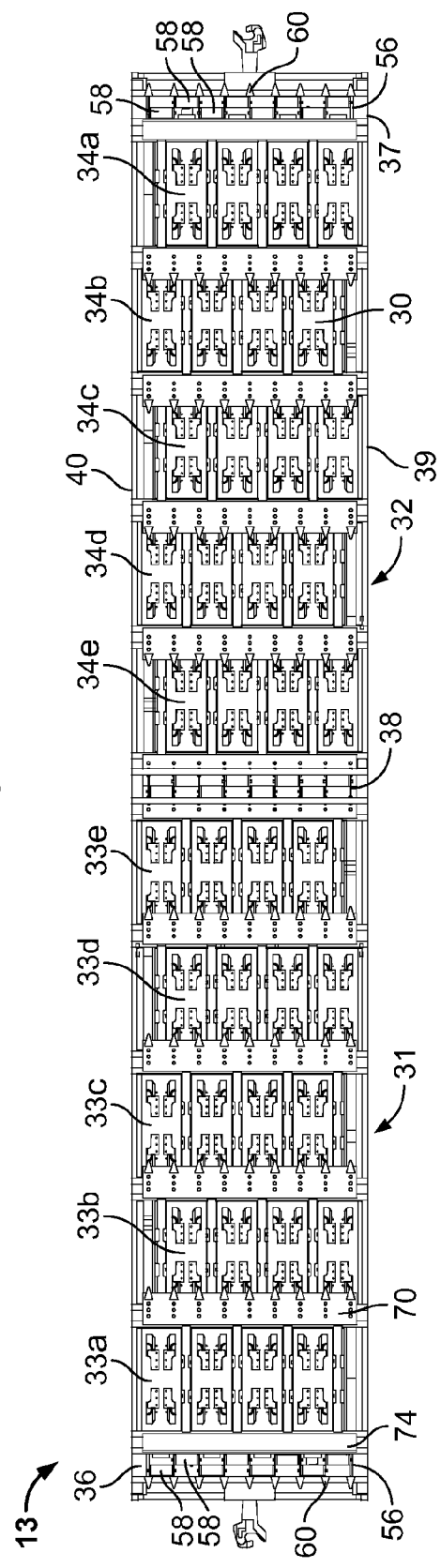
FIG. 7
FIG. 8

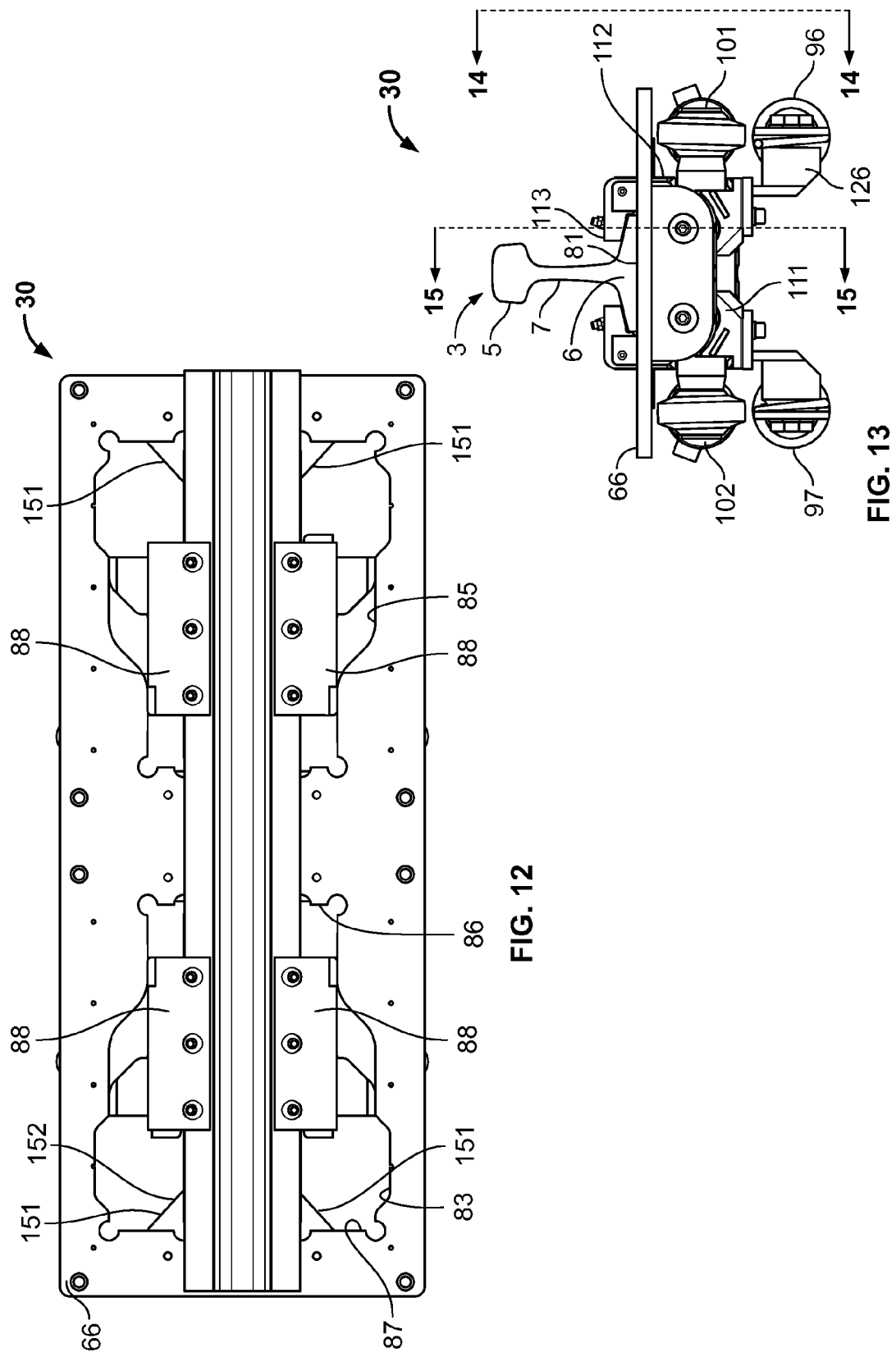

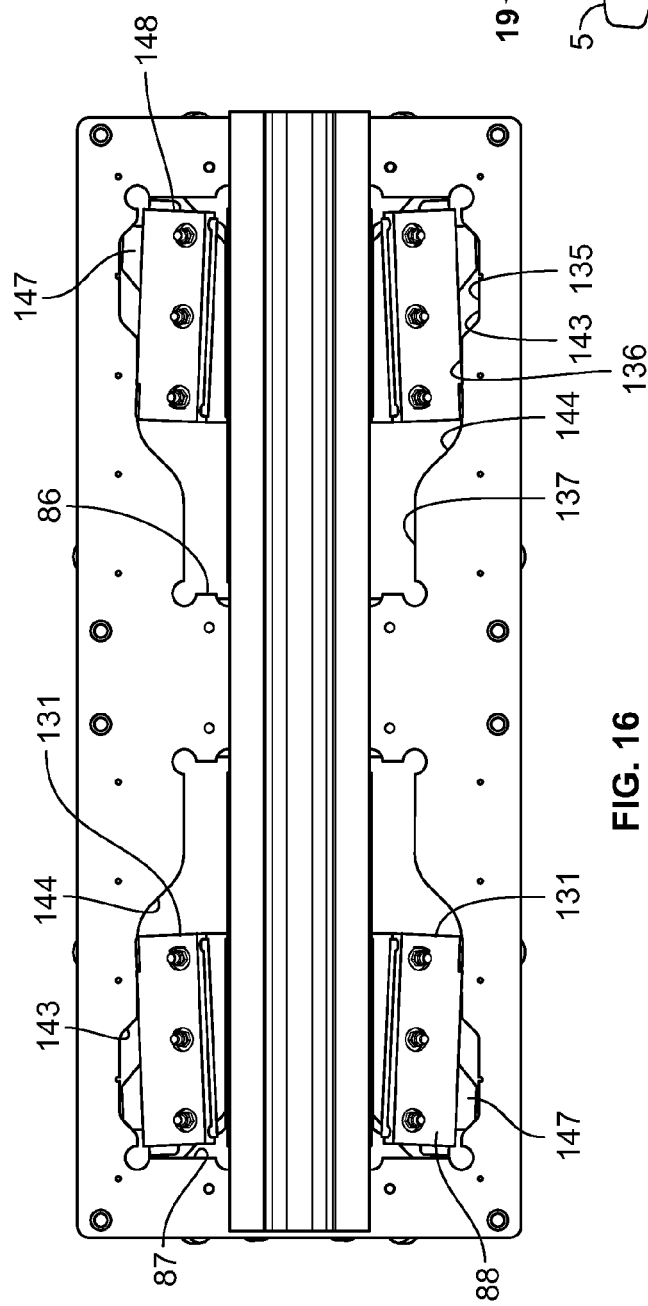
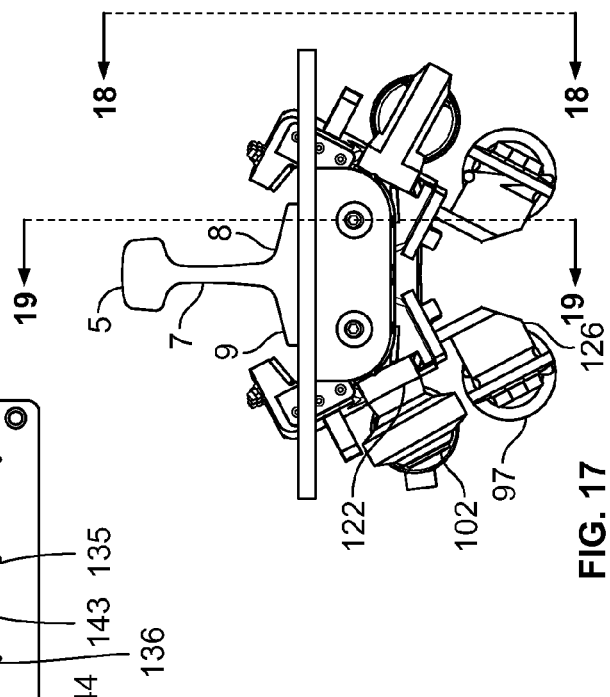
FIG. 16
FIG. 17

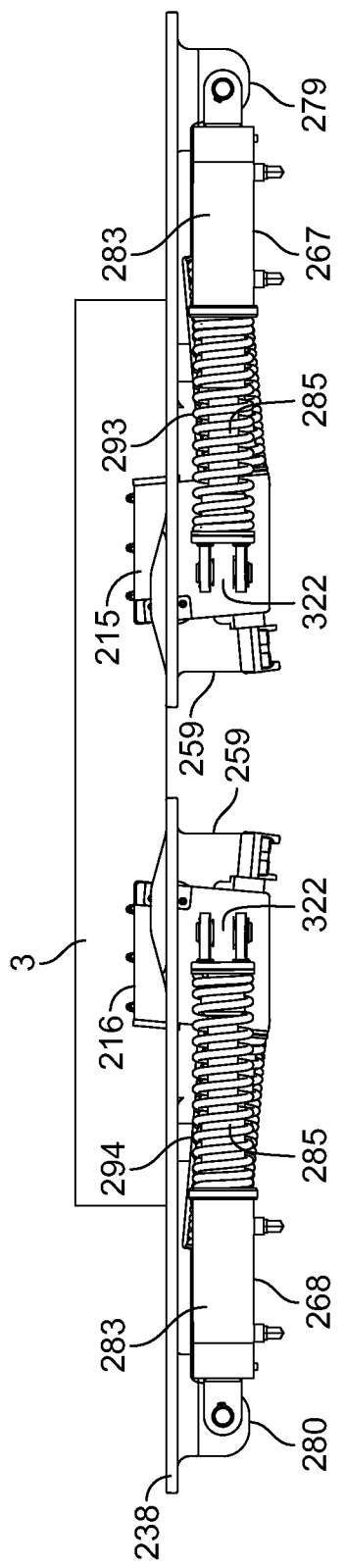
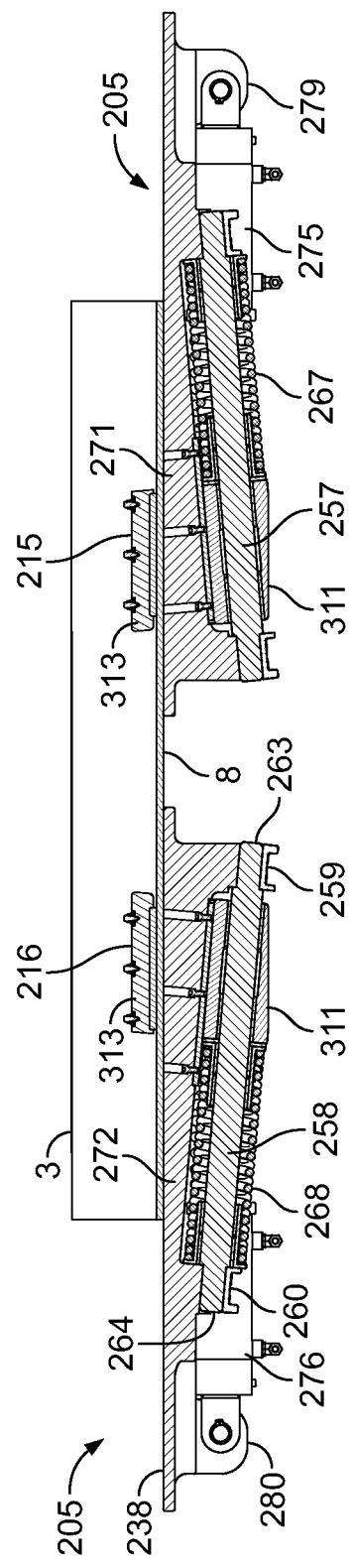

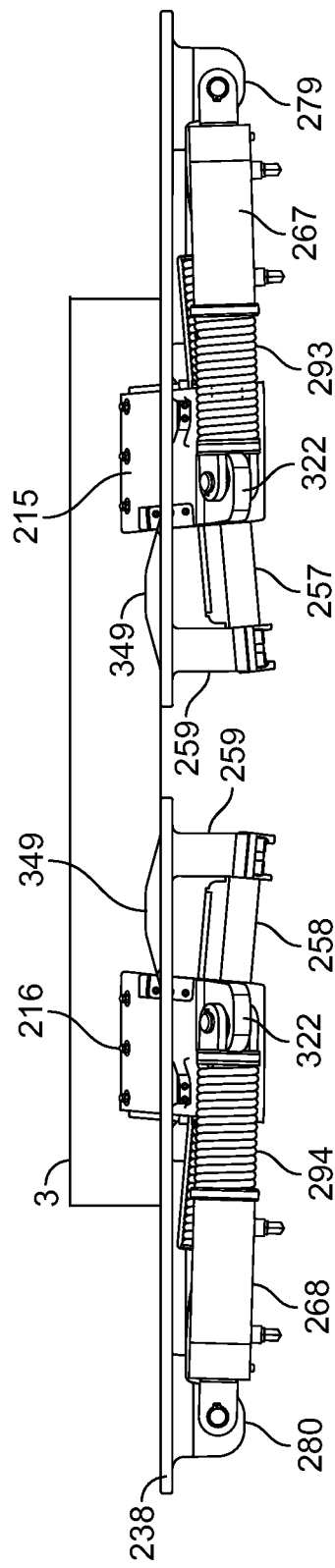
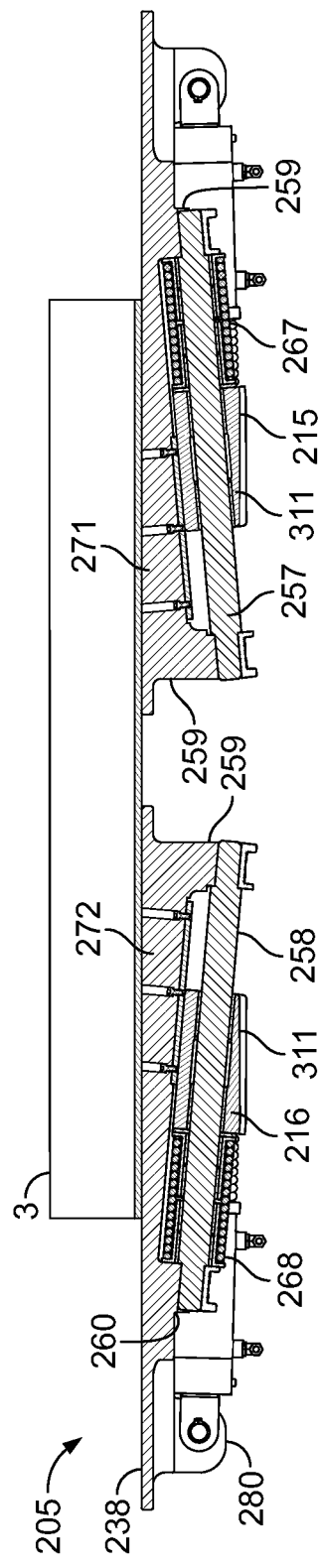
FIG. 36
FIG. 37

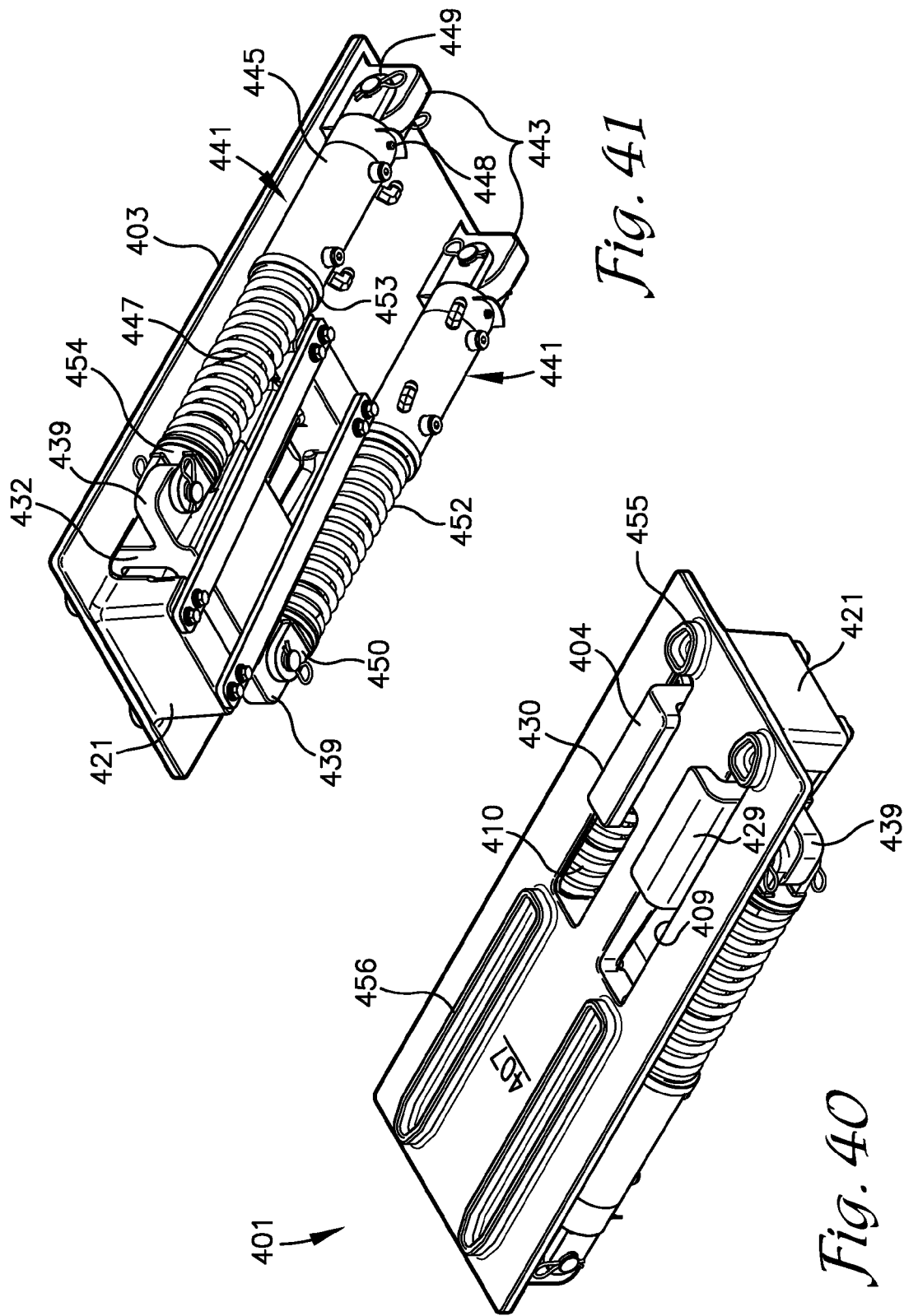

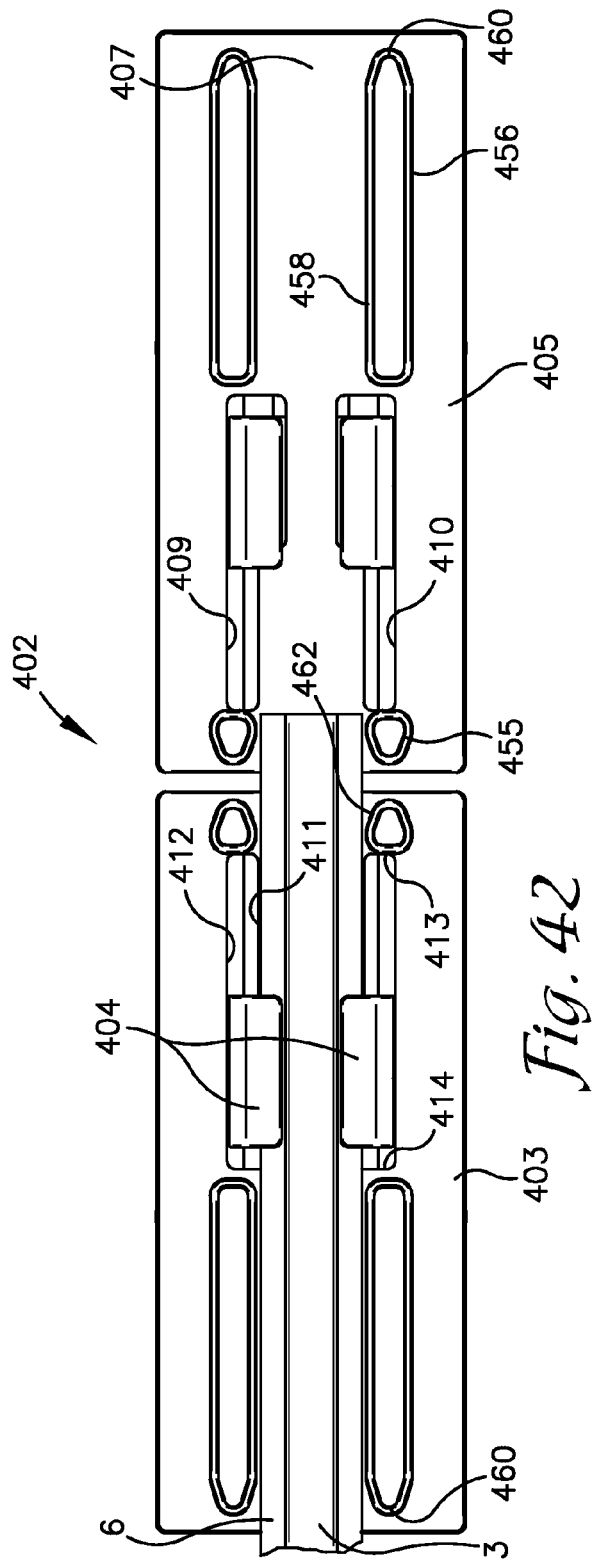
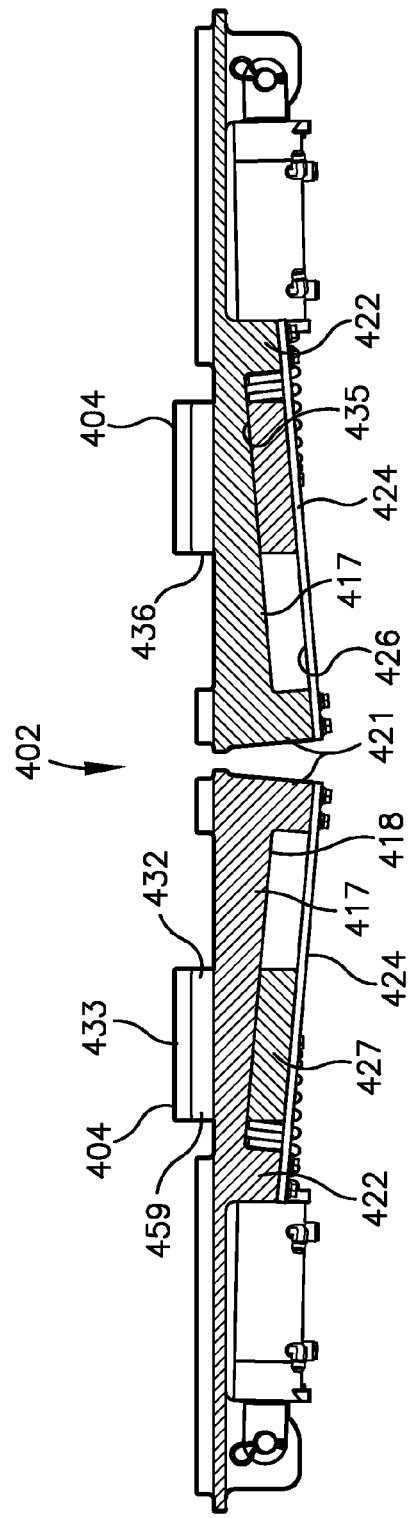

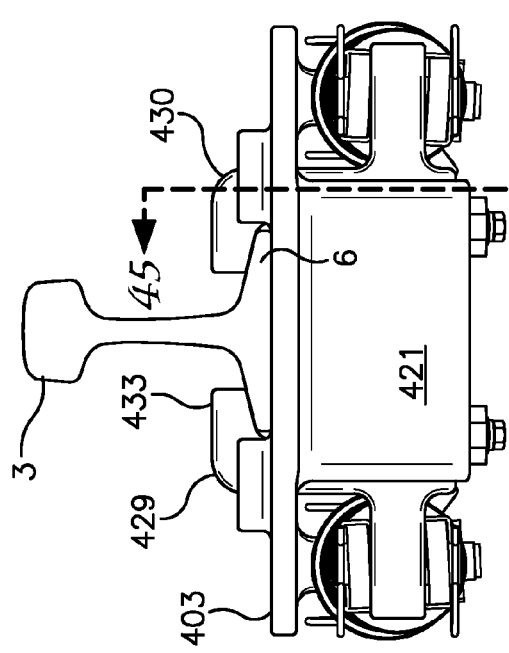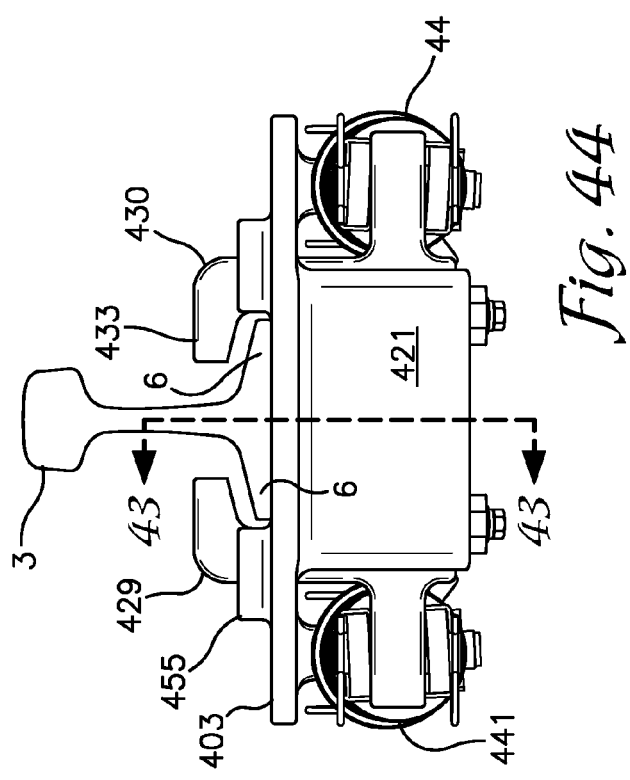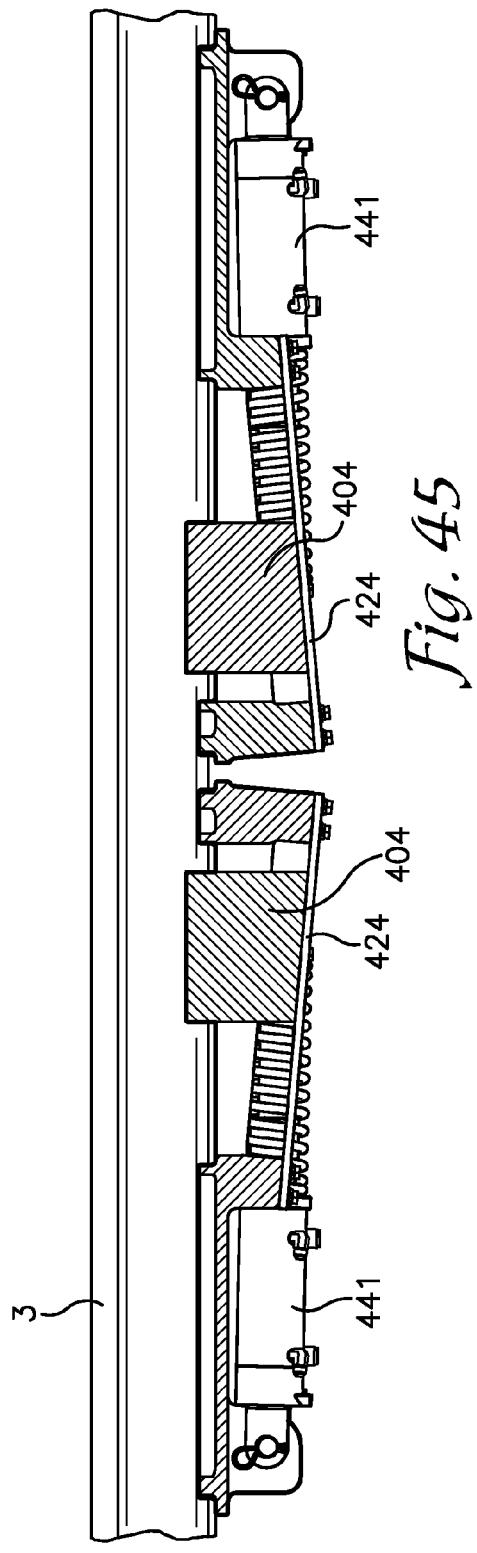

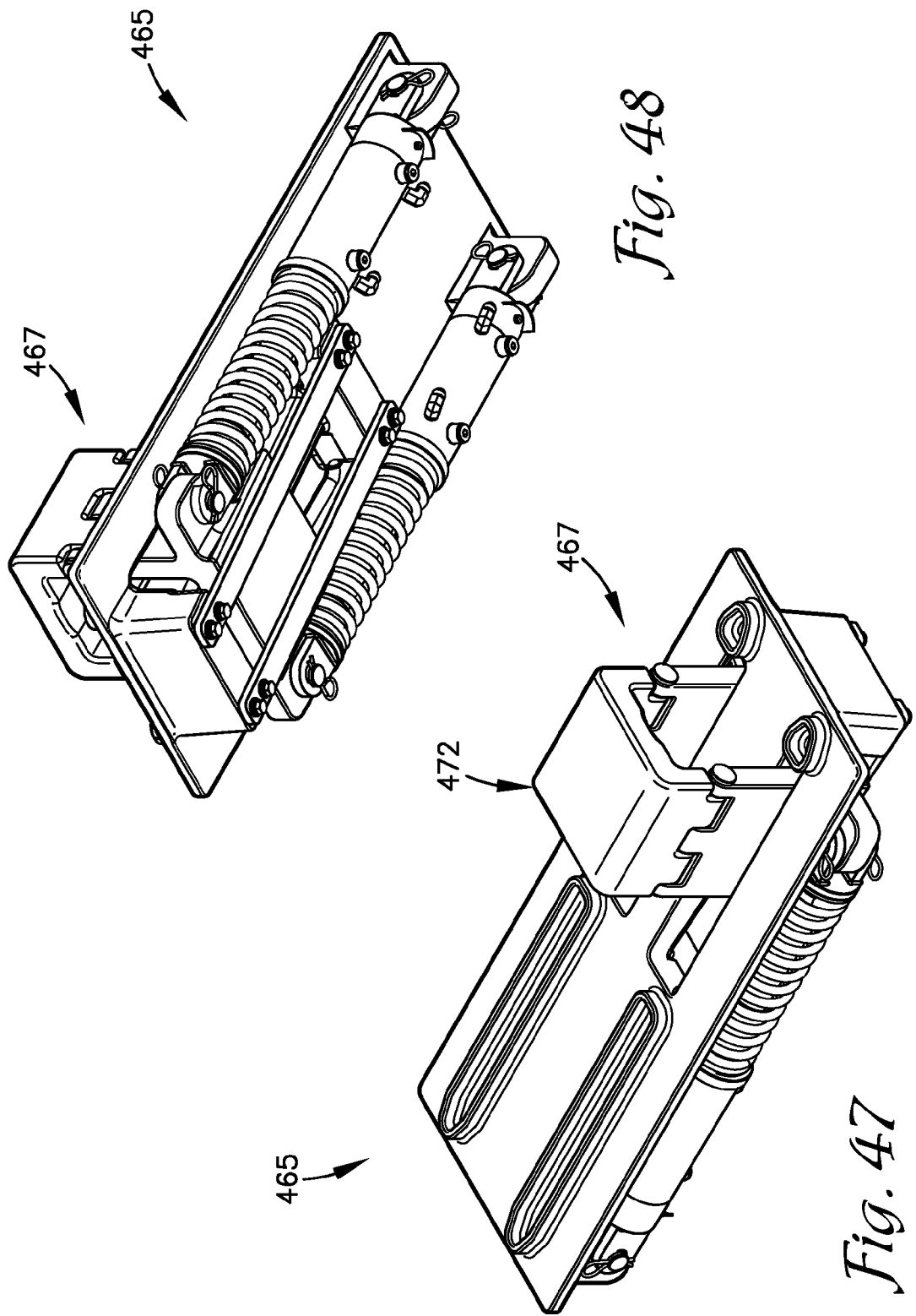

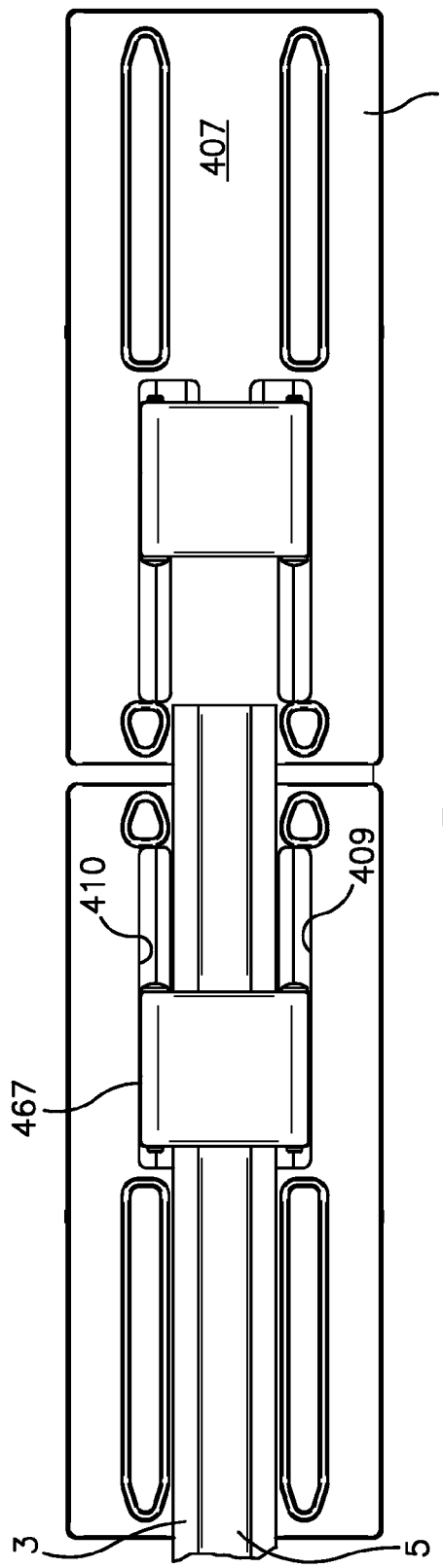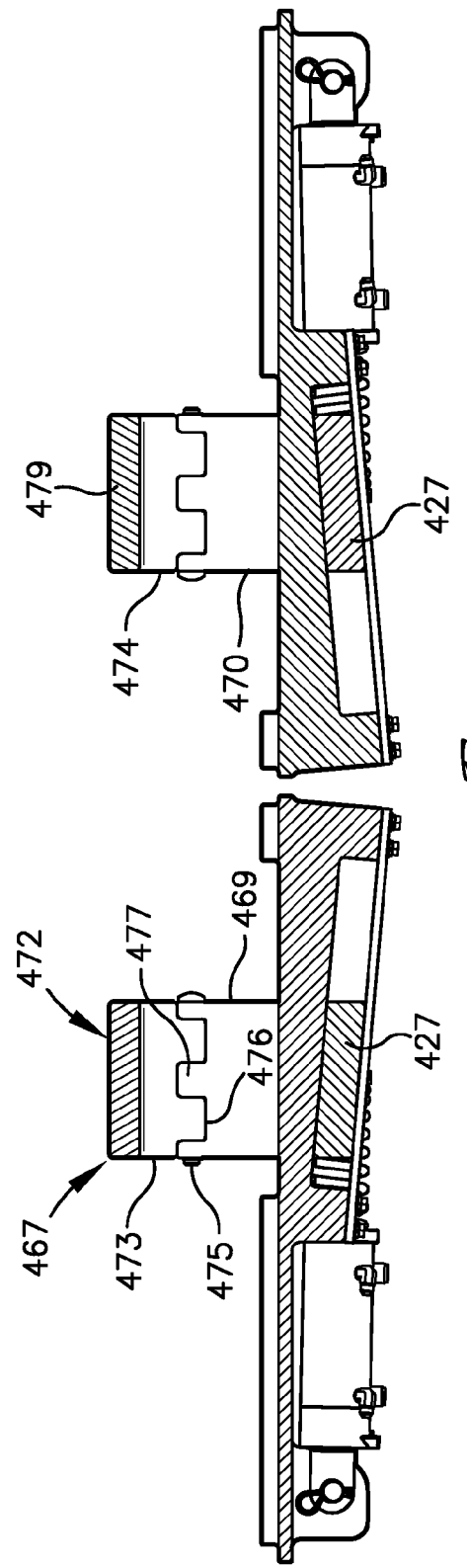

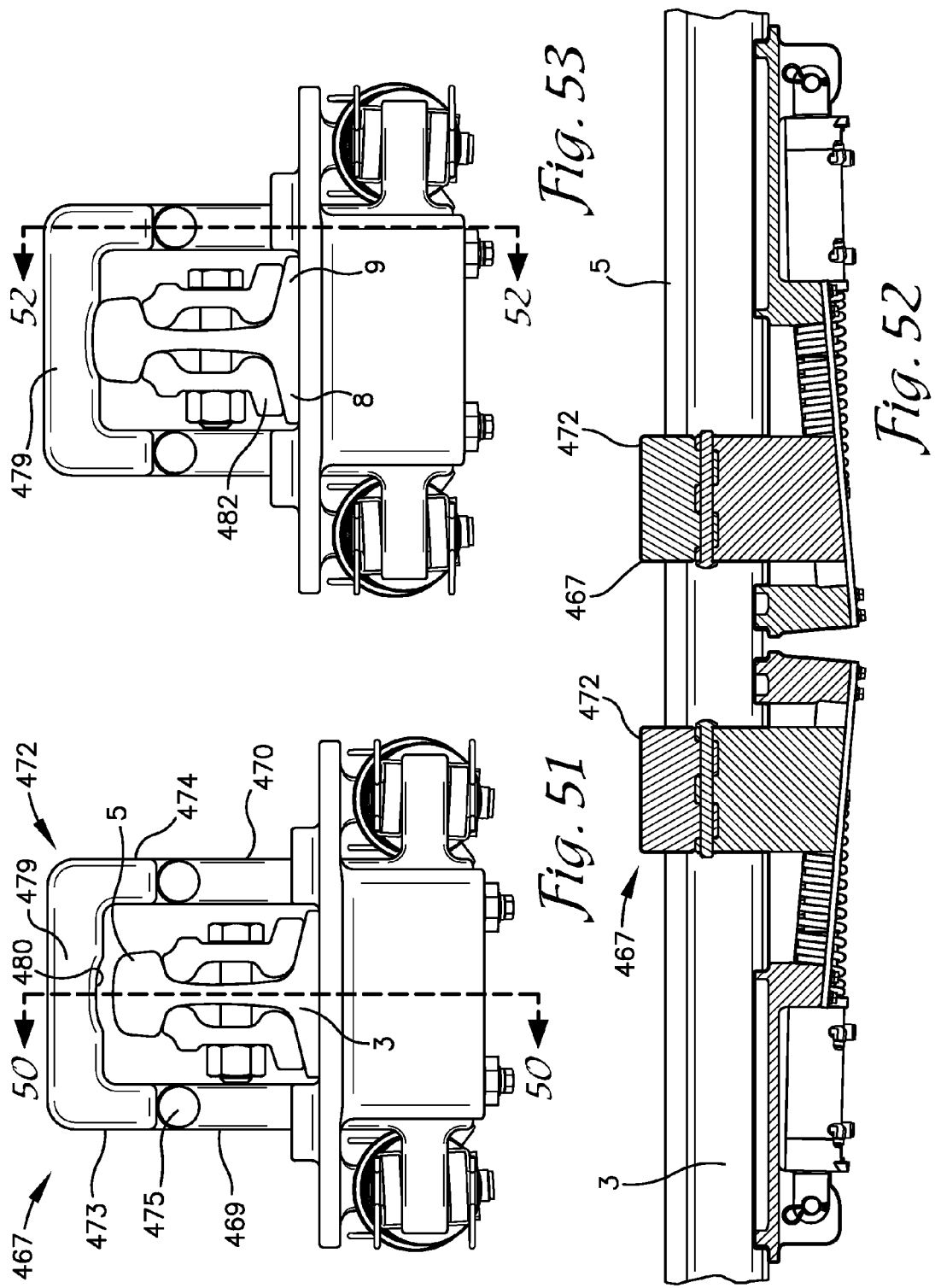

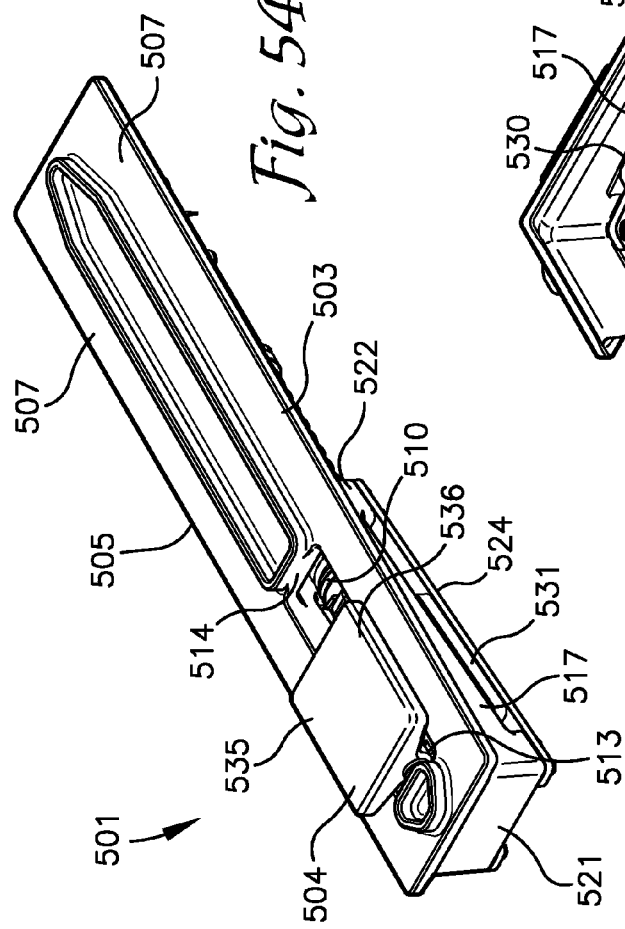
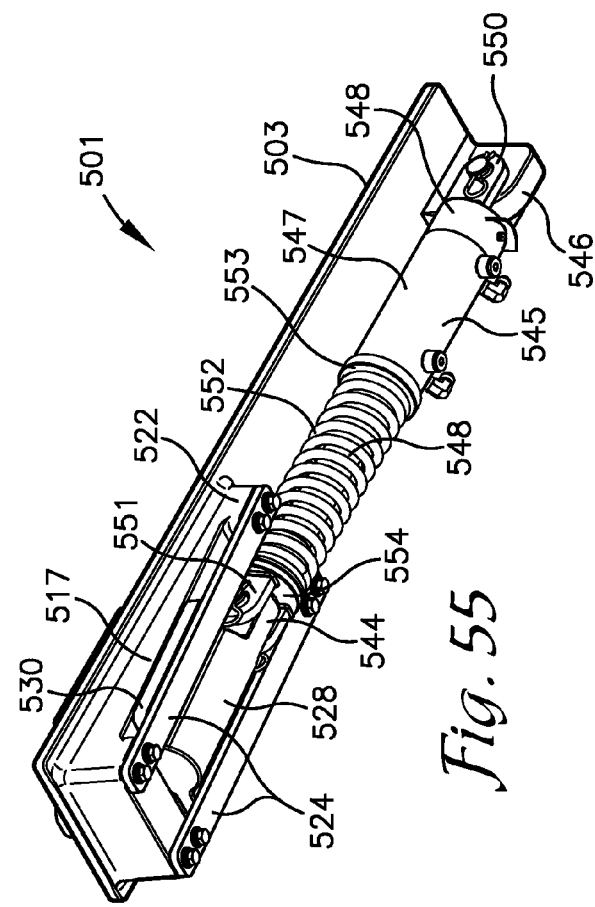

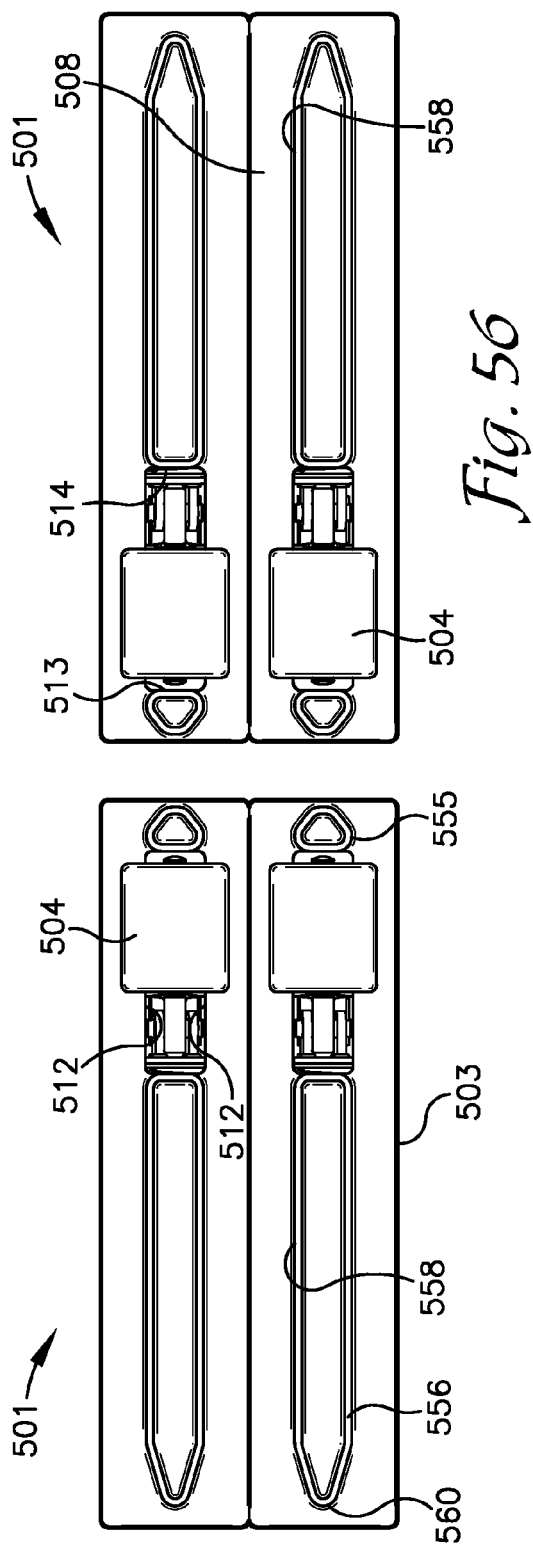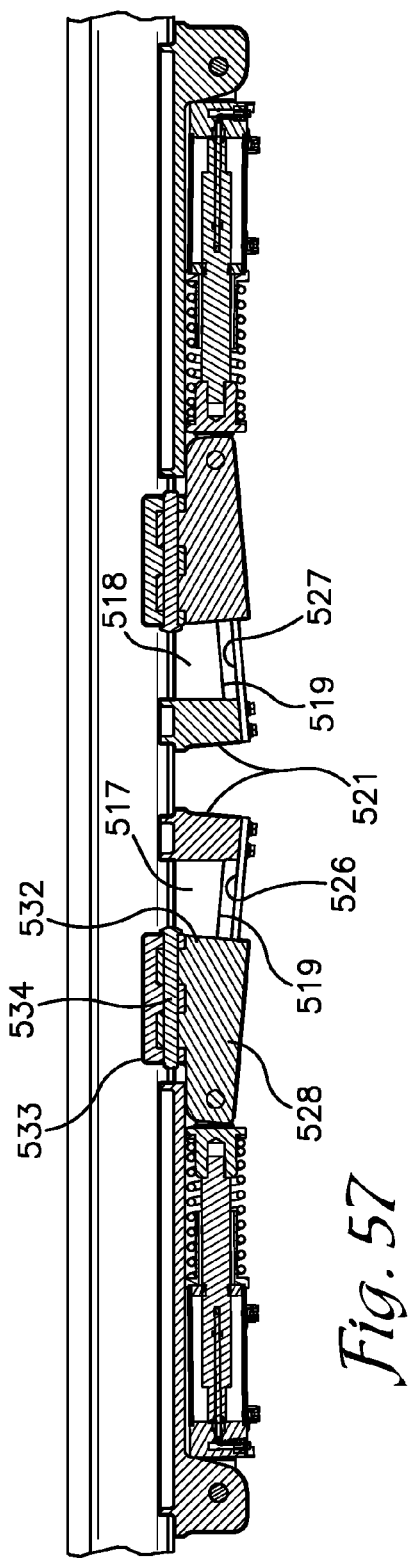

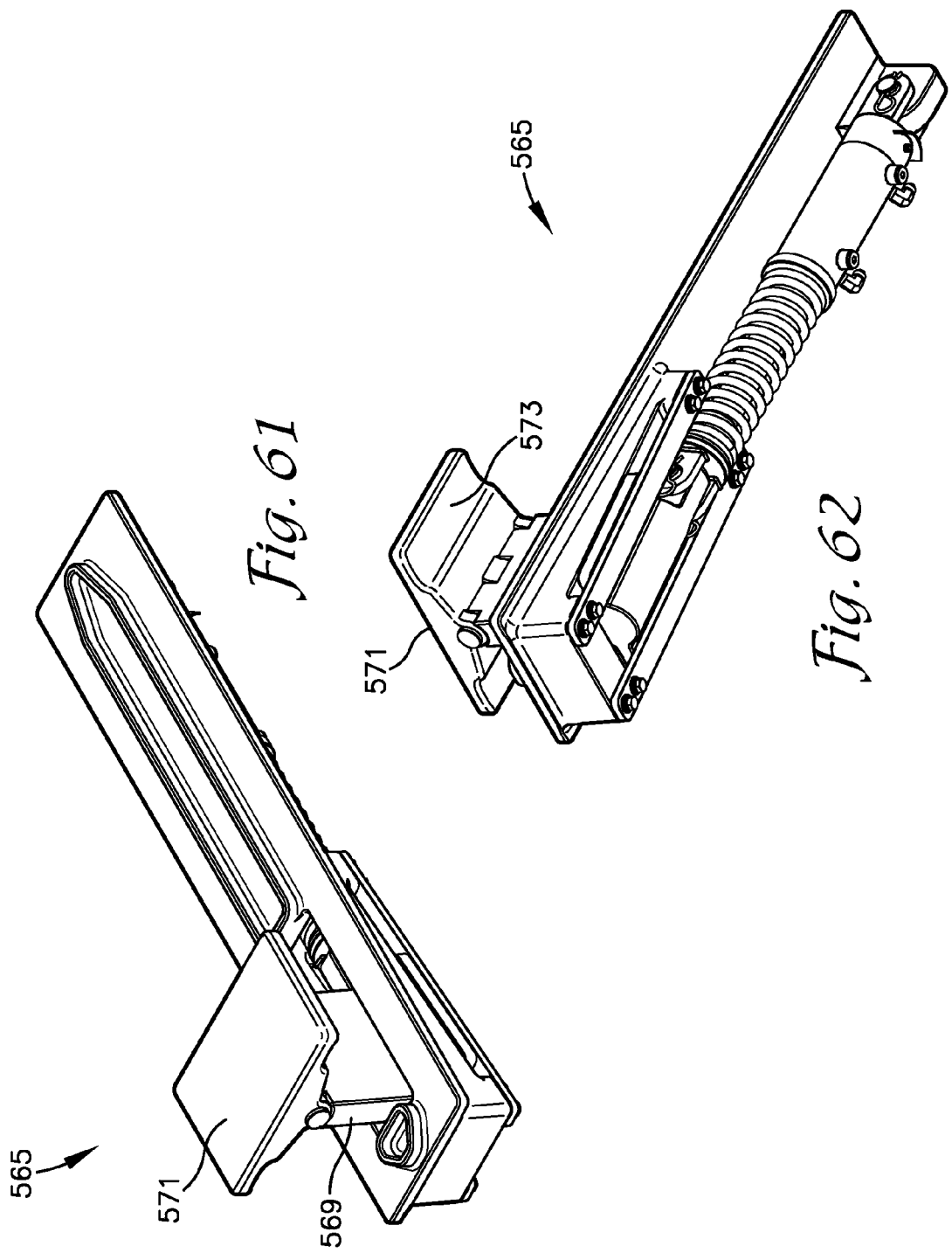

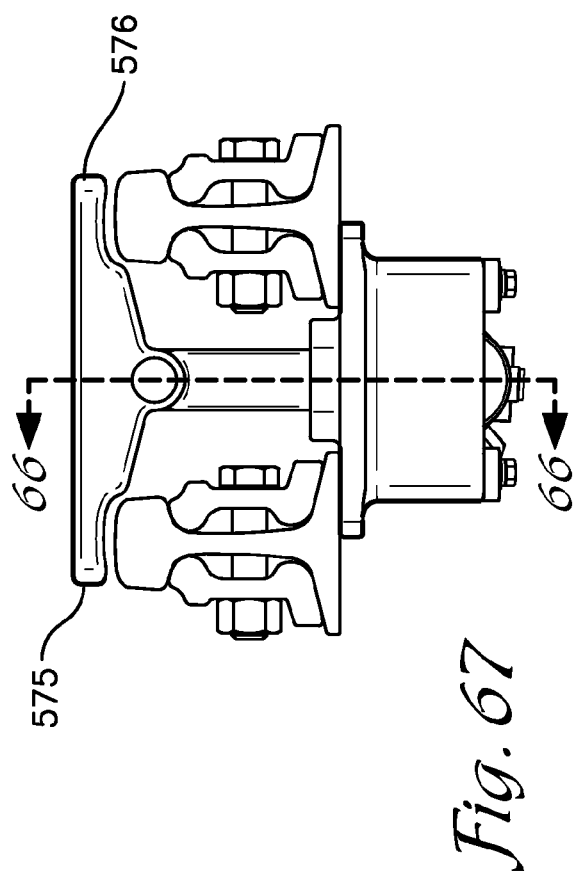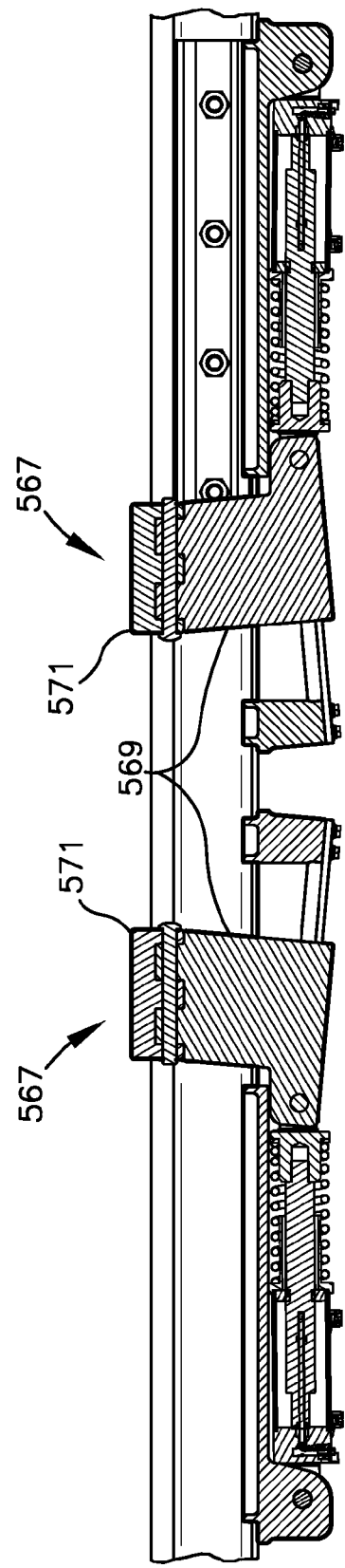

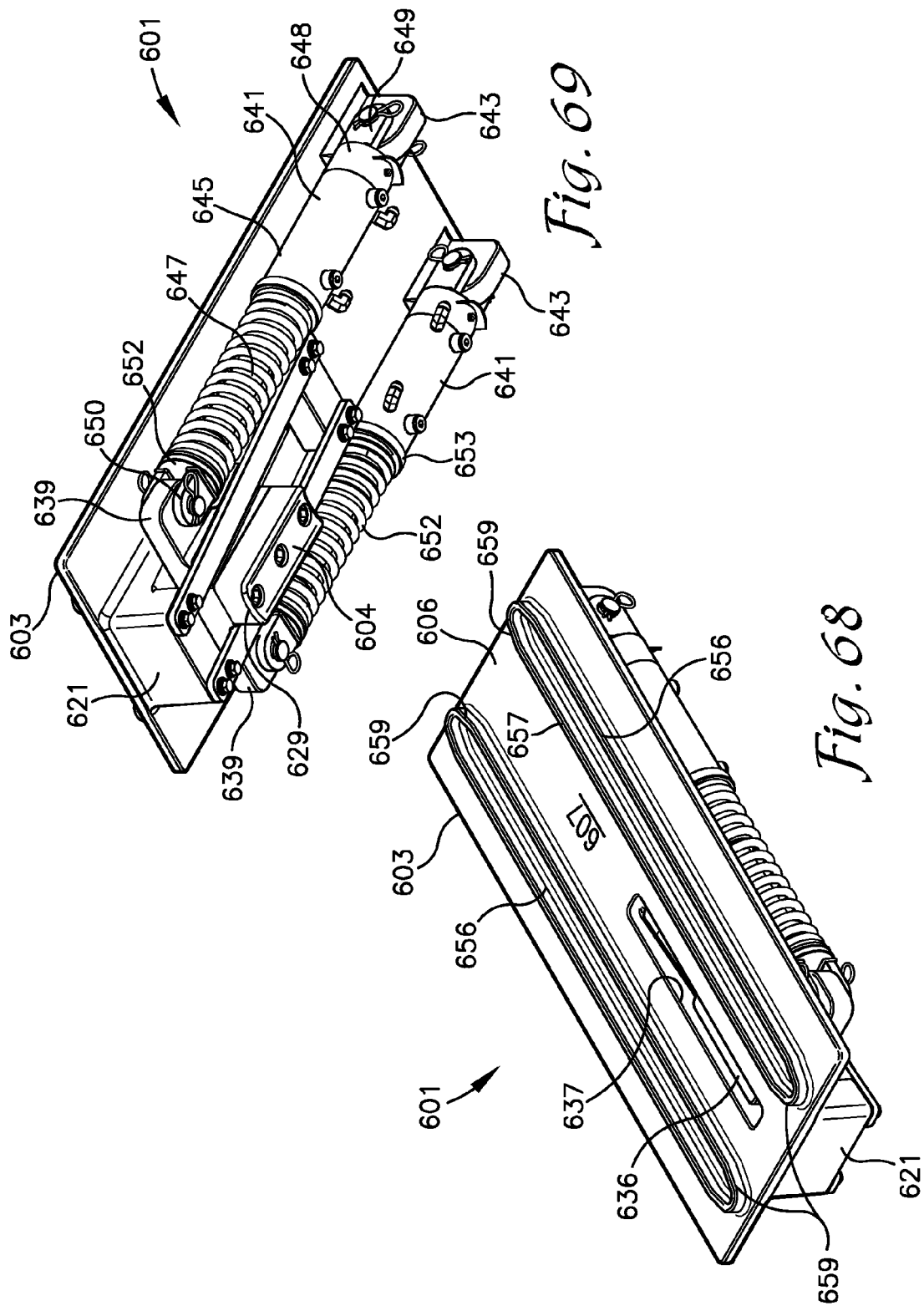

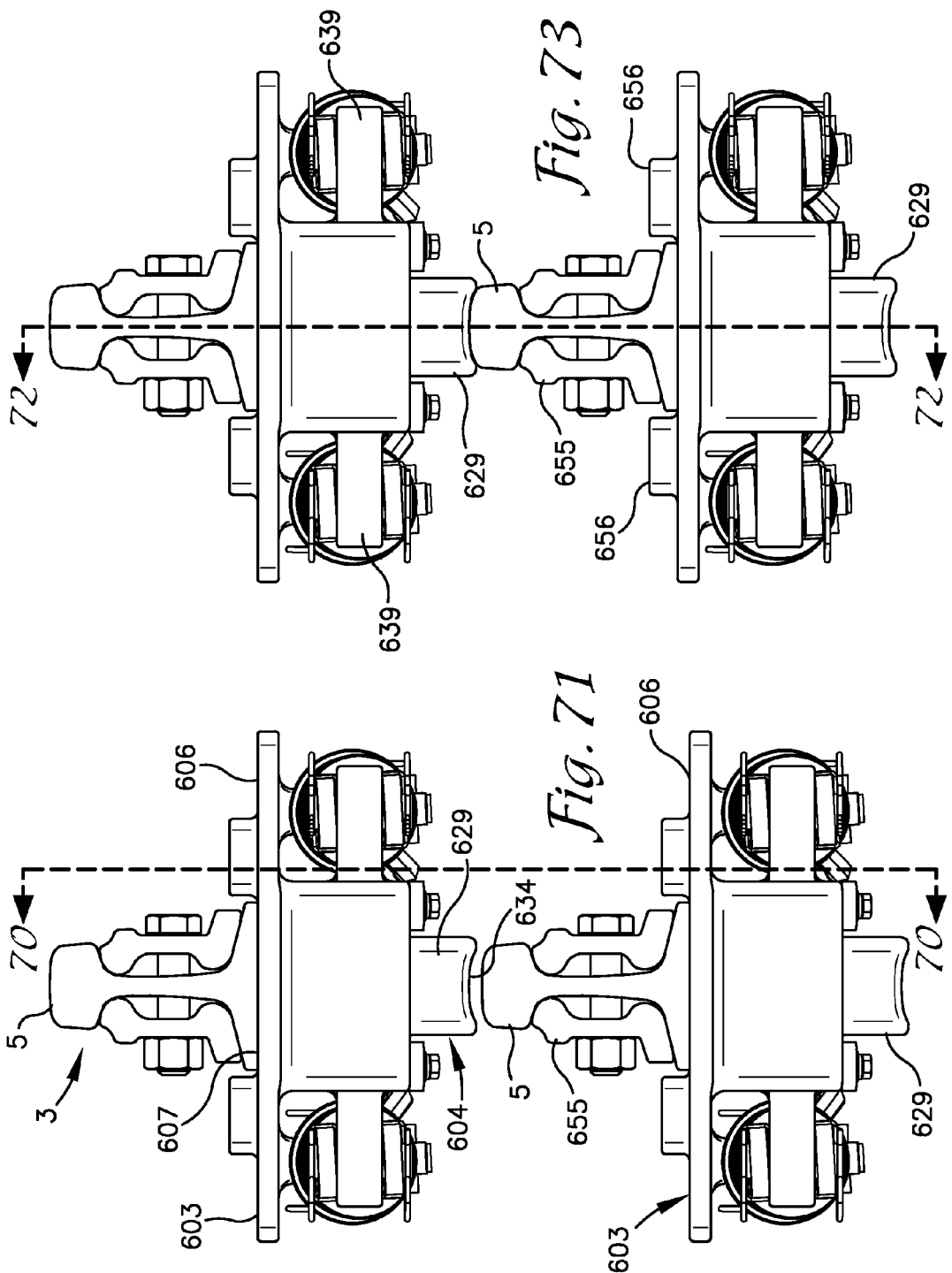

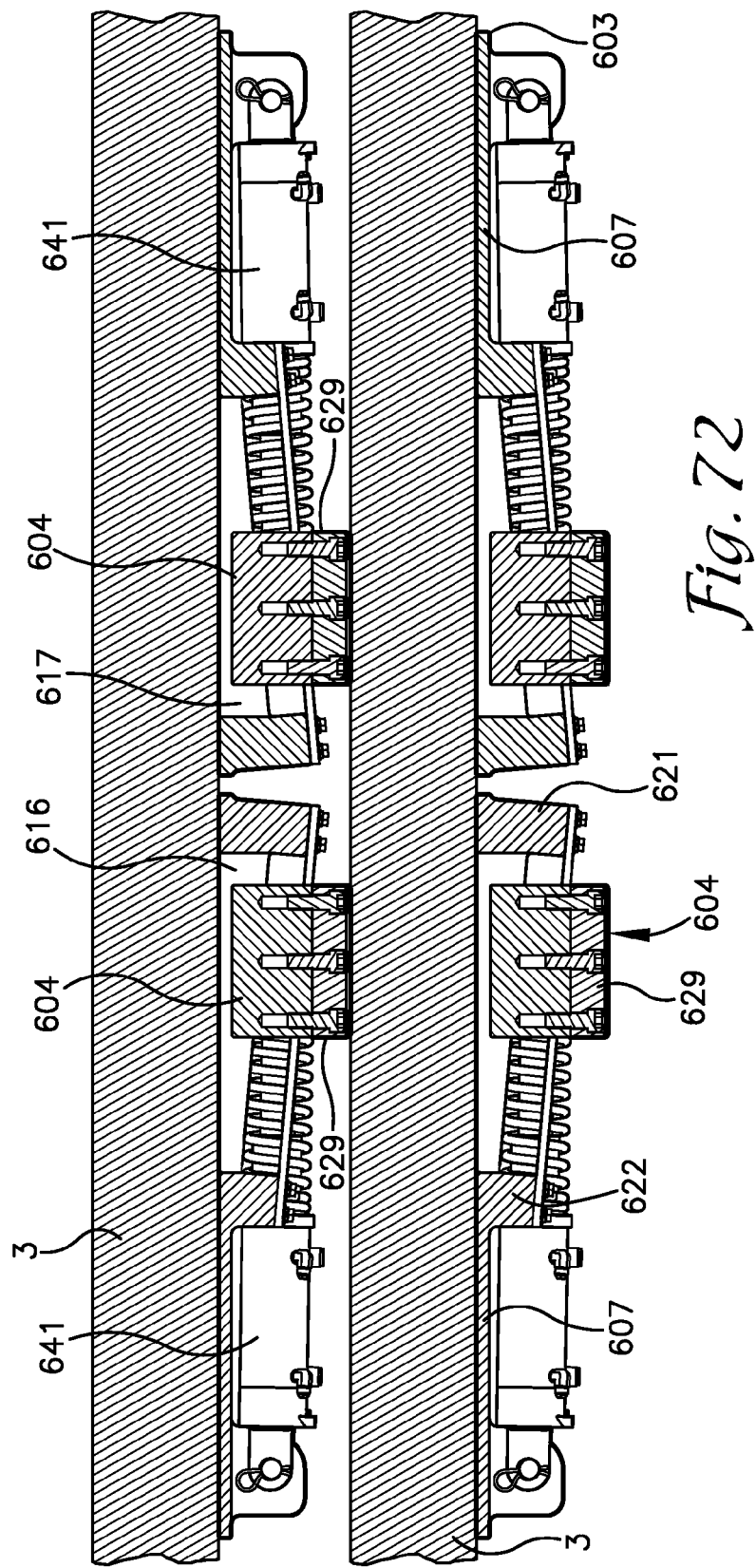

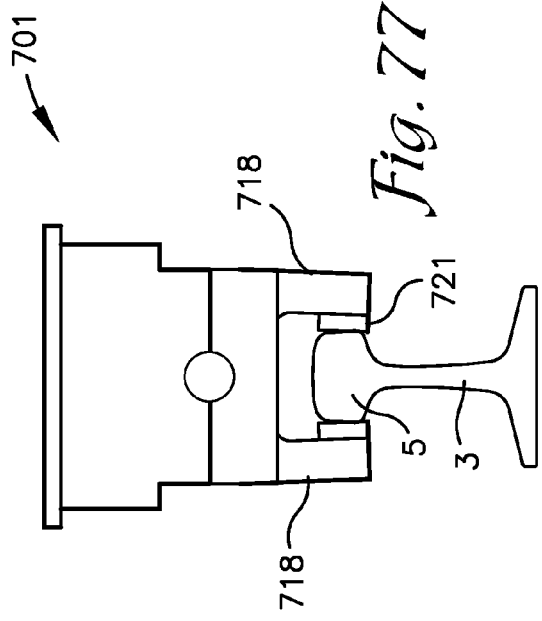
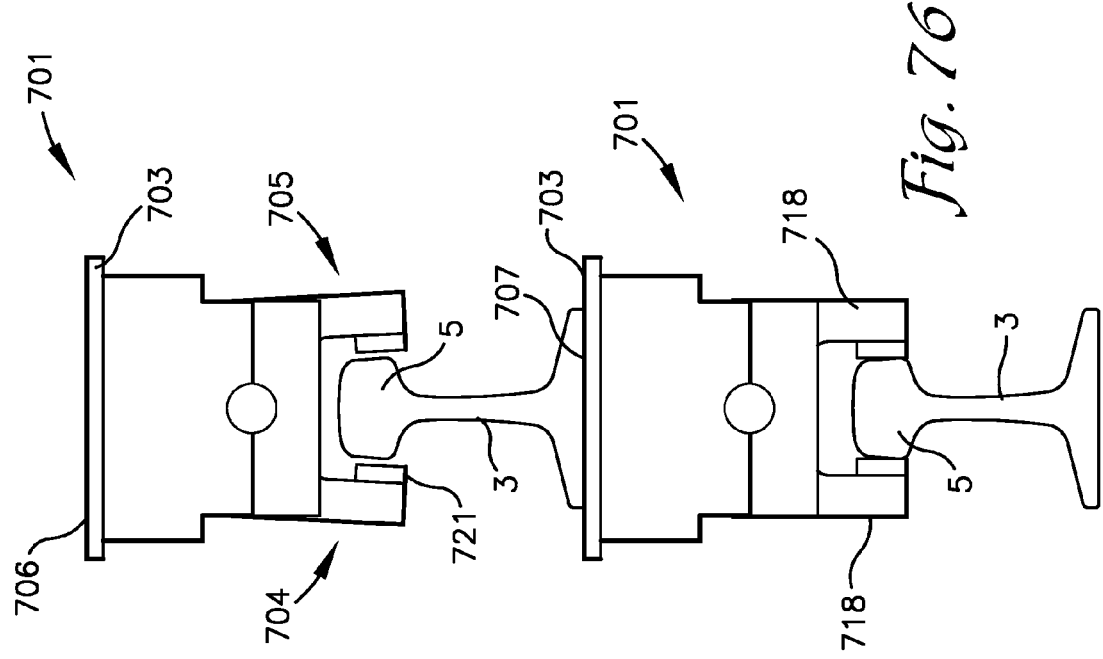

CLAMP ASSEMBLY

CROSS-REFERENCE TO RELATED APPLICATIONS

This application claims priority from U.S. Provisional Patent Application No. 61/776,407 filed Mar. 11, 2013, the disclosure of which is hereby incorporated herein, in its entirety, by reference. This application is also a continuation-in-part of and claims priority from U.S. patent application Ser. No. 13/401,128 filed Feb. 21, 2012, now abandoned, which is a continuation-in-part and claims priority from application Ser. No. 13/004,117 filed Jan. 11, 2011, issued on Nov. 26, 2013 as U.S. Pat. No. 8,590,454, which is a continuation-in-part and claims priority from application Ser. No. 12/545,632 filed Aug. 21, 2009, issued on May 22, 2012 as U.S. Pat. No. 8,181,577.

BACKGROUND OF THE INVENTION

Field of the Invention

This invention relates to clamp assemblies for securing elongate members thereto and in particular clamping assemblies for securing long lengths of ribbon rail to a rail train.

Description of the Related Art

Modern railroad tracks are constructed using long sections of ribbon rail which presently may be up to 1600 feet in length. These sections of ribbon rail are formed by butt welding multiple sticks of rail, which traditionally come from the steel mill in thirty-nine foot or seventy-eight foot lengths. The welding of the ribbon rails is done at a welding plant and the welded ribbon rails are transported to their installation site on a specially constructed rail train. The rail train includes a plurality of rail rack cars, each typically having two racks of shelves One car in each rail train is a tie-down car including specialized stands which include means for fixing the rails to racks on the stands to prevent longitudinal movement of the rails relative to the tie-down car. The fixing means generally includes a plurality of clamping blocks which are bolted to the stand on opposite sides of each rail so as to bear against the foot or base flange of the rail and clamp it against the stand. Typically each clamping block is held down by three or four large bolts which must be installed or removed using an impact wrench or the like. All the other racks in the train allow for relative longitudinal movement of the rails and may include rollers which support the rails. This relative movement between the racks and the rails is required in order to allow the rails to flex without stretching or compressing as the train traverses curves in the track, as well as to allow for coupler slack that exists in each of the couplers between cars. Each coupler has up to approximately 6 inches of slack. Coupler slack and thermal expansion and contraction of the ribbon rail, generally necessitates that the tie-down car be positioned near the center of the rail train so as to evenly divide the rails and to thereby insure that neither the forward end nor the rearward end of the rail can move, expand or contract a sufficient distance relative to the nearest adjacent rack that the end of the rail falls off of the rack.

In existing rail trains, worker safety is endangered by the need to manually clamp and unclamp the rails using an impact wrench or the like. A clamping mechanism that could be remotely operated would greatly improve the safety of rail loading and unloading operations.

SUMMARY OF THE INVENTION

The present invention is a clamping assembly for clamping elongate members in place, such as rails to be secured in place on a rail train. The clamping assemblies are mounted on shelves on one or more tie down cars. Clamp members of each clamping assembly are normally urged to a clamping position by one or more springs to secure the rail in place to the clamping assembly and to the rail car. Linear actuators, such as hydraulic cylinders are utilized to move the clamp members out of clamping engagement with the rails.

Each clamp assembly includes a base plate which fastens to the stand of the tie down car. The base plate has at least two openings formed therethrough, one on each side of the respective rail section. Respective clamping members extend upwardly through the openings. Each clamping member has a clamping flange which selectively engages a lower flange of the rail section. Each clamping member further includes a tubular hub which rides on a guide rod mounted to the underside of the base plate. The guide rods are mounted at an angle to the plate and respective wedges are mounted to the underside of the base plate above the tubular guides such that the hubs ride against the wedges. Respective pairs of opposed clamping members are positioned on each side of the rail section in end to end alignment such that the longitudinally aligned wedges slope in opposite directions.

Springs normally urge the clamping members toward the lower end of the guide rod and across the thicker end of the wedge drawing the clamping flange of each clamping member downward onto the foot of a rail positioned between opposed clamping members. Double acting hydraulic actuators selectively act on the clamping members to urge the clamping members out of clamping engagement with the rail and in opposition to the spring or to advance the clamping members back into clamping engagement with the rail. The springs acting on the clamping members, urge and hold the clamping members in clamping engagement with the rail when hydraulic pressure to the actuators is released, such as during transport of the rails.

BRIEF DESCRIPTION OF THE DRAWINGS

FIG. 2 is a perspective view of a rail support car incorporating shared trucks.

FIG. 3 is an enlarged and fragmentary side elevational view of a plurality of rail support cars supported on shared trucks with a pair of rails shown supported thereon.

FIG. 4 is an enlarged and fragmentary top plan view of the rail support cars supported on shared trucks with three rails shown supported thereon.

FIG. 5 is an end view of a rail support car as shown in FIG. 2.

FIG. 7 is a side elevational view of the rail tie-down car including a plurality of shelves each supporting a plurality of clamp assemblies.

FIG. 8 is a top plan view of the rail tie-down car.

FIG. 12 is a top plan view of the clamping assembly with a fragmentary section of rail clamped thereto.

FIG. 13 is an end view of the clamping assembly with a fragmentary section of rail clamped thereto.

FIG. 16 is a top plan view of the clamping assembly in an unclamped alignment with a fragmentary section of rail supported thereon.

FIG. 17 is an end view of the clamping assembly in an unclamped alignment with a fragmentary section of rail supported thereon.

FIG. 34 is a side elevational view of the clamping assembly with a fragmentary section of rail clamped thereto.

FIG. 35 is a cross-sectional view of the clamping assembly with a fragmentary section of rail clamped thereto taken along line 35-35 of FIG. 30.

FIG. 36 is a side elevational view of the clamping assembly in an unclamped alignment with a fragmentary section of rail supported thereon.

FIG. 37 is a cross-sectional view of the clamping assembly in an unclamped alignment with a fragmentary section of rail supported thereon taken along line 37-37 of FIG. 31.

FIG. 40 is a top perspective view of an alternative embodiment of a clamping assembly including hooks that engage the feet of a rail (not shown) supported thereon.

FIG. 41 is a bottom perspective view of the clamping assembly as shown in FIG. 40.

FIG. 42 is a top plan view of a pair of clamping assemblies as shown in FIG. 40 forming a rail clamp with a fragmentary portion of a rail shown supported thereon.

FIG. 43 is a cross-sectional view of the rail clamp taken along line 43-43 of FIG. 44 with the rail removed and a hook assembly in a release position.

FIG. 44 is a left side elevational view of the rightmost clamping assembly shown in FIG. 42 with a rail shown supported thereon and the hook assembly in the release position.

FIG. 45 is a view similar to FIG. 43 showing the hook assembly in a clamping position.

FIG. 46 is a left side elevational view of the rightmost clamping assembly shown in FIG. 45 with a rail shown supported thereon and the hook assembly in the release position.

FIG. 47 is a top perspective view of an alternative embodiment of a clamping assembly including a box-shaped clamp assembly adapted to engage the head of a rail (not shown) supported thereon.

FIG. 48 is a bottom perspective view of the clamping assembly as shown in FIG. 47.

FIG. 49 is a top plan view of a pair of clamping assemblies as shown in FIG. 47 forming a rail clamp with a fragmentary portion of a rail shown supported thereon.

FIG. 50 is a cross-sectional view of the rail clamp taken along line 50-50 of FIG. 51 with the rail removed and the box-shaped clamp assembly in a release position.

FIG. 51 is a left side elevational view of the rightmost clamping assembly shown in FIG. 49 with a rail shown supported thereon and the box-shaped clamp assembly in the release position.

FIG. 52 is a view similar to FIG. 50 showing the box-shaped clamping assembly in a clamping position.

FIG. 53 is a left side elevational view of the rightmost clamping assembly shown in FIG. 52 with a rail shown supported thereon and the box-shaped clamping assembly in the release position.

FIG. 54 is a top perspective view of an alternative embodiment of a clamping assembly including a T-shaped clamp assembly adapted to engage the feet of adjacent rails (not shown) supported thereon.

FIG. 55 is a bottom perspective view of the clamping assembly as shown in FIG. 54.

FIG. 56 is a top plan view of two pairs of clamping assemblies as shown in FIG. 54.

FIG. 57 is a cross-sectional view of the rail clamp taken along line 57-57 of FIG. 58 with a rail supported thereon and the T-shaped clamp assemblies in a release position.

FIG. 61 is a top perspective view of an alternative embodiment of a clamping assembly including a T-shaped clamp assembly adapted to engage the head of adjacent rails (not shown) supported thereon.

FIG. 62 is a bottom perspective view of the clamping assembly as shown in FIG. 61.

FIG. 66 is a view similar to FIG. 64 showing the T-shaped clamping assembly in a release position.

FIG. 67 is a left side elevational view of the rightmost clamping assembly shown in FIG. 66 with a pair of rails shown supported thereon and the T-shaped clamping assembly in the release position.

FIG. 68 is a top perspective view of an alternative embodiment of a clamping assembly including a depending clamp member adapted to engage the head of a rail (not shown) supported therebelow.

FIG. 69 is a bottom perspective view of the clamping assembly as shown in FIG. 68.

FIG. 71 is a left side elevational view of the rightmost clamping assemblies shown in FIG. 70 with rails shown supported thereon and the depending clamping member of each assembly shown in the release position.

FIG. 72 is a cross-sectional view taken along line 72-72 of FIG. 73 and similar to FIG. 70 but showing the depending clamping members in a clamping position relative to a rail positioned therebelow.

FIG. 73 is a left side elevational view of the rightmost clamping assembly shown in FIG. 72 with the depending clamping members in the release position.

FIG. 76 is an end view of a pair of clamping assemblies as shown in FIG. 74 with one supported above the other and with the lower clamping assembly clamped onto a rail positioned therebelow and with the upper clamping assembly unclamped with respect to a rail positioned therebelow.

FIG. 77 is an end view of a clamping assembly of the type shown in FIG. 74 clamped onto a rail of a different size than the rails shown in FIG. 76.

DETAILED DESCRIPTION OF THE PREFERRED EMBODIMENTS

Figure 1:
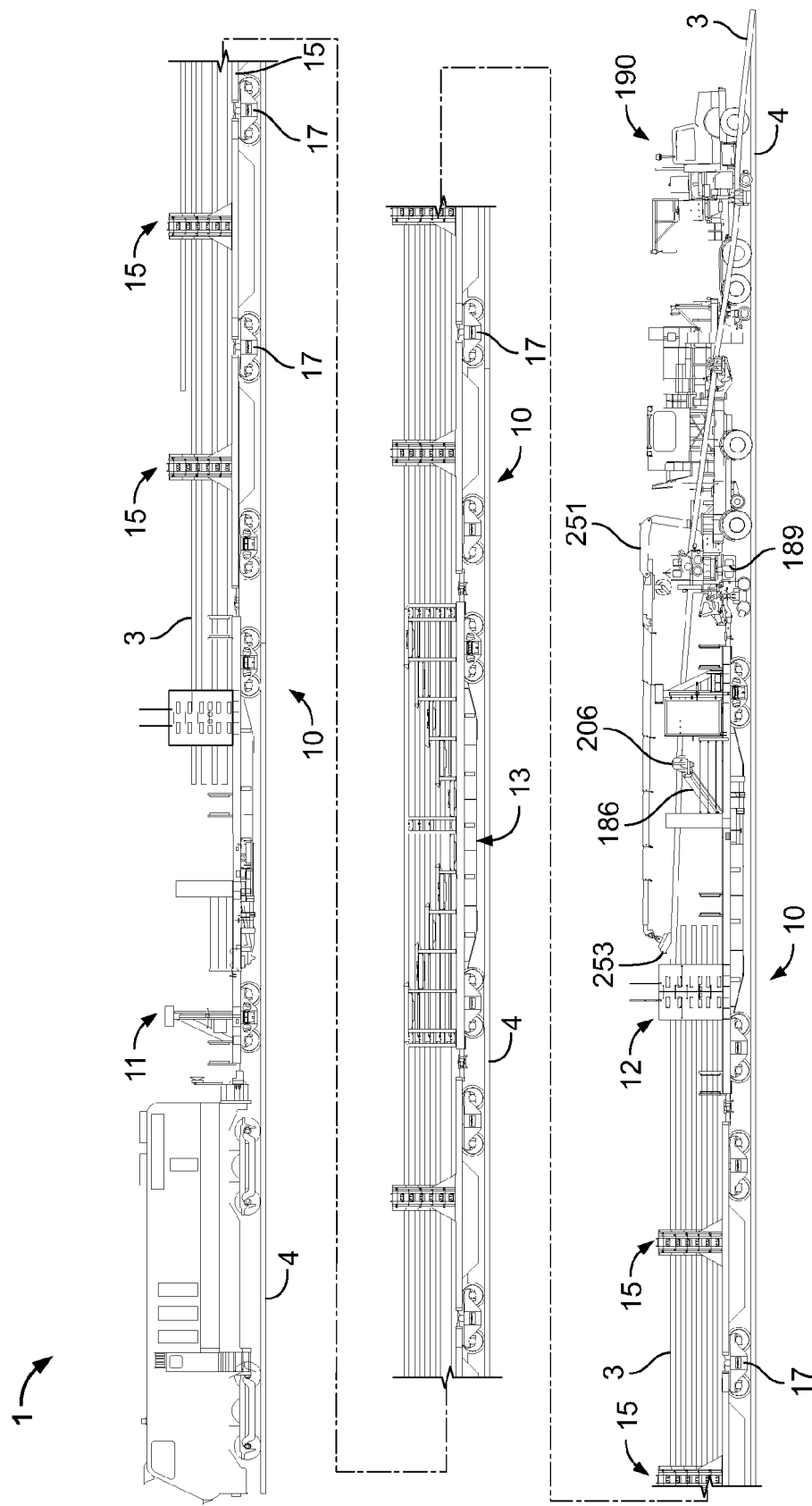
FIG. 1 is a partially schematic side view of a rail train having end cars at either end, a tie down car near the middle and a plurality of rail support cars for supporting multiple ribbon rails thereon.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a rail train according to the present invention. The train 1 is adapted for transporting a plurality of ribbon rails 3 along a railroad track 4. Each rail 3, see FIGS. 13 and 17, includes a head 5, a base flange 6 and a web 7 connecting the base flange 6 to the head 5. The base flange 6 may be described as including opposingly directed feet 8 and 9. Referring to FIG. 1, the rail train 1 is made up of a plurality of cars 10, including front and rear end cars or tunnel cars 11 and 12, a tie-down car 13 and a plurality of rail support cars 15. The train 1 is pulled along the track 4 by one or more locomotives. In the embodiment shown, the tie-down car 13 is preferably positioned near the center of the train 1 to accommodate the greatest amount of expansion of the outer periphery of the train 1 as it rounds corners without pulling the fixed length rails 3 off of rail support shelves on the front and rear end cars 11 and 12.

Most of the rail support cars 15 are supported on shared bogies or trucks 17 which support both the front of one car 15 and the rear of an adjacent car 15. Shared trucks 17 may also be referred to as Jacobs bogies. The front and rear end cars 11 and 12 may or may not be supported on a shared truck 17 with the immediately adjacent car 15. In the embodiment shown in FIG. 1, the end cars 11 and 12 do not incorporate shared trucks and the immediately adjacent cars 15 have an individual truck adjacent the end car 11 or 12 and incorporate a shared truck at an opposite end. Similarly, the tie-down car 13 is not supported on shared trucks 17 so that the ends of the cars 10 adjacent the tie-down car 13 are not supported on shared trucks.

Referring to FIGS. 2-5, each of the shared trucks 17 includes two pairs of wheels 19 mounted on spaced apart axles 20. Adjacent rail cars 15 are connected to a common pivot assembly 21 mounted on the shared truck 17 between the axles 20 which allows both cars to pivot laterally relative to one another and the shared truck 17 as the train 1 traverses curves in the track. The pivot assembly 21 also allows the adjacent rail cars 15 to pivot side to side and fore and aft relative to the shared truck 17 and relative to one another.

Each of the regular rail support cars 15 is preferably thirty feet in length, measured between the centers of the shared trucks 17 at opposite ends of the car 15, and includes a deck 22 and a single rail support stand 23 which extends upwardly above the deck 22. Each stand 23 is preferably positioned at or near the center of the respective car 15 and extends transversely across the width of the car 15. Because the stands 23 are positioned in the center of each car 15 and the cars are thirty feet in length between the centers of the shared trucks 17, the spacing between adjacent stands is approximately thirty feet.

Each stand 23 includes two pairs of upright members or posts 24 and a plurality of shelves or tiers 25a-f which extend between the posts 24. Each shelf 25a-f is formed by cross-members 26 extending between pairs of posts 24 on opposite sides of the car 15, roller support members or plates 27 extending between the cross-members 26, and a plurality of rollers 28, each rotatably mounted between roller support plates 27. Each roller 28 rotates on a longitudinal axis extending across the width of the car 15. Each roller 28 is sized to receive the base flange or foot 7 of a respective one of the ribbon rails 3. Each roller 28 may include flanges 29 projecting outward from the ends of each roller 28 to hold each rail 3 is a specific alignment with respect to an associated roller 28. It is to be understood that more than one roller could be used to support a single rail 3.

In the embodiment shown in FIGS. 2-5, each rail support stand 23 includes six shelves 25 and twelve rollers 28 per shelf 25 to support up to seventy two rails 3 thereon in what is often referred to as separate pockets defined by each roller 28. It is to be understood that the number of shelves and the number of rollers or pockets formed per shelf could be modified. However, due to height considerations, six shelves is generally considered an optimum number of shelves. The number of rollers or pockets typically ranges between eight to twelve. As will be discussed in more detail below, the number of pockets and shelves 25 usually corresponds to the number of pockets and shelves on the tie-down car 13 and the end cars 11 and 12 will also typically have the same number of shelves and accommodate the same number of rails on each shelf. However, the embodiments of the rail support cars 15, tie-down car 13 and end cars 11 and 12 shown herein do not have matching numbers of pockets or shelves which shows some of the variations that might be utilized.

Figure 6:
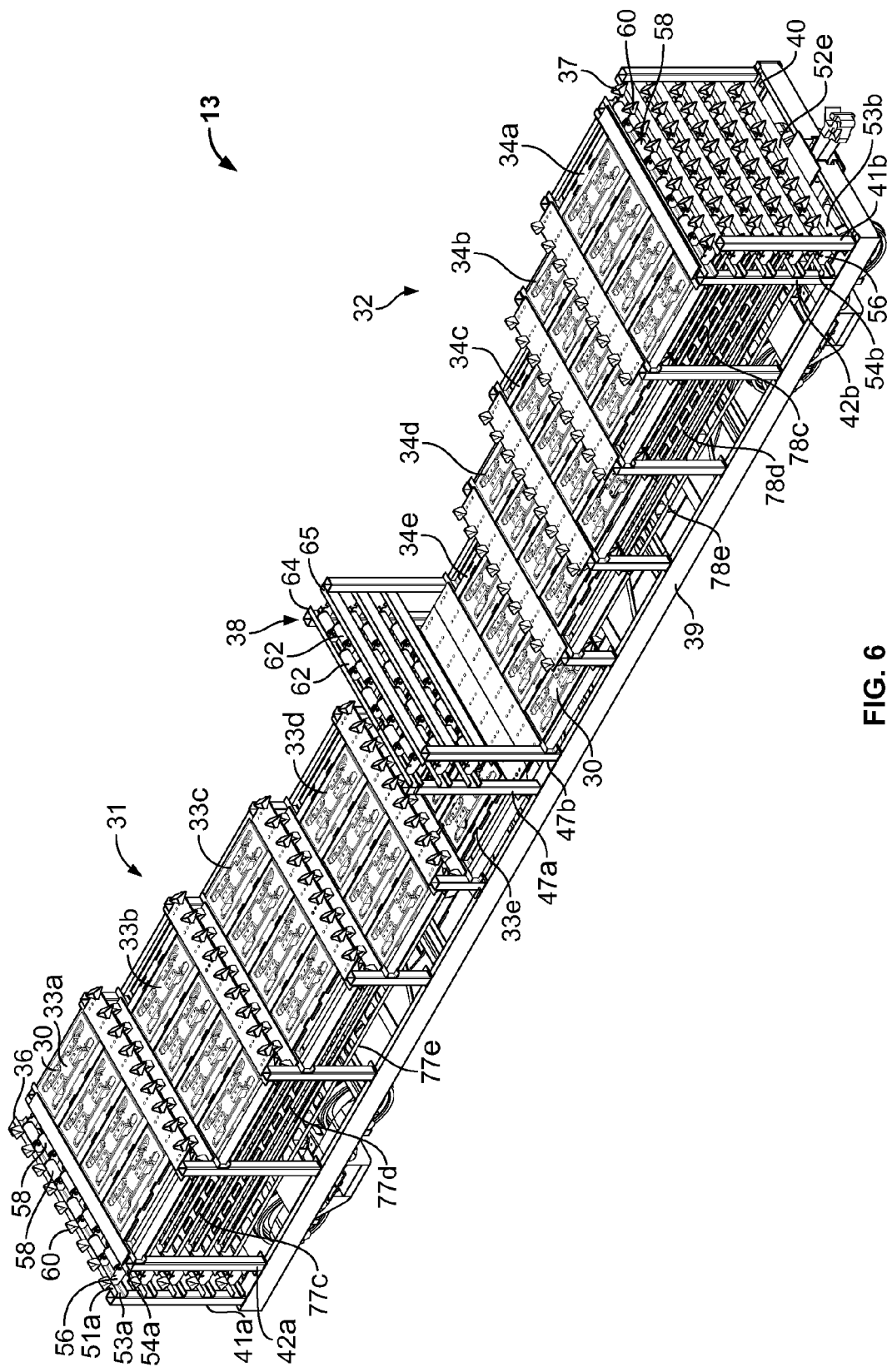
FIG. 6 is a perspective view of a rail tie-down car of the rail train as shown in FIG. 1.

Referring to FIGS. 6-8, the tie-down car 13 includes a plurality of primary clamp assemblies 30 mounted on clamp stands 31 and 32. The clamp assemblies 30 clamp the ribbon rails 3 to the clamp stands 31 and 32 and to the train 1. The clamp stands 31 and 32 are generally mirror images with clamping assemblies 30 on clamp stand 31 connecting a first half of the rails 3 to the tie-down car 13 and clamping assemblies 30 on clamp stand 32 connecting a second half of the rails 3 to the tie-down car 13. As discussed in more detail hereafter, the primary clamp assemblies 30 are preferably hydraulically and remotely operated for clamping the ribbon rails 3 to the clamp stands 31 and 32. As mentioned elsewhere, it is to be understood that the clamp assemblies could be actuated pneumatically, electrically or mechanically.

Each clamp stand 31 and 32 includes a plurality of clamping shelves 33 and 34 respectively, corresponding to the number of layers or rows of rail 3 to be supported. In the embodiment shown, each stand 31 and 32 includes five shelves, shelves 33a-e on stand 31 and shelves 34a-e on stand 32. First and second end roller rack stands 36 and 37 are positioned adjacent and outwardly from clamp stands 31 and 32 respectively on the ends of the tie-down car 13. A center roller rack stand 38 is positioned in the center of the tie-down car 13 between the clamp stands 31 and 32.

The clamp stands 31 and 32, end roller rack stands 36 and 37 and center roller rack stand 38 are all mounted on main frame members or frame rails 39 and 40 of the tie down car 13. Each set of end roller rack stands 36 or 37, clamp stands 31 and 32 and the center roller rack stand 38 are formed from seven sets of vertical posts 41a-47a and 41b-47b extending in spaced relation inward from each end of the tie down car 13.

End roller rack stand 36 is formed on first and second sets of aligned vertical posts 41a and 42a and end roller rack stand 37 is formed on vertical posts 41b and 42b. Five roller support shelves 51a-e are mounted on and extend in vertical spaced alignment between posts 41a and 42a and five roller support shelves 52a-e are mounted on and extend in vertical spaced alignment between posts 41b and 42b. Each shelf 51a-e is formed from cross-frame members 53a and 54a extending between aligned posts 41a and 42a respectively. Each shelf 52a-e is formed from cross-frame members 53b and 54b extending between aligned posts 41b and 42b respectively. Roller mounting plates 56 are mounted on and extend between the cross-frame members 53a and 54a and cross frame members 53b and 54b in equally spaced relation and one rail support roller 58 is rotatably mounted to and between adjacent mounting plates 56. In the embodiment shown, each roller support shelf 51a and 51b is adapted to support eight rails across its width so there are eight rollers 58 supported between nine roller mounting plates 56 on each shelf 51a and 51b. Adjacent rollers 58 are mounted in a staggered relationship to allow mounting of the ends of two roller axles on each roller mounting plate 56.

Tapered rail guides or guide flanges 60 are welded to the cross-frame members 53 to guide a rail threaded onto the tie down car 13 onto the rollers 58 and through the tie down car 13 in the proper spacing across its width. Because the embodiment shown is adapted to support eight rails across each shelf 33a-e and 34a-e, nine rail guides 60 are welded to each cross-frame member 53 generally in alignment with the nine roller mounting plates 56 to guide the rails onto associated rollers 58 between each set of guides 60.

Center roller rack stand 38 is formed on first and second sets of aligned vertical posts 47a and 47b. Three center roller support shelves 61a-c are mounted on and extend in vertical spaced alignment between posts 47a and 47b. Each shelf 61a-c is constructed in a manner similar to roller support shelves 51a-e and 52a-e and includes nine rail support rollers 62 mounted on roller mounting plates 63 supported on cross frame members 64 and 65 which are connected to and extend between the pairs of vertical posts 47a and 47b.

Each level of the roller support shelves and clamping shelves extends at the same height. For example, first and second end roller support shelves 51a and 52a, center roller support shelf 61a and clamping shelves 33a and 34a all extend at the same height and are the highest level in the embodiment shown. Similarly, first and second end roller support shelves 51e and 52e and clamping shelves 33e and 34e all extend at the same height and are the lowest level in the embodiment shown.

In the embodiment shown, only three roller support shelves 61a-c are needed to support the rails 3 as they span the gap between the aligned clamping shelves 33a-c and 34a-c respectively. The gap between aligned clamping shelves 33d and e and shelves 34d and e is sufficiently narrow that additional support therebetween is not necessary. A generally accepted length for unsupported rail to prevent sagging is approximately thirty feet.

In the embodiment shown, each clamp stand shelf 33a-e and 34a-e includes or supports four rail clamp assemblies 30 for supporting four of the eight rails 3 on each shelf 33a-e and 34a-e. For example, clamping assemblies 30 on shelf 33a may be described as positioned to clamp onto rails r1, r3, r5 and r7 while the clamping assemblies 30 on shelf 34a are positioned to clamp onto rails r2, r4, r6 and r8. Clamp assemblies 30 corresponding to only half the rails 3 to be supported per shelf are used due to the size of the clamp assemblies 30. If clamp assemblies 30 for all of the rails 3 in each row of rails 3 were to be supported on a single clamp stand shelf, the number of rails per row would be limited to the number of clamp assemblies that could be spaced across the width of the car which is fewer than if half the clamp assemblies per row are supported on separate shelves.

As seen from a top view of the tie down car, the position of the clamp assemblies 30 on each adjacent shelf 33a-e and 34a-e may be offset. For example, in the embodiment shown, on shelf 33b, the clamp assemblies 30 are positioned to clamp onto the even rails, r2, r4, r6 and r8 and on shelf 34b the clamp assemblies 30 are positioned to clamp onto the odd rails, r1, r3, r5 and r7, which is offset from the clamp assembly positions on shelves 33a and 34a.

Figure 9:
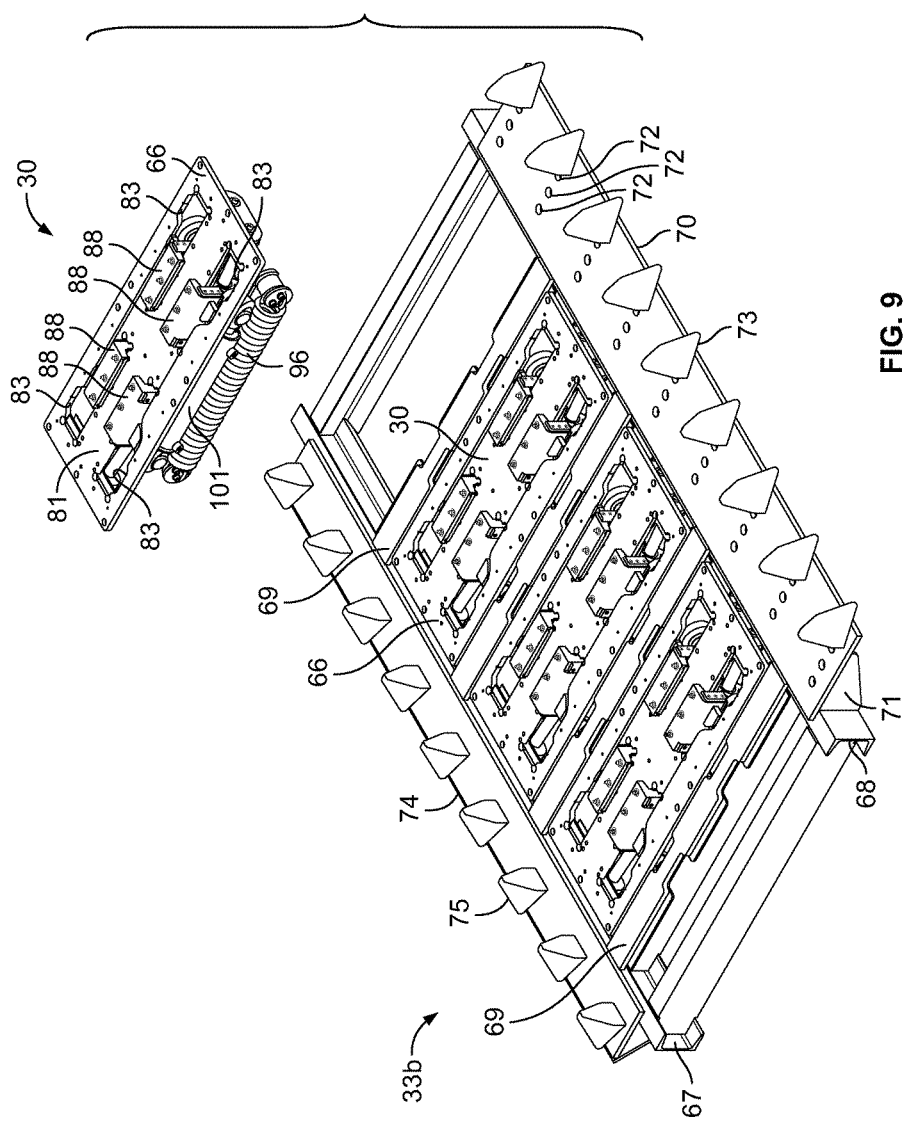
FIG. 9 is an enlarged and exploded perspective view of one of the shelves of the rail tie-down car with one of the clamping assemblies shown separated from the shelf.
Figure 10:
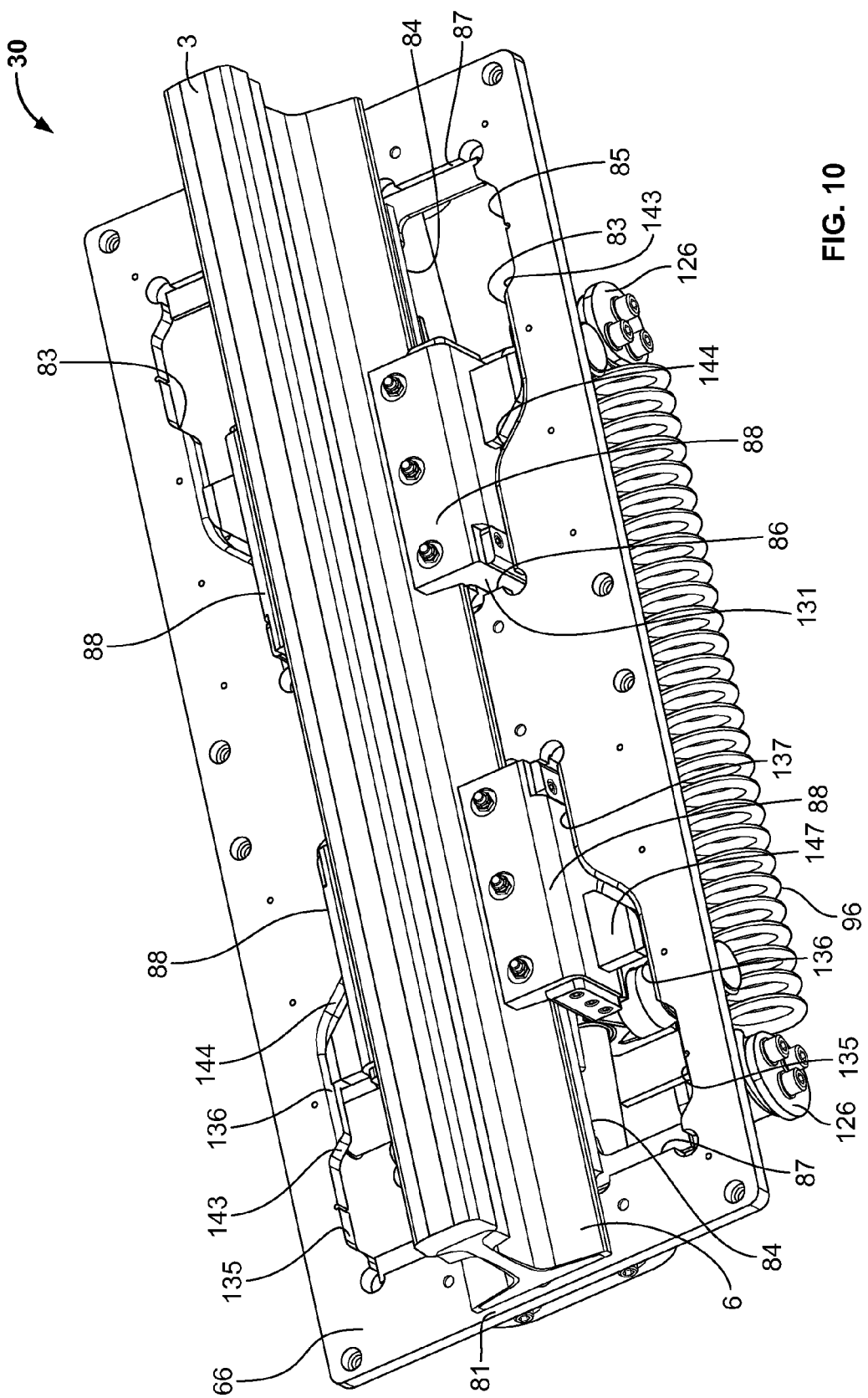
FIG. 10 is a top perspective view of the clamping assembly with a fragmentary section of rail clamped thereto.
Figure 11:
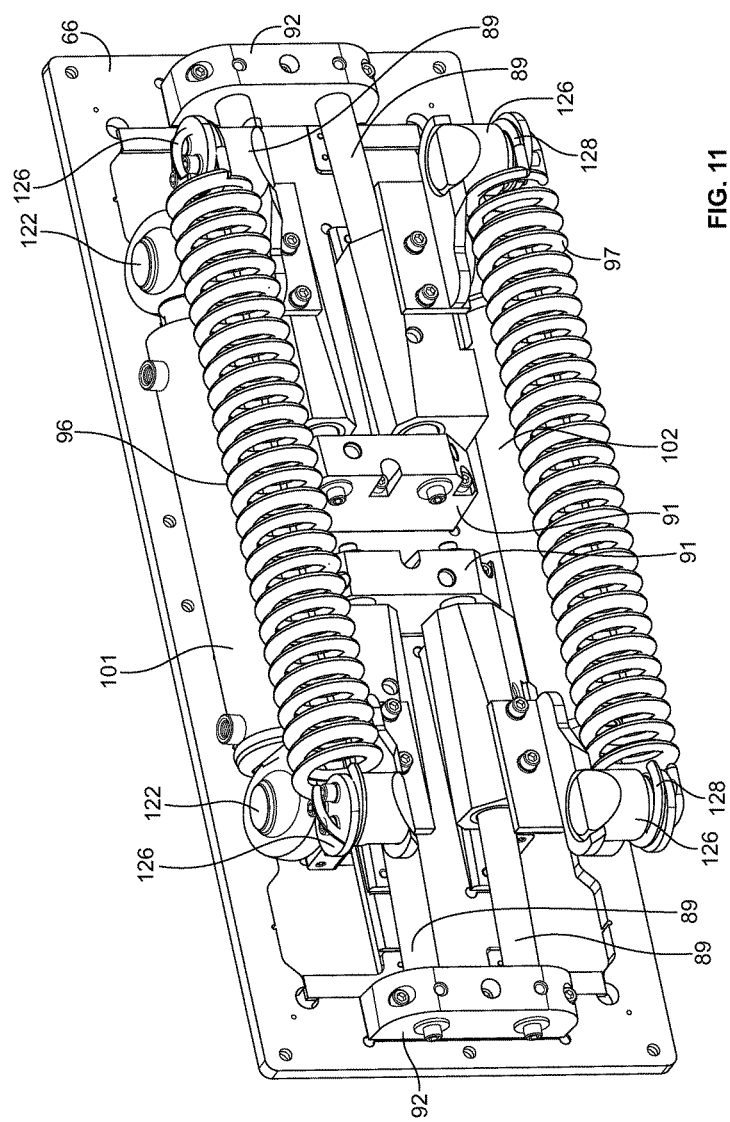
FIG. 11 is a bottom perspective view of the clamping assembly with a fragmentary section of rail clamped thereto.
Figure 14:
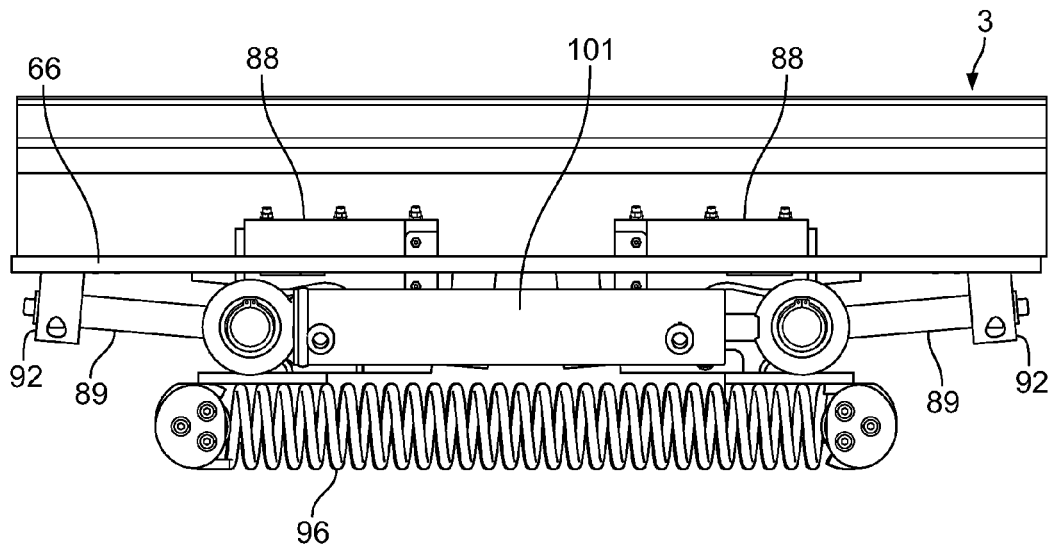
FIG. 14 is a side elevational view of the clamping assembly with a fragmentary section of rail clamped thereto viewed generally along line 14-14 of FIG. 13.

Referring to FIG. 9, each primary clamp assembly 30 includes a base plate or primary clamp plate 66 to which the rest of the components are attached. Each clamp stand shelf 33a-e and 34a-e is formed by a pair of cross-frame members or outer and inner cross-frame members 67 and 68 mounted on and extending between adjacent sets of vertical posts 42-47 (not shown in FIG. 9). A plurality of struts or clamp assembly supports 69 extend between the cross-frame members 67 and 68 in spaced apart relation to form four clamp receiving pockets per shelf. Each clamp assembly 30 is positioned in one of the pockets with the base plate 66 bolted to and extending between adjacent clamp assembly supports 69.

Auxiliary clamp plates 70 are mounted on each clamp stand shelf 33a-e and 34a-e along an inner edge thereof, adjacent to and level with the primary clamp plates 66. The auxiliary clamp plates 70 are welded to the inner cross frame members 68 and project past the cross-frame members 68 in cantilevered fashion toward the center of the tie down car 13. Gussets 71 or the like may be used to provide additional support to the auxiliary clamp plates 70. Each auxiliary clamp plate 70 includes nine sets of three bolt holes 72 extending therethrough sized to receive bolts of conventional rail clamping shoes (not shown) which can be used to clamp rails 3 to the clamp stands 31 and 32 should the hydraulic system or individual primary clamp assemblies 30 fail. The bolt holes 72 are arranged on opposite sides of the area of the plate 70 across which the rails 3 are supported. Tapered rail guides 73 are welded to the auxiliary clamp plate 70 in line with the aligned sets of bolt holes 72 and with the rail guides 61 on the associated roller support shelves 51a-e and 52a-e.

An outer guide plate 74 is welded to the outer cross-frame member 67 of each clamp stand shelf 33a-e and 34a-e, adjacent to and level with the primary clamp plates 66. A plurality of tapered rail guides 75, nine in the embodiment shown, are welded to each outer guide plate 74 in equally spaced relation and corresponding to the spacing of rail guides 61 on the associated roller support shelves 51b-e and 52b-e. No rail guides 75 are welded to the outer guide plate 74 of shelves 33a and 34a because these shelves are sufficiently close to roller support shelves 51a and 52a that additional guides are not needed.

Referring again to FIGS. 6 and 7, four rail support channels 77b-e extend between each roller support shelf 51b-e and each aligned clamping shelf 33b-e in alignment with the clamp assemblies 30 supported on the respective clamping shelf 33b-e. Similarly four rail support channels 78b-e extend between each roller support shelf 52b-e and each aligned clamping shelf 34b-e in alignment with the clamp assemblies 30 supported on the respective clamping shelf 34b-e. The rail support channels 77b-e and 78b-e are supported on cross-frame members 67 and 68 and open upward. The rail support channels 77b-e and 78b-e function to support the rails 3 against downward deflection as they are threaded from the roller support shelves 51b-e and 52b-e to the clamping shelves 33b-e and 34b-e; and to further help guide the rails 3 into the corresponding clamp assembly 30.

Referring again to FIGS. 9-20, the base plate 66 of each clamp assembly 30 includes a longitudinal receiving section 81 on which the base flange 6 of the respective rail 3 rests. Four elongate clamp slots 83 are formed through the base plate 66 adjacent to the receiving section 81, with a pair of the clamp slots 83 positioned on each side of the receiving section 81. Each clamp slot 83 includes inner and outer edges 84 and 85 relative to a longitudinal axis extending through the receiving section 81 and inner and outer end walls 86 and 87 relative to a lateral axis extending through the receiving section 81. Each clamp assembly 30 further comprises four clamping members or hooks 88, each slidably mounted on a guide rod or shaft 89 that is mounted below the base plate 66 with each hook 88 extending upward through a respective one of the clamp slots 83.

Each guide rod 89 is mounted to the underside of the base plate 66 by inner and outer stanchions 91 and 92 supporting inner and outer ends 93 and 94 of each guide rod 89 respectively. An outer stanchion 92 is mounted to and extends below the base plate 66 just past the outer end walls 87 of each pair of laterally aligned slots 83. Similarly an inner stanchion 91 is mounted to and extends below the base plate 66 just inside of the inner end walls 86 of each pair of laterally aligned slots 83. It is foreseen that the inner stanchions 91 could be formed as a single stanchion.

The guide rods 89 are supported on the associated inner and outer stanchions 91 and 92 such that the guide rods 89 slope upward from the inner stanchions 91 to the outer stanchions 92. Each guide rod 89 generally extends parallel to and below the inner edge 84 of each clamp slot 83 generally along the full length of the slot 83.

Tension springs 96 and 97 function as clamping means and are connected between longitudinally adjacent hooks 88 to normally draw the hooks 88 toward the inner end wall 86 of each slot 83 which corresponds to a closed or clamping position of the hooks 88 relative to the associated rail 3. Two springs, one nested within the other may be used to increase the spring force acting on the hooks 88. Double acting hydraulic actuators 101 and 102 are connected on opposite ends to longitudinally adjacent hooks 88 and function as release means. More specifically, the actuators 101 and 102 are operable to drive adjacent hooks 88 outward against the biasing force of the springs 96 and 97 from a clamping position proximate the inner end wall 86 of each slot 83 to an open position, at the opposite end of the slot 83 proximate the outer end wall 87 and for drawing the longitudinally adjacent hooks 88 back to the clamping position. As described, the actuators 101 and 102 may be described as remotely providing both the release and the clamping functions.

The springs 96 and 97 function to hold the hooks 88 in the clamping position once a pump (not shown) for supplying hydraulic fluid to the actuators 101 and 102 is shut-off, such as during transport of the rails 3 on the train 1, which may take days or weeks. It is to be understood that different types of actuators other than the hydraulic actuators 101 and 102 might be utilized, including pneumatic actuators or solenoids. The actuators shown are linear actuators, but it is foreseen that other types of actuators, mechanisms or linkages may be used for acting on and moving the hooks 88 remotely.

Wedges 105 mounted to the underside of the base plate 66 in alignment with the guide rods 89 and sloping downward toward inner ends thereof, act on the hooks 88 to urge the hooks 88 downward and into clamping engagement with the feet 8 and 9 of the rail base flange 6 as the hooks 88 are drawn inward by the springs 96 and 97.

Each clamping member or hook 88 includes a generally tubular guide sleeve or hub 111, a shank 112 projecting outward from and generally tangential to the hub 111 and a clamping flange 113 which is positioned at an upper end of the shank 112. The clamping flange 113 extends perpendicularly inward from the shank 112 and over the guide sleeve 111 in spaced relation thereto. An axis of each guide sleeve 111 extends at an acute angle relative to the clamping flange 113 such that an inner end 116 of the guide sleeve 111 is lower or spaced further away from the clamping flange 113 than its outer end 117.

A sloping gap 119 is thereby formed between the guide sleeve 111 and the clamping flange 113 of each hook 88. The gap 119 opens inward toward the base plate longitudinal receiving section 81 and is wider at the inner end 116 than the outer end 117 of the guide sleeve 111. The angle formed between the clamping flange 113 and guide sleeve 111 of each hook 88 corresponds to the angle or downward slope of the wedge 105 toward the inner end wall 86 of each slot 83. The gap 119 between the guide sleeve 111 and clamping flange 113 is sized to receive at least a portion of the wedge 105 so that as the hook 88 is drawn inward by the springs 96 or 97 toward the clamping position, movement of the upper surface of the guide sleeve 111 along the lower surface of the wedge 105 draws the hook clamping flange 113 down and against the rail flange foot 8 or 9.

An actuator mount 122 is formed on and projects outward from an outer surface or rear face 123 of each hook 88. In the embodiment shown the actuator mounts 122 comprise mounting studs which project outward from the guide sleeve 111 proximate the outer end 117 thereof. It is foreseen that the mounts 122 could comprise other structure, such as devises or the like. Eyelet connectors 124 formed on each end of the actuators 101 and 102 are used to connect the actuators 101 and 102 to the respective actuator mounts 122 on the hooks 88. The eyelet connectors 124 preferably are of a type having a semi-spherical bearing or ball joint to allow freedom of movement of the actuator end relative to the actuator mount 122.

A spring mount or mounting stud 126 is also formed on or connected to each hook 88. The spring mounts 126 are spaced below the actuator mounts 122. Hooks 128 formed on the ends of the springs 96 and 97 are used to attach the springs 96 and 97 to the spring mounts 126. Springs 96 and 97 are tension springs and normally bias or draw the hooks 88 to a retracted or clamping position. It is understood that more than one spring could be used to urge or draw the hooks 88 to the clamping position and that one end of each hook could be connected to a fixed structure such as a mounting post on the inner stanchions 91 for drawing the hooks 88 inward.

The inner edge 84 of each clamp slot 83 is relatively straight and extends parallel to an inner edge 84 of the slot 83 on the opposite side of the receiving section 81. The inner edges 84 of slots 83 generally define the outer edge of the receiving section 81. The outer edge 85 of each clamp slot 83 is contoured inward from the outer end wall 87 to the inner end wall 86 so that the slot is narrower proximate the inner end wall 86 than near the outer end wall 87. The edge of said base plate 66 forming the outer edge 85 of each slot 83 functions as a guide and is engaged by an inner edge 131 and a rear face 123 of the hook 88 extending through the slot 83 to cause the hook 88 and its clamping flange 113 to pivot inward about the respective rail guide 77 as the hook is drawn by the springs 96 or 97 to the clamped position and to allow the hook 88 and clamping flange 113 to pivot outward to an open position and spaced, away from a rail 3 supported on the receiving section 81 of the clamp base plate 66.

Referring to FIG. 16, each clamp slot 83 includes a wide portion 135 proximate the respective outer end wall 87, an intermediate portion 136 and a narrow portion 137 proximate the respective inner end wall 86. First and second inwardly sloping transition sections 143 and 144 extend between the wide portion 135 and the intermediate portion 136 and the intermediate portion 136 and the narrow portion 137 respectively of clamp slot 83. An edge follower 147 is mounted on the rear face 123 of each hook 88 proximate an outer end 148 thereof.

The narrow portion 137 of each clamp slot 83 is just slightly wider than the width of the hook shank 112 so that when the hook 88 is drawn to the clamping position, the hook shank 112 is maintained in a perpendicular or vertical alignment relative to the base plate 66 and the clamping flange 113 projects over the receiving section 81 and over one of the feet 8 or 9 of the rail base flange 106. When the hook 88 is driven outward toward the outer end wall 87 of the slot 83 so that the hook 88 is positioned in the wide and intermediate portions 135 and 136 of the slot 83, the hook 88, including the clamping flange 113 can pivot away from the receiving section 81 to an open alignment.

Because the actuators 101 and 102 are connected to and supported outward from the rear faces 132 of longitudinally aligned pairs of hooks 88 and the springs are similarly spaced outward from the rear face of the hooks 88, the weight of the actuators 101 and 102 causes the hooks 88 to pivot to an open alignment as the hooks 88 are moved into the intermediate and wide portions 136 and 135 of the slots 83. Stated differently, the center of mass of each hook 88 and the spring 96 or 97 and actuator 101 or 102 connected thereto, is spaced outward from the axis of the hook hub 111 causing the hook 88 to pivot outward about the guide rod 89 to which it is attached as the hook 88 is moved into the intermediate and wide portions 136 and 135 of the slots. It is noted that the wide portion 135 of the slot 83 is wider than the distance from an inner face of the hook shank 112 and an outer edge of the edge follower 147 such that when the edge follower 147 is advanced into the wide portion 135 of the slot 83 as the hook 88 is advanced outward, the hook 88 can then pivot outward. A hook opening guide member 151 (shown only in FIG. 12) presenting an outwardly sloping edge 152 may be mounted to the base plate 66, adjacent a corner between the outer end wall 87 and the inner edge 84 of the slot 83, to force a hook 88 to pivot outward as it is driven toward the end wall 87 and against the guide member 151, to ensure that the hooks 88 are advanced to an open alignment.

When the hooks 88 are in the open position discussed above, an inner end 131 of the hook 88 is positioned in the intermediate portion 136 of the slot 83 and the edge follower 147 is in the wide portion 135 of the slot 83. As each hook 88 is drawn toward the inner end wall 86, the inner end 131 of the hook 88 engages the portion of the base plate 66 forming the inner or second transitions section 144 of the slot 83 causing the hook 88 to pivot inward as the hook 88 is driven further toward the inner end wall 86 of slot 83. As the hook 88 pivots inward, the edge follower 147 on the hook shank 112 is pivoted upward into alignment with the intermediate portion 136 of the clamp slot 83. As the hook inner end 131 is advanced into the narrow portion 137 of the slot 83, the edge follower extends adjacent the portion of the base plate 66 forming the intermediate portion 136 of the slot 83 to urge the outer end 148 of the hook 88 toward the inner edge 84 of the slot 83. By holding the outer end 148 of the hook 88 toward the inner edge 84 of slot 83 the edge follower 147 helps ensure that the clamping flange 113 engages and clamps against the respective foot 8 or 9 of the rail base flange 6 along the entire length of the clamping flange 113.

Figure 15:
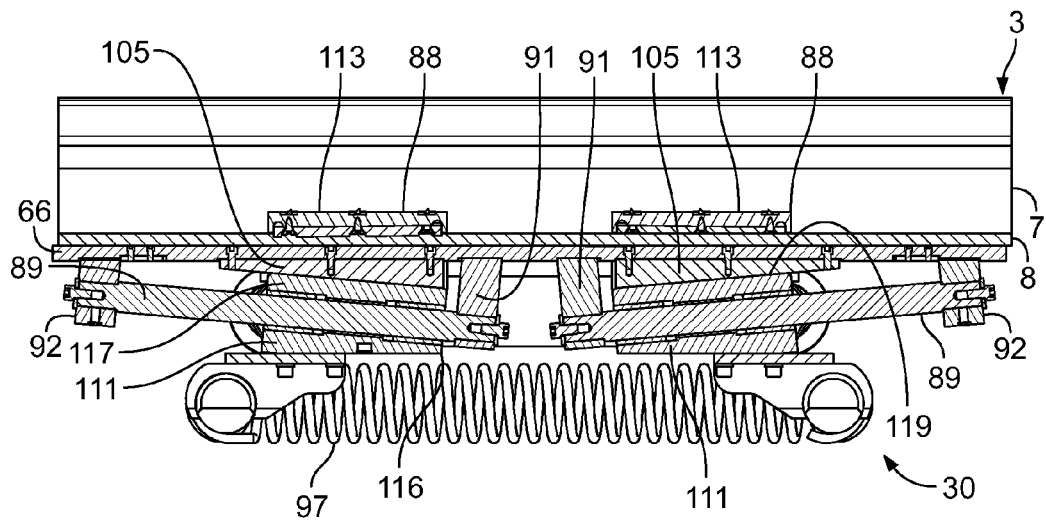
FIG. 15 is a cross-sectional view of the clamping assembly with a fragmentary section of rail clamped thereto taken along line 15-15 of FIG. 13.
Figure 18:
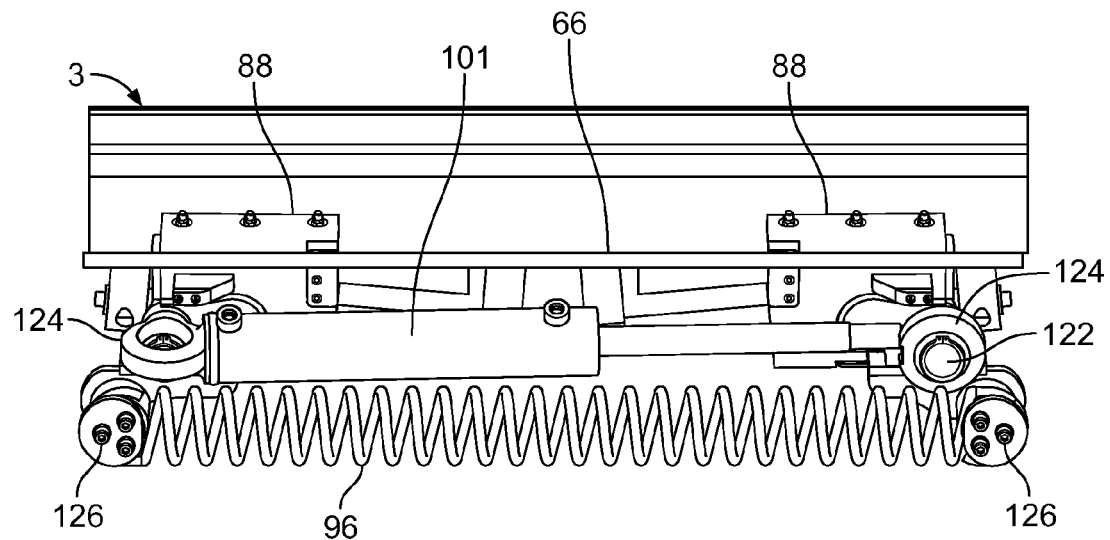
FIG. 18 is a side elevational view of the clamping assembly in an unclamped alignment with a fragmentary section of rail supported thereon viewed generally along line 18-18 of FIG. 17.

Referring to FIG. 15, it is seen that as each hook 88 is drawn inward, from the wide portion 35 of the slot 83 toward the inner end wall 86 of the slot 83, an upper surface of the hook hub 111 engages a lower, inwardly and downwardly sloping surface of the wedge 105, forcing the hook 88, including the clamping flange 113 downward as the hook 88 is drawn further inward toward the inner end wall 86 of the slot 83. The hook 88 is drawn downward until an inner surface of the clamping flange 113 engages the upper surface of one of the feet 8 or 9 of a rail 3 positioned on the rail receiving section 81 of the base plate 66.

Figure 19:
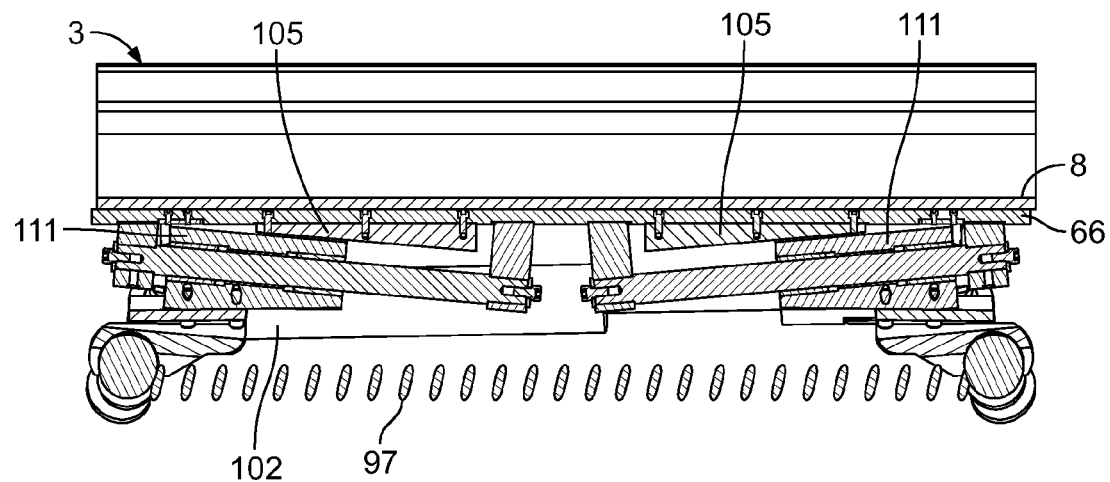
FIG. 19 is a cross-sectional view of the clamping assembly in an unclamped alignment with a fragmentary section of rail supported thereon taken along line 19-19 of FIG. 17.
Figure 20:
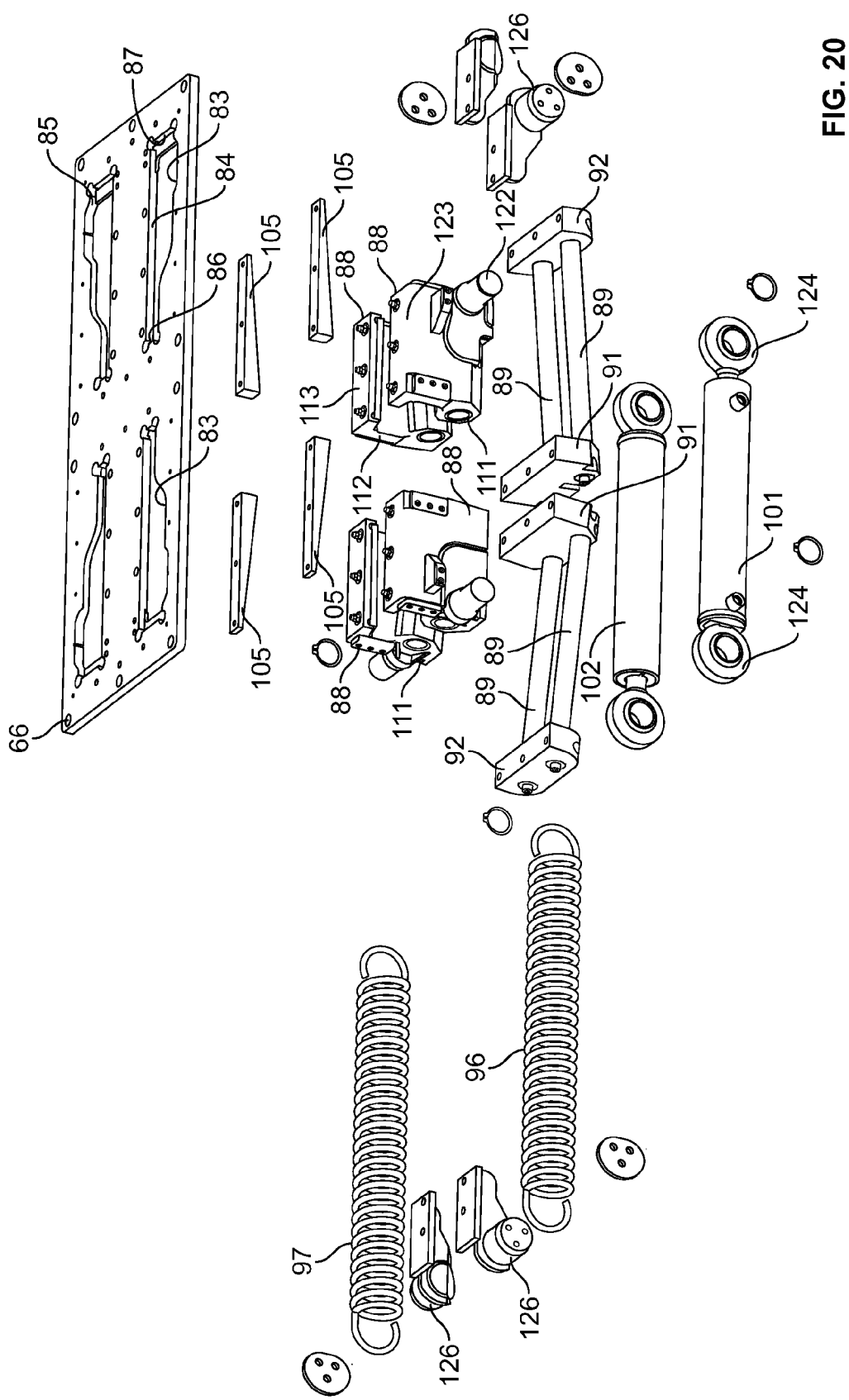
FIG. 20 is an exploded perspective view of the clamping assembly.

As seen in FIGS. 15 and 19, the wedges 105 associated with longitudinally adjacent slots 83 and hooks 88, slope downward toward each other. Once a rail 3 is clamped in place by the longitudinally adjacent hooks 88, the rail is restrained from sliding longitudinally in either direction by the oppositely acting wedges 105. For purposes of discussing the action of the clamp assembly 30 and with reference to FIG. 15, the left side of the drawing will be considered to be extending to the rear of a train and the right side of the drawing will be considered extending toward the front of the train. If the rail 3 is urged to the right or front of the train, the hook 88 on the left or rear side will be drawn to the right or forward against the downwardly sloping left side wedge 105 further increasing the downward clamping action of hook clamping flange 113 on the rail foot 8 and further resisting forward movement of the rail 3 relative to the clamping assembly 30. If the rail 3 is urged to the left or rear of the train, the hook 88 on the right or front side will be drawn to the left or rearward against the downwardly sloping right side wedge 105 further increasing the downward clamping action of hook clamping flange 113 on the rail foot 8 and further resisting rearward movement of the rail 3 relative to the clamping assembly 30. Bearing surfaces of the hooks 88 preferably are formed from brass or other material that facilitates the release of the hook 88 from clamping engagement with the associated wedge 105.

Figure 21:
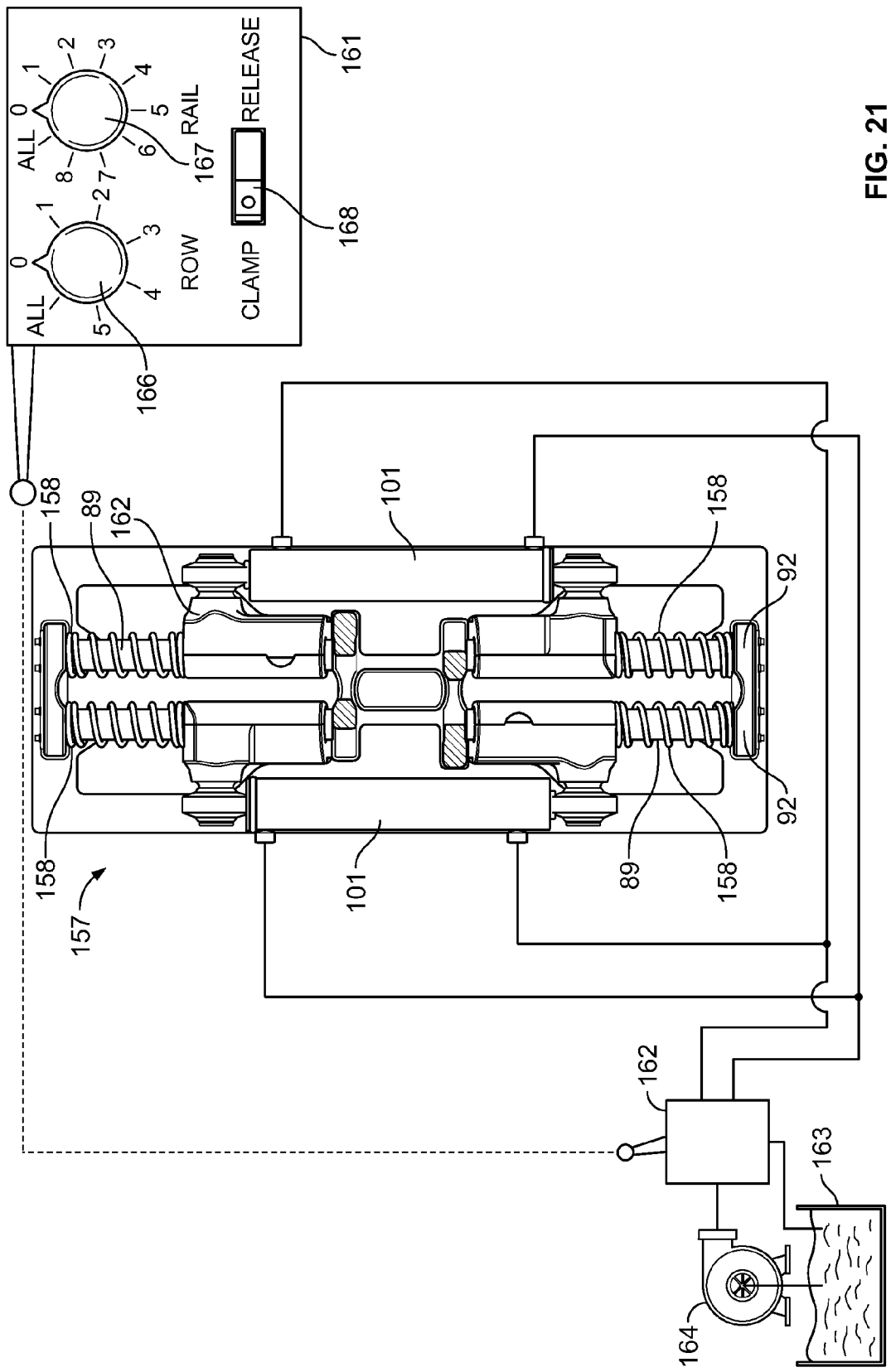
FIG. 21 is a bottom plan view of an alternative embodiment of the clamping assembly with a control system for the clamping assembly shown schematically.

FIG. 21 shows an alternative embodiment of a clamp assembly 157 which is similar in construction to clamp assemblies 30, except that compression springs 158 are used for urging modified hooks or clamp members 159 into clamping engagement with a rail supported on the rail support base 66. Hooks 159 are similar in construction to hooks 88 except that hook mounts 126 are not necessary and therefore are not formed on or included on the hooks 159. The remaining elements of the clamp assembly 157 are generally the same as for clamp assemblies 30 and are similarly numbered.

A compression spring 160 is positioned around each guide rod 89 with one end abutting against the associated hook 162 and an opposite end abutting against the outer stanchion 92 to urge the hook 162 inward toward an inner edge 84 of the clamp slot 83. The compression springs as shown function to normally bias or urge the hooks 162 into clamping engagement with a rail supported on the rail base. The actuators 101 are used to advance the hooks 162 into and out of clamping engagement with the rails, but the springs ensure the clamps will be urged into clamping engagement with a rails positioned therebetween if power (hydraulic pressure in the application shown) to the actuator is lost.

It is to be understood that compression or tension springs could be used to bias the clamp hooks into or out of clamping engagement with a rail supported on the rail base such that springs could function as either clamping means or release means acting on the clamp hooks. Similarly actuators of the type disclosed herein can be used as either clamping or release means or both acting on the clamp hooks to advance them into and out of clamping engagement with a rail supported on the rail base. Actuators other than hydraulic actuators, including pneumatic actuators, solenoids or mechanical linkages could be used to move the clamp hooks into and/or out of clamping engagement with a rail supported on the rail base to permit remote engagement and disengagement of the clamp hooks with a rail supported on the clamp base.

As used herein, reference to remote engagement or disengagement of the clamp hooks is intended describe systems that allow an operator to cause the clamping members to clamp onto or release from clamping a rail to the clamp assembly or tie down car without requiring the operator to manually position the clamping member in engagement with or remove the clamping member from engagement with the rail such as by bolting the clamping member in place or manually operating a mechanical clamping assembly for advancing the clamping member into and out of engagement with the rail.

As shown schematically in FIG. 21, a radio controller 161 communicates with a valve assembly 162, controlled by the controller 161, to control the flow of hydraulic fluid between the double acting hydraulic actuators 101 and a hydraulic fluid reservoir 163 and through pump 164. The controller 161 includes means for selecting the valve assembly or assemblies 162 associated with one or more clamp assemblies, such as clamp assemblies 158 or 30 to cause the clamp assembly to clamp one or more rails to the tie down car or release selected clamp assemblies from clamping engagement with the associated rails. The schematic diagram of controller 161 shows a row selection knob 166, a rail selection knob 167 and toggle switch 168. The row selection knob 166 is used to select the horizontal row of rails for which the clamp hooks are to be advanced into or out of clamping engagement with associated rails. The rail selection knob 167 is used to select the position of the rail in the selected row for which the clamp hooks are to be advanced into or out of clamping engagement therewith. The toggle switch 168 is then used to control whether the clamp members are advanced into or out of clamping engagement with the associated rail. As shown the rail selection knob 167 includes a setting to allow control of all of the clamping assemblies in a single row simultaneously. Similarly the row selection knob 166 may include a setting to allow control of all of the rows of clamping assemblies simultaneously.

It is to be understood that other types of controllers or control panels could be utilized. For example, the control panel could be a digital interface with a digital display and conventional electronic selection systems for selecting the desired clamping assemblies to be actuated. Such a system could permit greater variability in the clamping assemblies actuated. For example, such a controller might allow an operator to simultaneously release the clamping assemblies for two or more rails in the same or different rows. It is also foreseen that the controller could have a separate toggle type switch for each clamping assembly on the tie down car or cars 13. It is also to be understood that the connection between the controller 161 and the valves 162 could be a hard wired electrical connection or conventional hydraulic or pneumatic control systems which allow remote control of the clamping assemblies without an operator to have to climb onto the tie-down car to engage or disengage the clamping assemblies.

Figure 22:
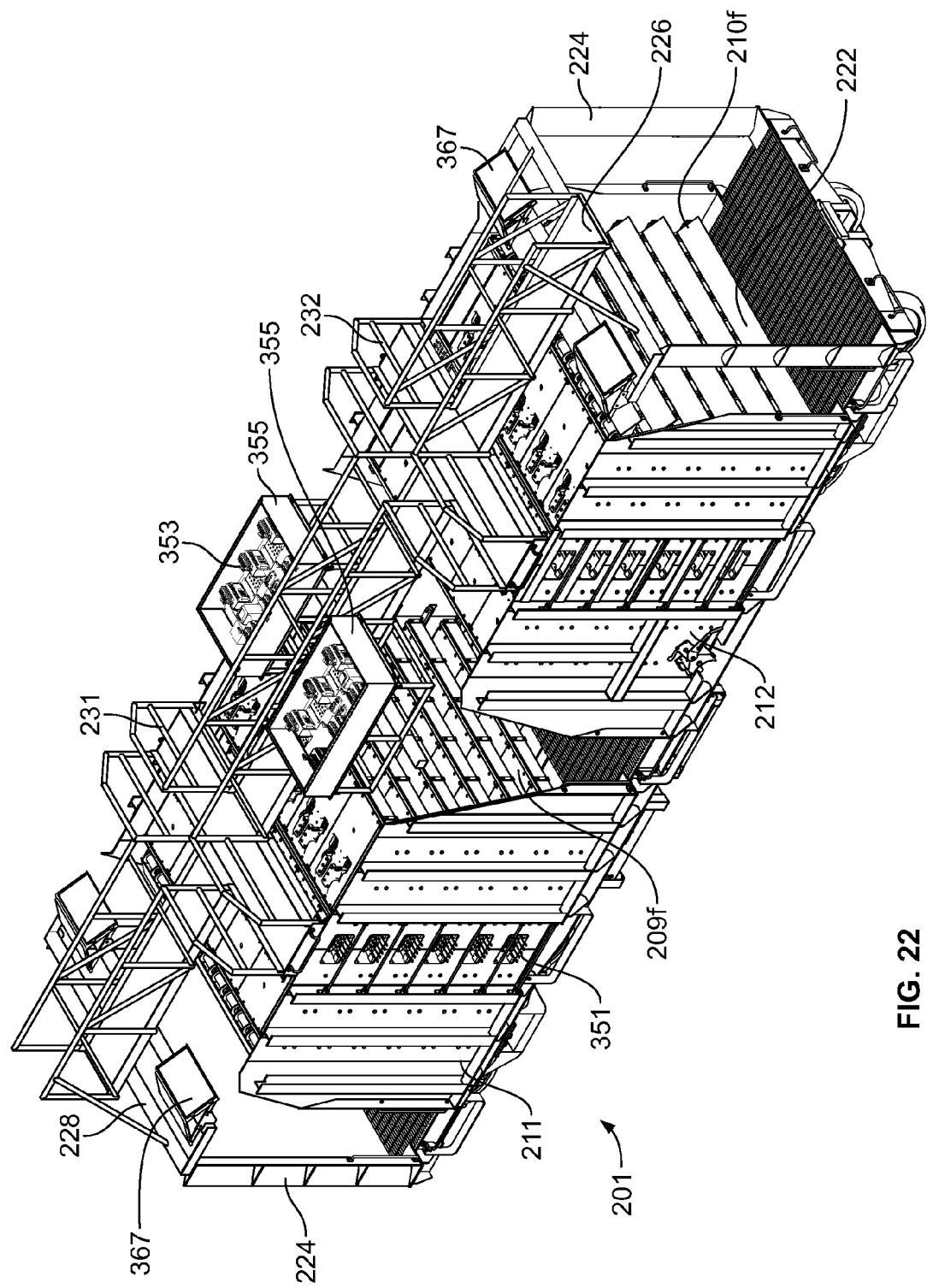
FIG. 22 is a perspective view of an alternative embodiment of a rail tie-down car.
Figure 23:
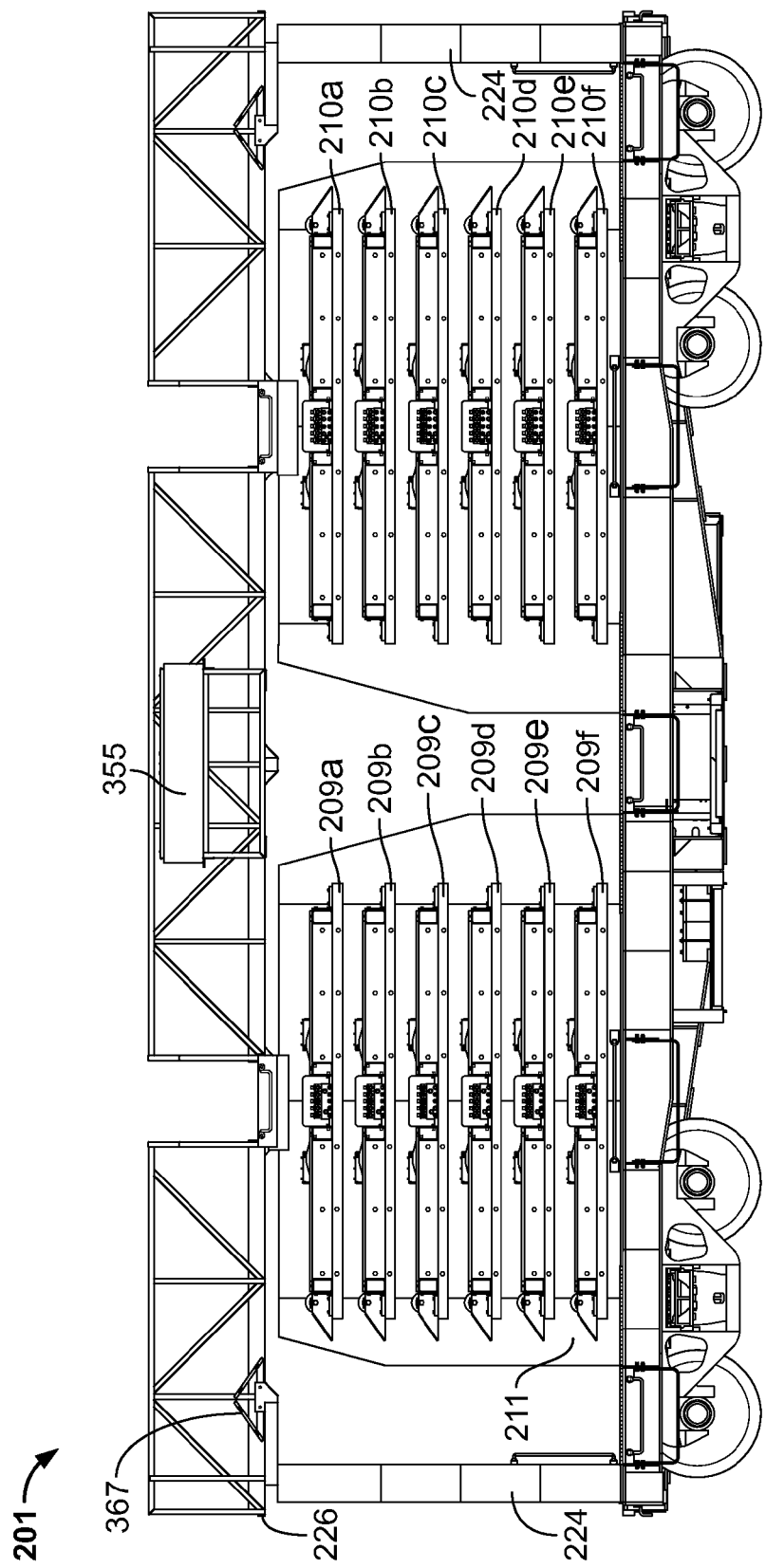
FIG. 23 is a side elevational view of the rail tie-down car with portions removed to show a plurality of shelves each supporting a plurality of clamp assemblies.
Figure 24:
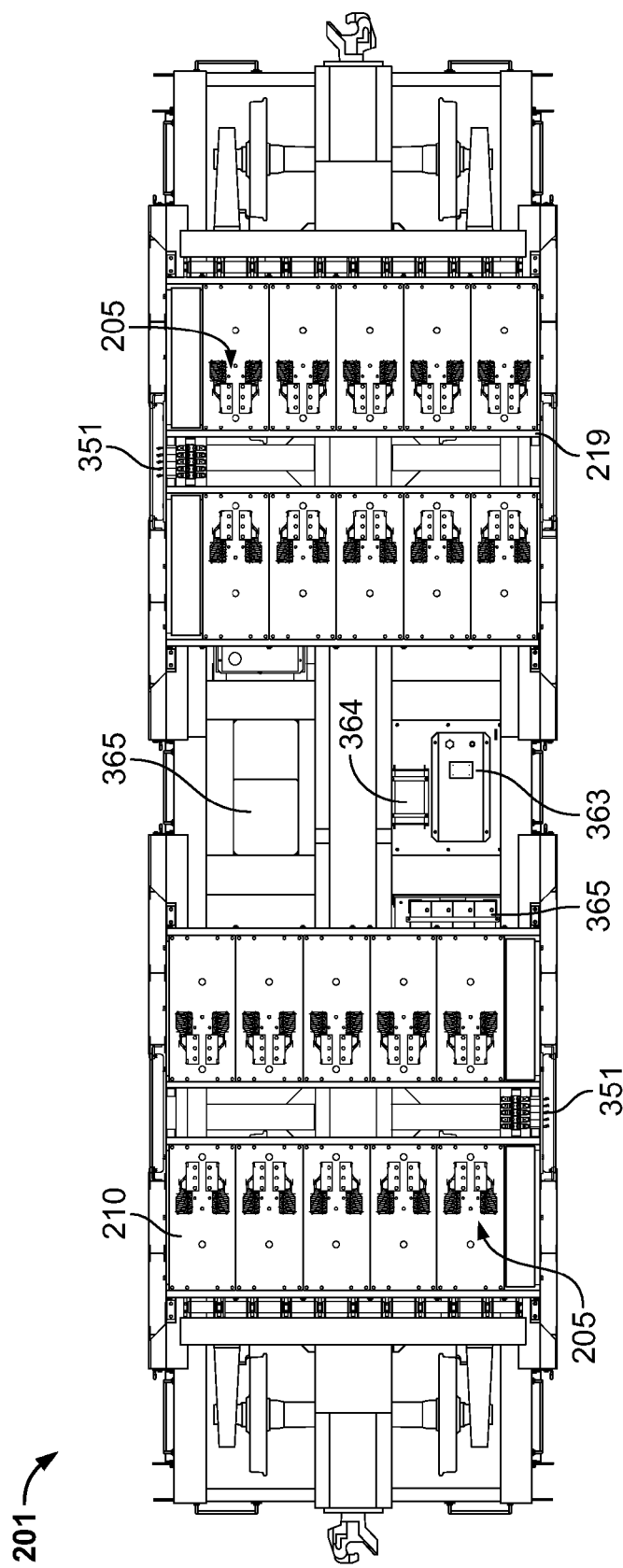
FIG. 24 is a top plan view of the rail tie-down car with portions removed to show detail.
Figure 25:
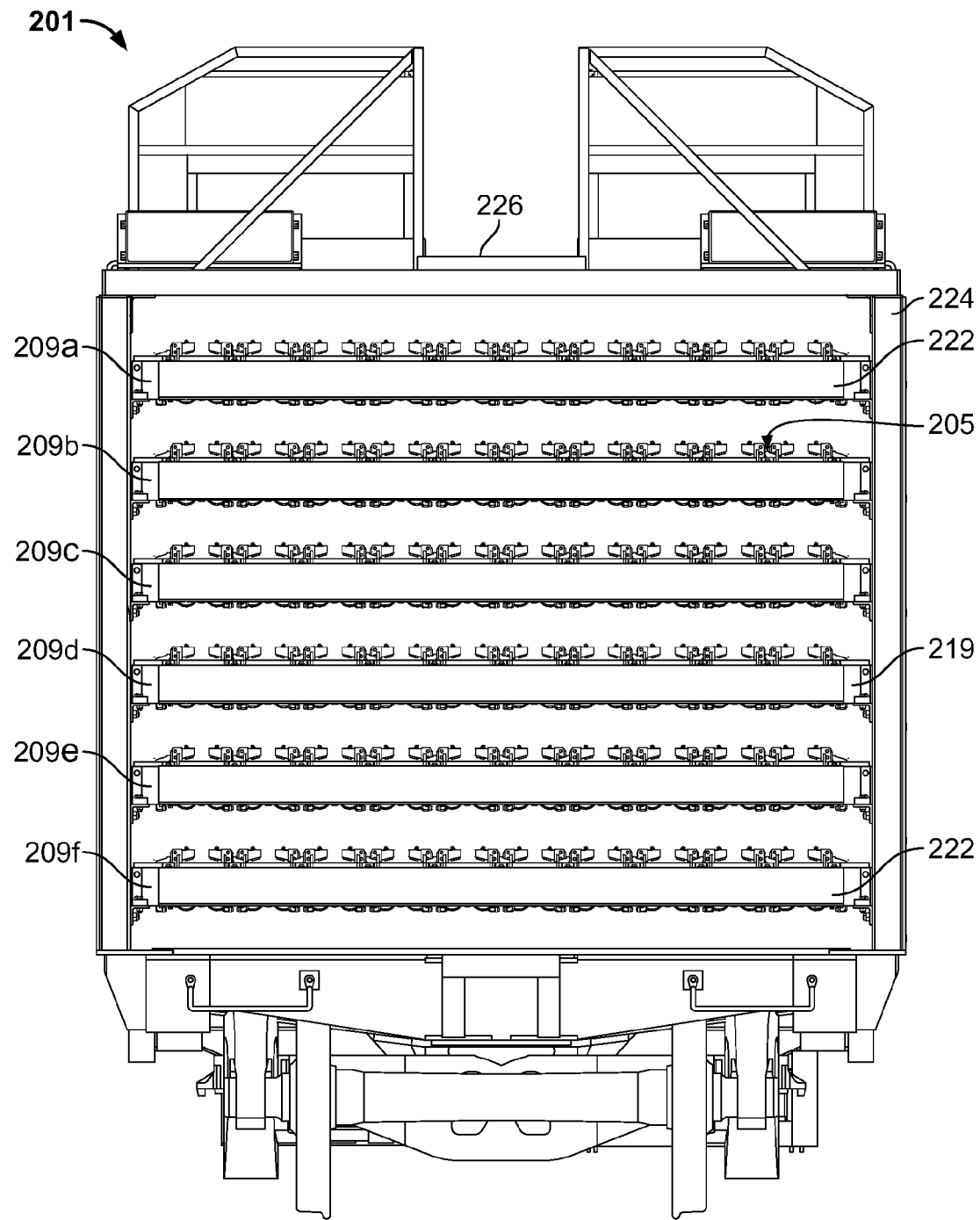
Figure 26:
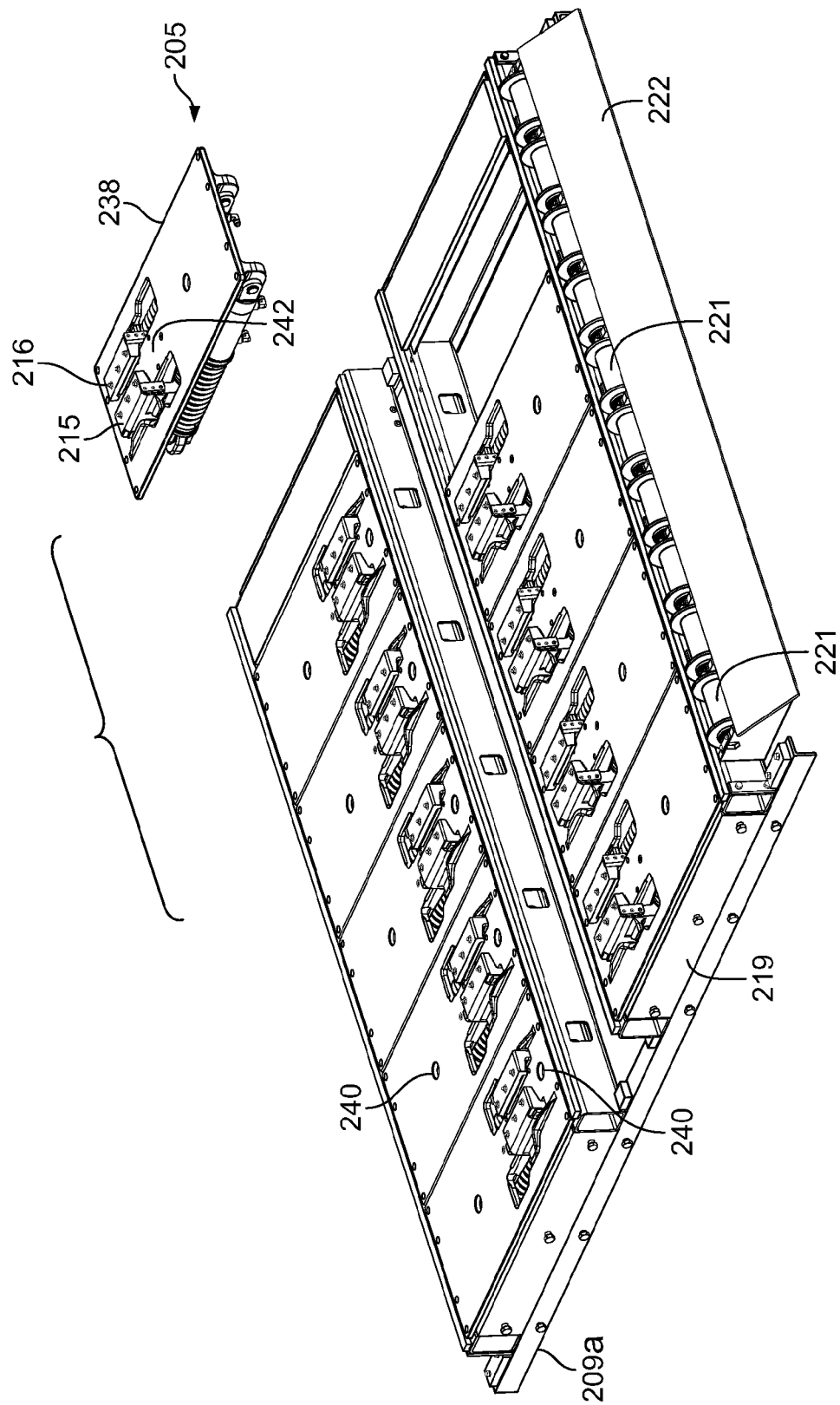
FIG. 26 is an enlarged and exploded perspective view of one of the shelves of the rail tie-down car with one of the clamping assemblies shown separated from the shelf.
Figure 27:
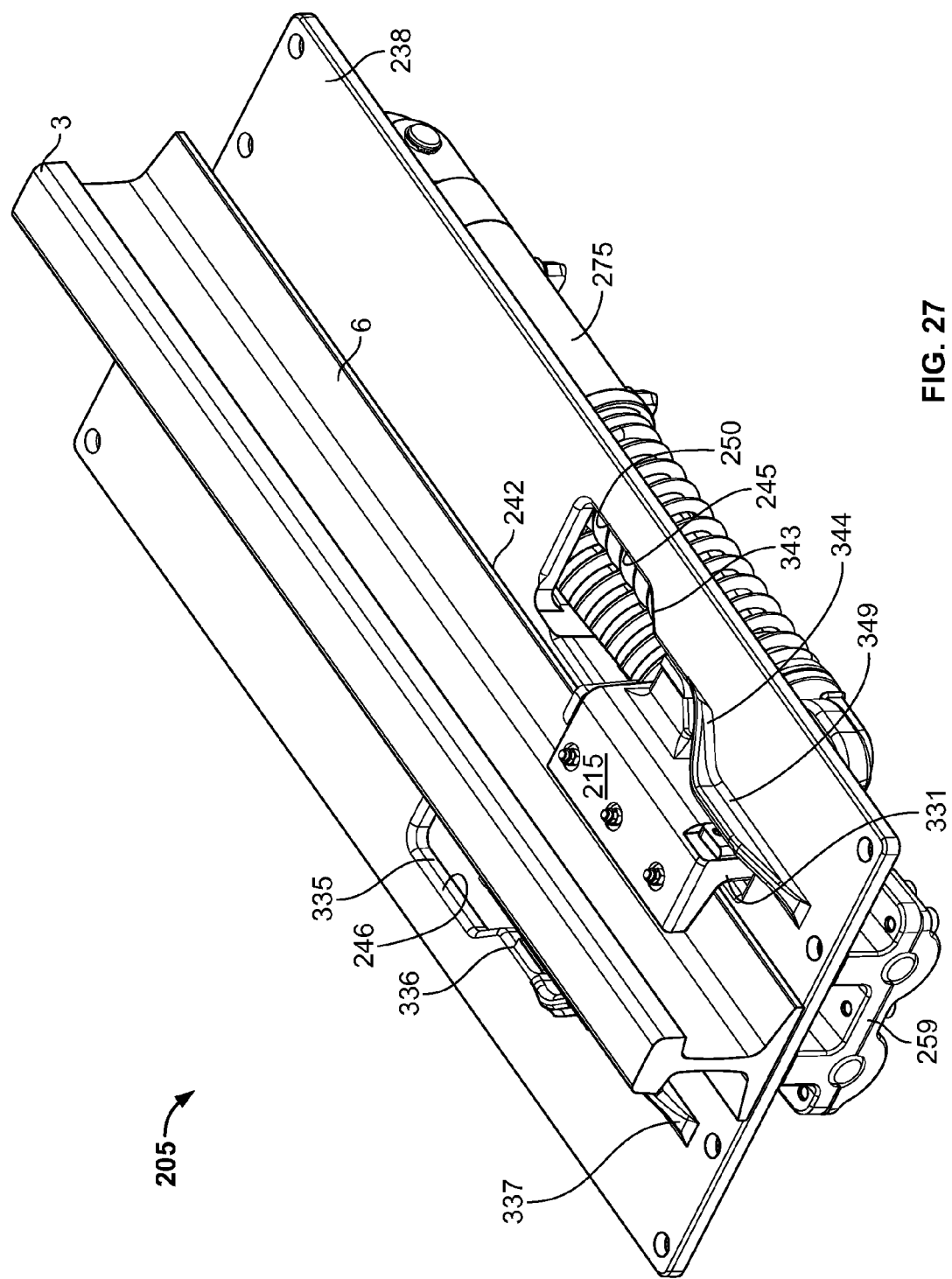
FIG. 27 is a top perspective view of the clamping assembly with a fragmentary section of rail clamped thereto.

FIGS. 22 through 25, disclose an alternative embodiment of a tie down car 201 including a plurality of alternative clamp assemblies 205 mounted on shelves 209a-f and 210a-f on clamp stands 211 and 212 respectively. The clamp assemblies 205 clamp the ribbon rails 3 to the clamp stands 211 and 212 and to the train 1. Each clamping assembly 205 includes a pair of opposed clamping members or hooks 215 and 216 for engaging opposed feet 8 and 9 of the base flange 6 of a rail extending therebetween. Two clamp assemblies 205, oriented in axial alignment but in opposite directions on the clamp stands 211 and 212 are used to secure each rail 3. The aligned pairs of clamping assemblies 205 may be positioned on a single shelf on one of the clamp stands 211 or 212 as shown in FIGS. 24 and 26, or one of each pair of aligned clamping assemblies 205 on separate shelves on the spaced apart clamp stands 211 and 212 respectively. Each pair of longitudinally aligned clamp assemblies 205 may also be referred to as a clamp, clamp assembly or clamping assembly.

Each of the six shelves 209a-f and 210a-f of the clamp stands 211 and 212 generally comprises an open framework 219 for supporting the clamping assemblies 205 generally along the ends thereof. Each level of the shelves 209a-f and 210a-f extends at the same height. For example, clamping shelf 209a on clamp stand 211 extends at the same height as clamping shelf 210a on clamp stand 212. A plurality of rail support rollers 221, ten in the embodiment shown, are rotatably mounted across the outer ends of each shelf frame 219. One roller 221 on the outer end of each shelf 209a-f and 210a-f is positioned in alignment with each of the pairs of opposed hooks 215 and 216 of the clamping assemblies generally in alignment with the path of a rail 3 passing between the opposed hooks. As best seen in FIG. 26, a rail guide ramp 222 is mounted on each shelf 209a-f and 210a-f along the outer end thereof in front of the rollers 221 for guiding ends of the rails 3 being loaded onto the shelves upwards and onto the rollers 221.

In the embodiment shown, with aligned pairs of clamping assemblies 205 on the same clamp stand 211 or 212, the aligned pairs of clamping assemblies 205 on shelves 209a-f of clamp stand 211 are used to clamp onto or secure a first half of the rails 3 to the tie-down car 201 and the aligned pairs of clamping assemblies 205 on shelves 210a-f of clamp stand 212 are used to clamp onto or secure a second half of the rails 3 to the tie-down car 201. Each clamp stand shelf 209a-f and 210a-f, of the embodiment shown, includes or supports five pairs of rail clamp assemblies 205 for supporting five of the ten rails 3 on each shelf 209a-f and 210a-f For example, the pairs of clamping assemblies 205 on shelf 209a may be described as positioned to clamp onto the first, third, fifth and ninth rails supported on each shelf and which may be referred to as rails r1, r3, r5, r7 and r9 while the clamping assemblies 205 on shelf 210a are positioned to clamp onto the second, fourth, sixth, eighth and tenth rails supported on each shelf which may be referred to as rails r2, r4, r6, r8 and r10.

Rail guide posts or funnel members 224 project upward from the corners of the down car 201 and help funnel rails 3 therebetween. A catwalk 226 extends the length of the down car 201 and is supported above the clamp stands 211 and 212 by a framework 228. Lateral catwalk sections 231 and 232 extend across the width of the tie down car 201 and generally centered above the clamp stands 211 and 212 respectively.

Referring to FIGS. 26-38, each clamp assembly 205 includes a base plate or clamp plate 238 to which the rest of the components are attached. Each base plate 238 in a clamp plate assembly comprising two clamp assemblies 205 as shown may be referred to as a clamp base section or base plate section 238. In the previous embodiment, and with reference to FIG. 16, the clamp plate 66 may be described as including two separate clamp plate or base plate sections, each having a pair of opposed clamping members 88 extending therethrough. Referring back to FIG. 26, the clamp plate or clamp plate section 238 of each clamp assembly 205 is bolted to the framework 219 of the shelf 209a-f or 210a-f on which it is supported. Bolt holes or eyelet receivers 240 are formed in each clamp plate 238. Eyelets (not shown) may be secured in the bolt holes 240 of the clamp plates 238 to facilitate raising and lowering each clamp assembly 205 in place on the appropriate shelf 209a-f or 210a-f.

The base plate 238 of each clamp assembly 205 includes a longitudinal receiving section 242 on which the base flange 6 of the respective rail 3 rests. Two elongate clamp slots 245 and 246 are formed through the base plate 238 adjacent to and on opposite sides of the receiving section 242. Each clamp slot 245 and 246 is defined by inner and outer edges 249 and 250 relative to a longitudinal axis extending through the receiving section 242 and inner and outer end walls 253 and 254 extending transverse to the longitudinal axis extending through the receiving section 242. The inner end wall 253 may be referred to as a clamping end or clamping end wall and the outer end wall 254 may be referred to as a release end or release end wall. Each hook 215 and 216 is slidably mounted on a guide rod or shaft 257 and 258 respectively that is mounted below the base plate 238 with each hook 215 and 216 extending upward through a respective one of the clamp slots 245 and 246.

Each guide rod 257 and 258 is mounted to the underside of the base plate 238 by inner and outer stanchions 259 and 260 supporting inner and outer ends 263 and 264 of each guide rod 257 and 258 respectively. The inner end 263 of each guide rod 257 and 258 may be referred to as the clamping end and the outer end 264 of each guide rod 257 and 258 may be referred to as the release end. The outer stanchion 260 extends below the base plate 242 just past the outer end walls 254 of the laterally aligned slots 245 and 246. Similarly the inner stanchion 259 extends below the base plate 242 just past the inner end walls 253 of the laterally aligned slots 245 and 246.

The guide rods 256 and 257 are supported on the associated inner and outer stanchions 259 and 269 such that the guide rods 257 and 258 slope downward from the outer stanchions 260 to the inner stanchions 259. The guide rods 257 and 258 may also be described as sloping downward from the release end 253 to the clamping end of each clamp slot 245 and 246. Each guide rod 257 and 258 generally extends parallel to and below the inner edge 249 of each clamp slot 245 and 246 generally along the full length of the slot.

Compression springs 267 and 268 are mounted on and surround each guide rod 257 and 258 respectively, extending between the hook 215 and 216 mounted thereon and the outer stanchion 260. The compression springs 267 and 268 are sized to normally urge the associated clamp hooks 215 and 216 toward the clamping end 263 of each guide rod 257 and 258 and generally against the inner stanchions 259 to draw the clamp hooks 215 and 216 downward, into a clamping position, as the hooks 215 and 216 are urged toward the inner end of the clamp assembly 205. Flanged bushings 269 extend between the springs 267 and 268 and the guide rods 257 and 258 inward from the ends of the springs 267 and 268 to reduce wear and facilitate expansion and contraction of the springs 267 and 268 along the rods 257 and 258. A washer 270 is positioned around each guide rod 257 and 258 between the end of each spring 267 and 268 and the associated clamp hook 215 and 216.

Wedges 271 and 272 integrally formed on the underside of the base plate 238 in alignment with the guide rods 257 and 258 and sloping downward toward inner or clamping ends thereof, act on the hooks 215 and 216 to urge the hooks downward and into clamping engagement with the feet 8 and 9 of the rail base flange 6 as the hooks 215 and 216 are urged toward the inner or clamping end of the clamp plate 238.

Double acting hydraulic actuators 275 and 276 are connected between the hooks 215 and 216 and actuator mounts 279 and 280 depending from the clamp plate 238 near the outer or release end of the clamp plate 238. The actuators 275 and 276 are operable to draw the hooks 275 and 276, against the biasing force of the springs 267 and 268, from a clamping position proximate the clamping end wall 253 of each slot 249 and 250 to an open position, at the opposite end of the slots 249 and 250 proximate the release end walls 254 thereof. The actuators 275 and 276 are also operable to advance or drive the clamp hooks 215 and 216 back to the clamping position.

Figure 28:
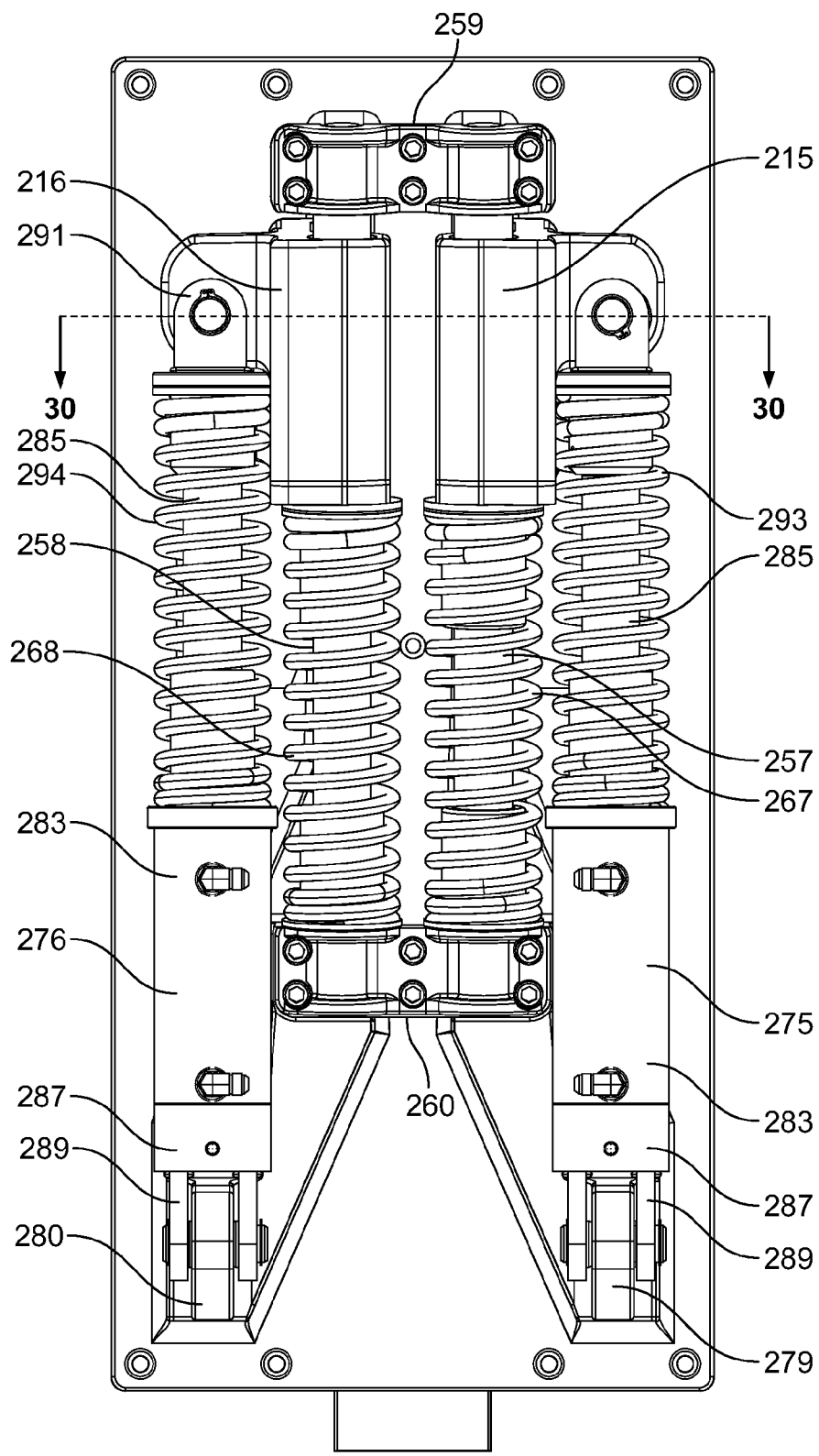
FIG. 28 is a bottom plan view of the clamping assembly with a fragmentary section of rail clamped thereto.
Figure 29:
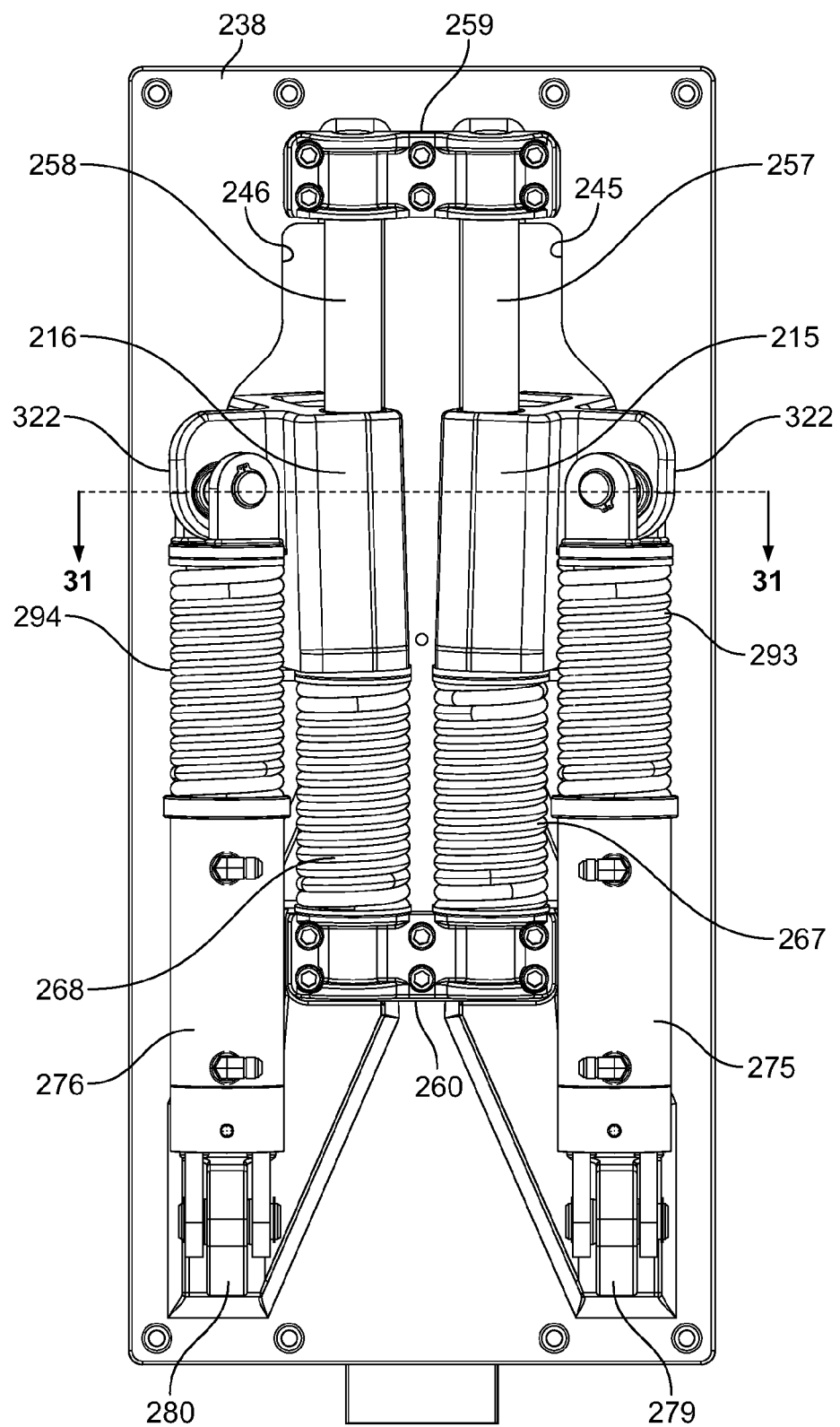
FIG. 29 is a bottom plan view of the clamping assembly with clamp hooks in an unclamped alignment.
Figure 38:
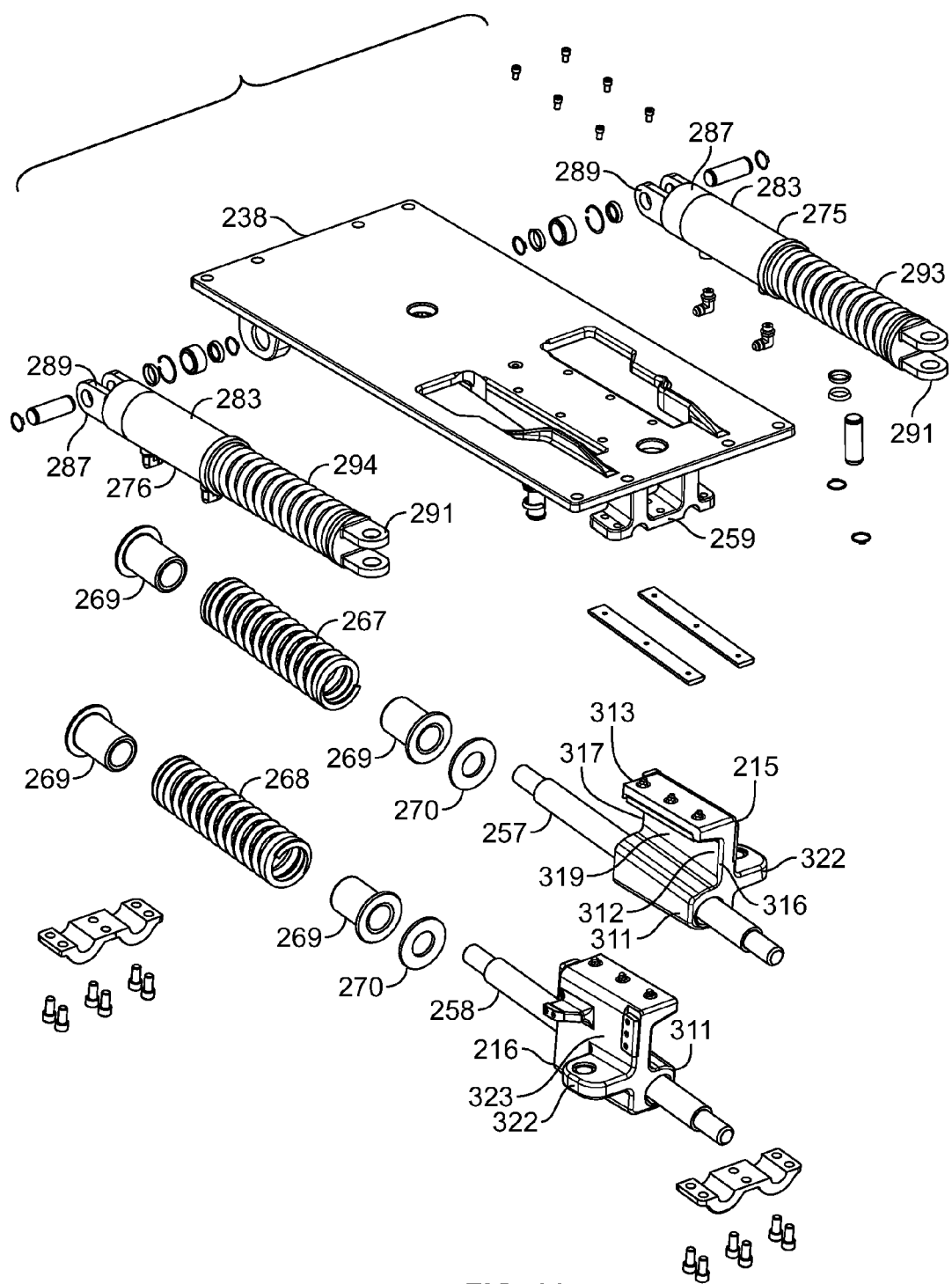
FIG. 38 is an exploded perspective view of the clamping assembly.

As best seen in FIGS. 28, 29 and 38, each actuator 275 and 276 is a conventional actuator and includes a cylinder barrel 283 in which a piston (not shown) connected to a piston rod 285 moves back and forth depending on changes in differential pressure of hydraulic fluid acting on opposite sides of the piston. A cap end or bottom 287 of each actuator barrel 283 has a clevis 289 mounted thereon for pivotally connecting the actuators 275 and 276 to the respective actuator mounts 279 and 280. A distal end of each piston rod 285 has a clevis 291 mounted thereon for pivotally connecting the piston rod 285 to the corresponding hook 215 or 216. A second set of compression springs 293 and 294 are positioned around the piston rod 285 of each actuator 275 and 276, between the piston rod clevis 294 and a head end 296 of the cylinder barrel 283. The compression springs 293 and 294 urge the associated piston rod 285 outward and the hook 215 or 216 attached thereto toward the clamping end wall 253 of the respective clamp slot 245 and 246 or as described previously, the clamping position.

Spring 267 and 293 and springs 268 and 294 function to advance and hold hooks 215 and 216 respectively in the clamping position when the supply of pressurized hydraulic fluid to actuators 275 and 276 is shut-off, such as during transport of the rails 3 on the train 1, which may take days or weeks, or if a hydraulic line supplying hydraulic fluid to either actuator 275 or 276 is severed. It is to be understood that different types of actuators other than the hydraulic actuators might be utilized, including pneumatic actuators or solenoids. The actuators shown are linear actuators, but it is foreseen that other types of actuators, mechanisms or linkages may be used for acting on and moving the hooks 215 and 216 remotely.

Each clamping member or hook 215 and 216 includes a generally tubular guide sleeve or hub 311, a shank 312 projecting outward from and generally tangential to the hub 311 and a clamping flange 313 which is positioned at an upper end of the shank 312. The clamping flange 313 extends perpendicularly inward from the shank 312 and over the guide sleeve 311 in spaced relation thereto. As best seen in FIGS. 35 and 37, an axis of each guide sleeve 311 extends at an acute angle relative to the clamping flange 313 such that a first end 316 of the guide sleeve 311 (the end opposite compression spring 267 or 268) is lower or spaced further away from the clamping flange 313 than its second end 317 (the end closest to compression spring 267 and 268).

A sloping gap 319 is thereby formed between the guide sleeve 311 and the clamping flange 313 of each hook 215 and 216. The gap 319 opens inward toward the base plate longitudinal receiving section 242 and is wider at the first end 316 than the second end 317 of the guide sleeve 311. The angle formed between the clamping flange 313 and guide sleeve 311 of each hook 215 and 216 corresponds to the angle or downward slope of the associated wedge 271 and 272 toward the inner, clamping end wall 253 of each slot 245 and 246. The gap 319 between the guide sleeve 311 and clamping flange 313 is sized to receive at least a portion of the respective wedge 271 or 272 so that as the hook 215 or 216 are urged by springs 267, 268, 293 and 294 toward the clamping end wall 253 of each slot 245 and 246 and toward the clamping position, movement of the upper surface of the guide sleeves 311 along the lower surface of the wedges 271 and 272 draws the clamping flange 313 of each hook 215 and 216 down and against the rail flange foot 8 or 9.

Figure 30:
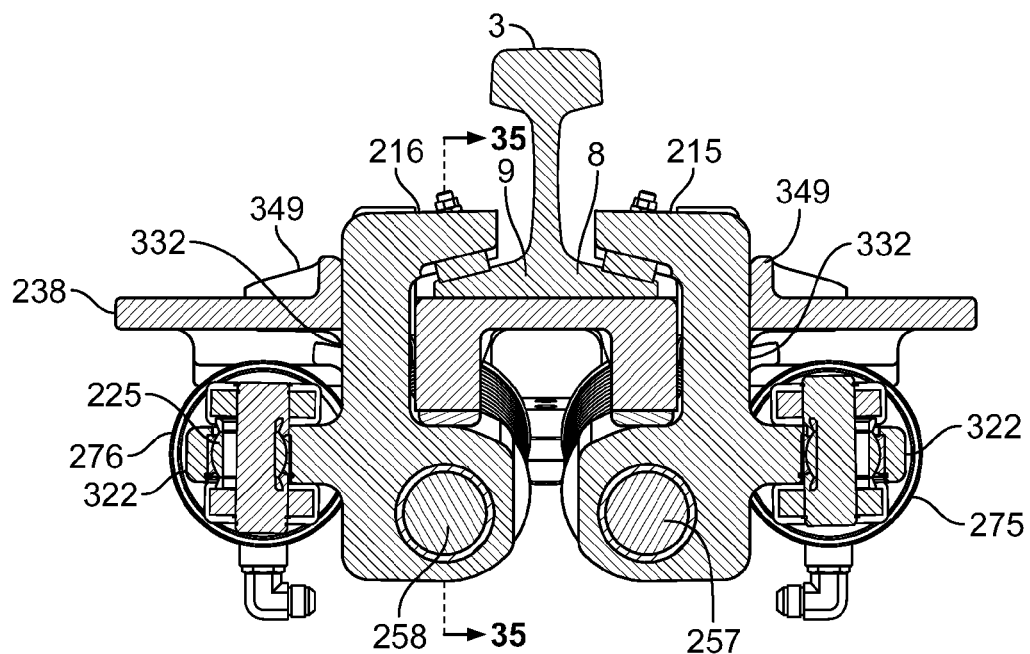
FIG. 30 is a cross-sectional view of the clamping assembly with a fragmentary section of rail clamped thereto taken along line 30-30 of FIG. 28.
Figure 31:
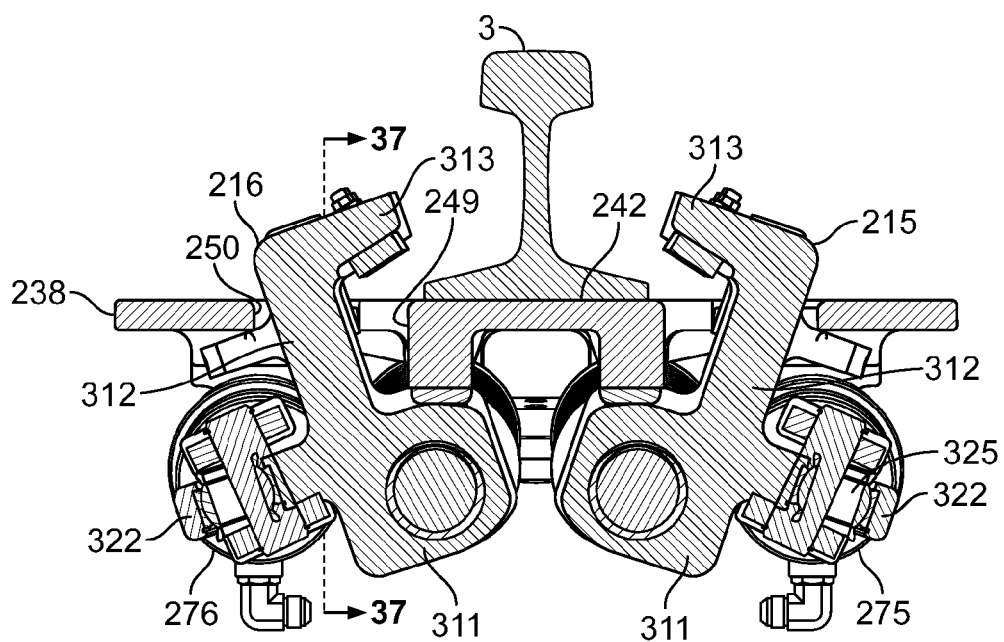
FIG. 31 is a cross-sectional view of the clamping assembly with the clamp hooks in an unclamped alignment taken along line 31-31 of FIG. 29.

As best seen in FIGS. 30, 31 and 38, an actuator mount 322 is formed on and projects outward from an outer surface or rear face 323 of each hook 215 and 216. In the embodiment shown, the actuator mounts 322 generally incorporate an eyelet and project outward, tangentially to an upper edge of the guide sleeve 311. The piston rod clevis 291 on the end of each actuator piston rod 285 is connectable to a respective actuator mount 322 on hook 215 or 216, preferably by a semi-spherical bearing or ball joint 325 to allow pivoting of the clevis 291 on piston rod 285 relative to the actuator mount 322.

The inner edge 249 of each clamp slot 245 and 246 is relatively straight and extends parallel to an inner edge 249 of the slot 245 or 246 on the opposite side of the receiving section 242. The inner edges 249 of slots 245 and 246 generally define the outer edge of the receiving section 242. The outer edge 250 of each clamp slot 245 and 246 is contoured inward from the release end wall 254 to the clamping end wall 253 so that the slot is narrower proximate the clamping end wall 253 than near the release end wall 254. The edge of the base plate 238 forming the outer edge 250 of each slot 245 and 246 functions as a guide and is engaged by a leading edge 331 and a rear face 323 of the hooks 215 and 216 extending through slots 245 and 246 to cause the hooks 215 and 216 and the clamping flange 313 thereon to pivot inward about the respective guide rods 257 and 258 as the hooks are urged by the springs 267, 268, 293 and 294 to the clamped position. The wider spacing between the outer edge 250 and inner edge 249 of each clamp slot near the release end wall thereof allows the hooks 215 and 216 and clamping flange 313 to pivot outward to an open position and spaced, away from a rail 3 supported on the receiving section 242 of the clamp base plate 238.

Figure 32:
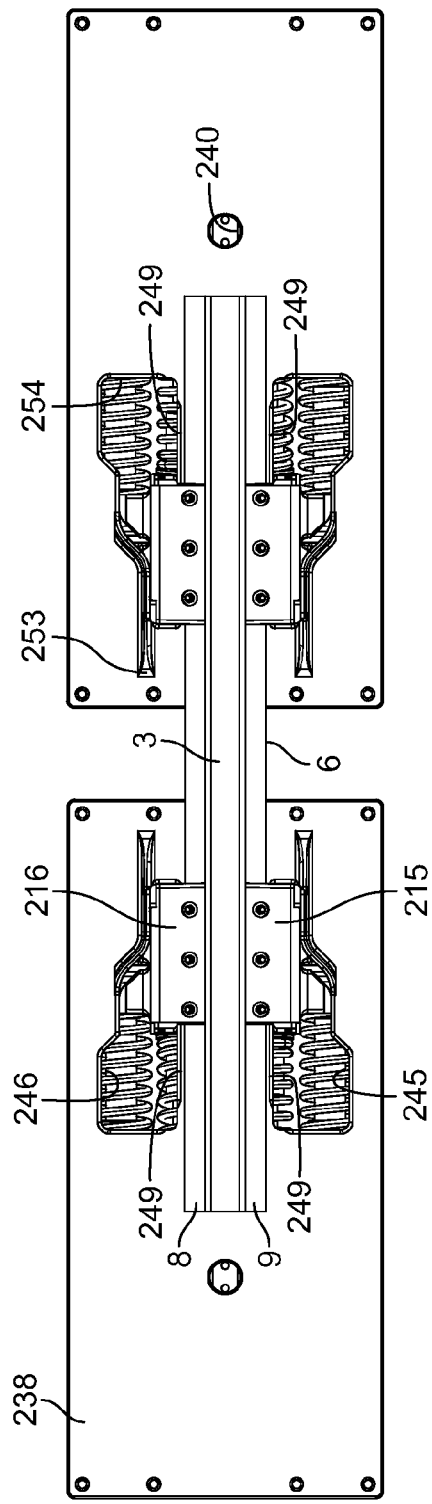
FIG. 32 is a top plan view of a pair of clamping assemblies with a fragmentary section of rail clamped thereto.
Figure 33:
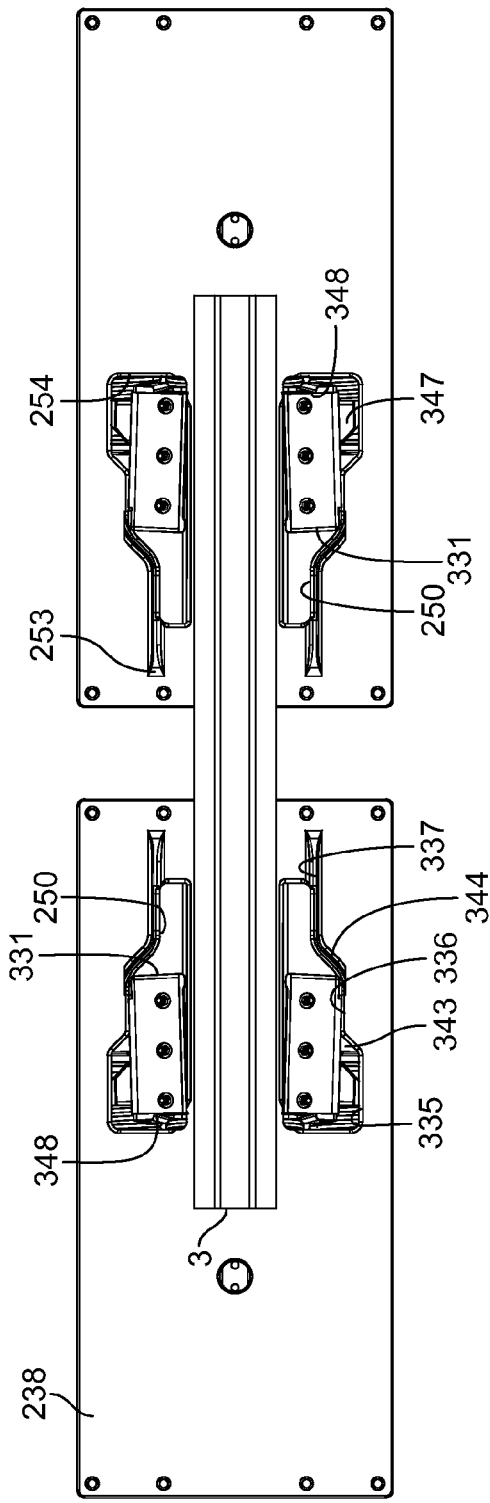
FIG. 33 is a top plan view of a pair of clamping assemblies with the clamp hooks in an unclamped alignment.

Referring to FIGS. 32 and 33, each clamp slot 245 and 246 includes a wide portion 335 proximate the respective outer end wall 254, an intermediate portion 336 and a narrow portion 337 proximate the respective inner end wall 253. First and second inwardly sloping transition sections 343 and 344 extend between the wide portion 335 and the intermediate portion 336 and the intermediate portion 336 and the narrow portion 337 respectively of each clamp slot 245 and 246. An edge follower 347 is mounted on the rear face 323 of each hook 215 and 216 proximate an outer end 348 thereof.

The narrow portion 337 of each clamp slot 245 and 246 is just slightly wider than the width of the hook shank 312 so that when the hooks 215 and 216 are drawn to the clamping position, the hook shanks 312 are maintained in a perpendicular or vertical alignment relative to the base plate 238 and the clamping flanges 313 project over the receiving section 242 and over the feet 8 and 9 of the rail base flange 6. A clamping wall 349 is formed along the outer edge 250 of each slot 245 and 246 along the narrow portion 337 and the second transition section 344 to help urge or hold the clamp hooks 215 and 216 in the clamping position. When the hooks 215 and 216 are drawn outward toward the release end walls 254 of the slots 245 and 246 so that the hook 215 and 216 is positioned in the intermediate and then wide portions 336 and 335 of the slots 245 and 246, the hooks 215 and 216 and the associated clamping flange 313 are free to pivot away from the receiving section 242 to an open alignment.

As best seen in FIG. 31, because the actuators 275 and 276 are connected to and supported outward from the rear faces 332 of longitudinally aligned pairs of hooks 215 and 216, the weight of the actuators 275 and 276 and the associated springs 293 and 294 and their spacing behind or outward from the rear face 323 of the hooks 215 and 216 causes the hooks 215 and 216 to pivot to an open alignment as they are moved into the intermediate and wide portions 336 and 335 of the slots 245 and 246. Stated differently, the center of mass of each hook 215 and 216 and the actuators 275 and 276 with attached springs 293 and 294, is spaced outward from the axis of the respective hook hub 311 causing the hooks 215 and 216 to pivot outward about the guide rods 257 and 258 to which the hooks 215 and 216 are attached as the hooks 215 and 216 are advanced into the intermediate and wide portions 336 and 335 of the slots. It is noted that the wide portion 335 of each slot 245 and 246 is wider than the distance from an inner face of the hook shank 312 and an outer edge of the edge follower 347 such that when the edge follower 347 is advanced into the wide portion 335 of the respective slot 245 and 246, the hooks 215 and 216 can then pivot outward.

When the hooks 215 and 216 are in the open position discussed above, an inner edge 331 of the hook 215 and 216 is positioned in the intermediate portion 336 of the respective slot 245 and 246 and the edge follower 347 is in the wide portion 335 of the slots 245 and 246. As each hook 215 and 216 is driven toward the clamping end wall 253, the leading edge 331 of the hooks 215 and 216 engage the portion of the clamp plate 238 forming the inner or second transitions section 344 of the slots 245 and 246 causing the hooks 215 and 216 to pivot inward as the hooks 215 and 216 are driven further toward the clamping end wall 253 of each slot 245 and 246. As the hooks 215 and 216 pivot inward, the edge follower 347 on each hook shank 312 is pivoted upward into alignment with the intermediate portion 336 of each corresponding clamp slot 245 and 246. As the hook leading edge 331 is advanced into the narrow portion 337 of each slot 245 and 246, the edge follower 347 extends adjacent the portion of the base plate 238 forming the intermediate portion 336 of the slots 245 and 246 to urge the trailing end 348 of the hooks 215 and 216 toward the inner edge 249 of each slot 245 and 246. By holding the trailing end 348 of each hook 215 and 216 toward the inner edge 249 of slots 245 and 246, the edge follower 347 on each hook 215 and 216 helps ensure that the clamping flange 313 of each hook 215 and 216 engage and clamps against the respective foot 8 or 9 of the rail base flange 6 along the entire length of the clamping flanges 313.

Referring to FIG. 35, it is seen that as each hook 215 and 216 is urged from the wide portion 335 of each slot 245 and 246 toward the clamping end wall 253 thereof, an upper surface of the hook hub 311 engages the downwardly sloping surface of the associated wedge 271 and 272, forcing the hooks 215 and 216, including the associated clamping flange 313 downward as the hooks 215 and 216 are drawn further inward toward the clamping end wall 253 of each slot 245 and 246. The hooks 215 and 216 are drawn downward until an inner surface of each clamping flange 313 engages the upper surface of one of the feet 8 or 9 of a rail 3 positioned on the rail receiving section 242 of the base plate 238.

As seen in FIGS. 35 and 37, the wedges 271 and 272 associated with each pair of longitudinally aligned clamp assemblies 205 slope downward toward each other. Once a rail 3 is clamped in place by the pairs of longitudinally adjacent hooks 215 and 216, the rail is restrained from sliding longitudinally in either direction by the oppositely acting pairs of wedges 271 and 272. For purposes of discussing the action of a pair of clamp assemblies 205 and with reference to FIG. 35, the left side of the drawing will be considered to be extending to the rear of a train and the right side of the drawing will be considered extending toward the front of the train. If the rail 3 is urged to the right or front of the train, the hooks 215 and 216 on the left or rear clamping assembly 205 will be drawn to the right or forward against the downwardly sloping left side wedges 271 and 272 further increasing the downward clamping action of hook clamping flanges 313 on the rail foot 8 and further resisting forward movement of the rail 3 relative to the clamping assembly 30. If the rail 3 is urged to the left or rear of the train, the hooks 215 and 216 on the right or front clamping assembly 205 will be drawn to the left or rearward against the downwardly sloping right side wedges 271 and 272 further increasing the downward clamping action of hook clamping flanges 313 on the rail foot 8 and further resisting rearward movement of the rail 3 relative to the clamping assembly 205. Bearing surfaces of the hooks 215 and 216 preferably are formed from brass or other material that facilitates the release of the hook 215 and 216 from clamping engagement with the associated wedges 271 and 272. For example, if the shear force between the clamping flange 313, the rail foot 8 and the clamp plate 238 exceeds a certain value, the rail will slide relative to the brass bearing surfaces which reduces the likelihood of a catastrophic failure of the hooks 215 and 216.

It is to be understood that compression or tension springs could be used to bias the clamp hooks into or out of clamping engagement with a rail supported on the rail base such that springs could function as either clamping means or release means acting on the clamp hooks. Similarly actuators of the type disclosed herein can be used as either clamping or release means or both acting on the clamp hooks to advance them into and out of clamping engagement with a rail supported on the rail base. Actuators other than hydraulic actuators, including pneumatic actuators, solenoids or mechanical linkages could be used to move the clamp hooks into and/or out of clamping engagement with a rail supported on the rail base to permit remote engagement and disengagement of the clamp hooks with a rail supported on the clamp base.

As used herein, reference to remote engagement or disengagement of the clamp hooks is intended describe systems that allow an operator to cause the clamping members to clamp onto or release from clamping a rail to the clamp assembly or tie down car without requiring the operator to manually position the clamping member in engagement with or remove the clamping member from engagement with the rail such as by bolting the clamping member in place or manually operating a mechanical clamping assembly for advancing the clamping member into and out of engagement with the rail.

Figure 39:
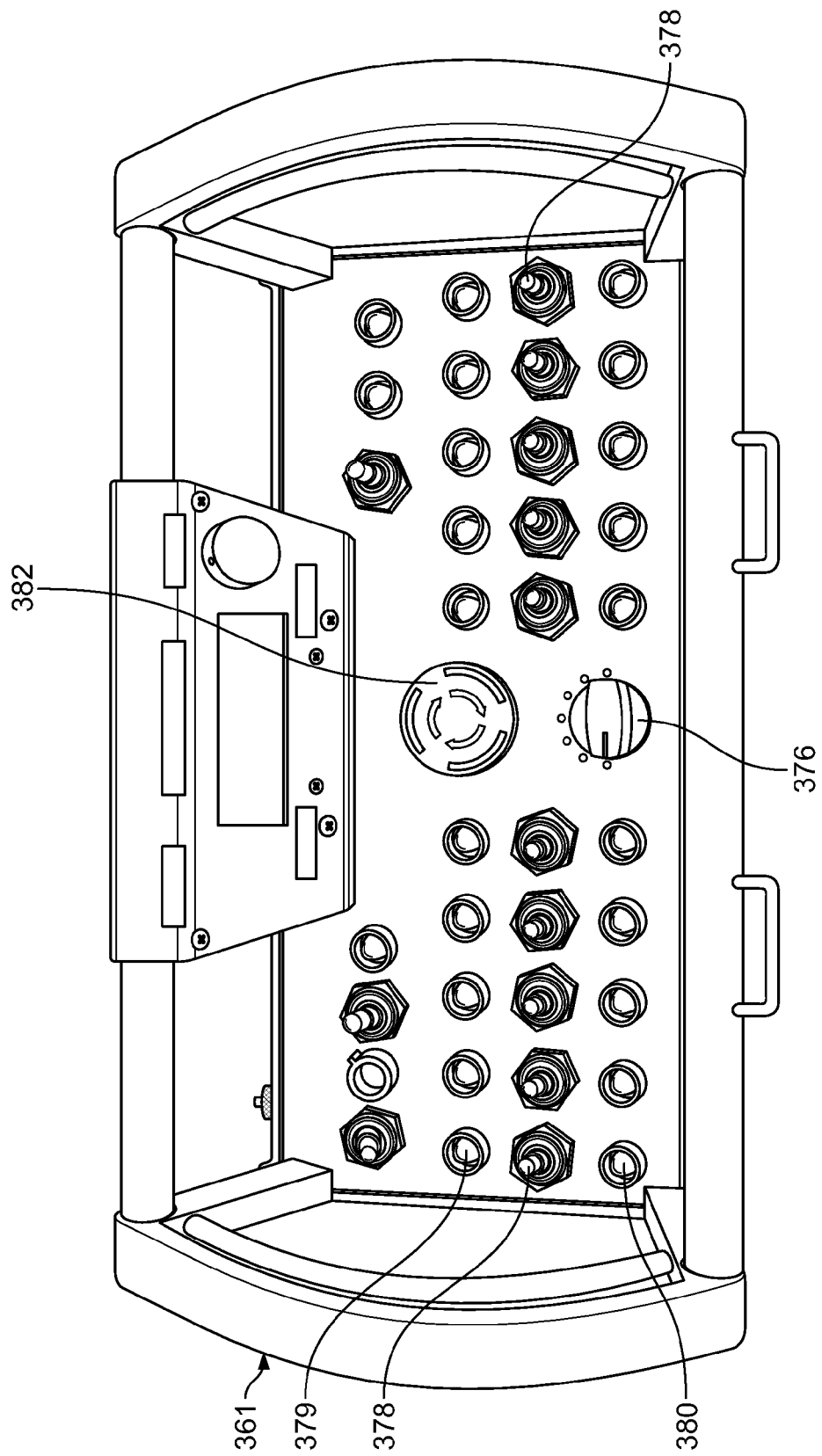
FIG. 39 is a top plan view of a radio controller for the clamping assemblies.
Figure 58:
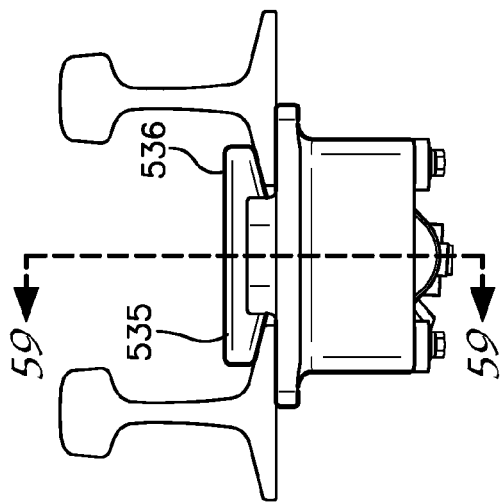
FIG. 58 is a left side elevational view of the rightmost clamping assembly shown in FIG. 57 with a pair of rails shown supported thereon and the T-shaped clamp assembly in the release position.
Figure 60:
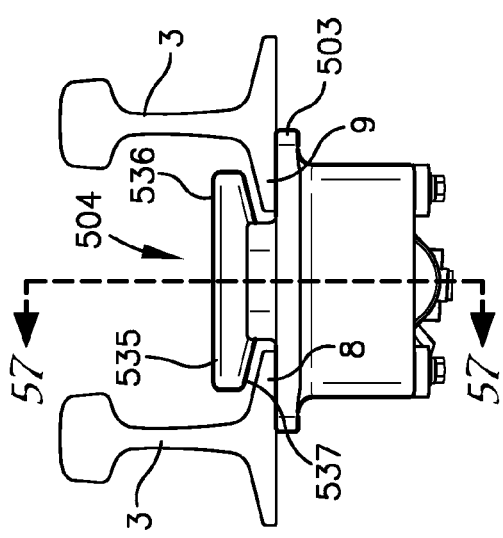
FIG. 60 is a left side elevational view of the rightmost clamping assembly shown in FIG. 59 with a pair of rails shown supported thereon and the T-shaped clamping assembly in the release position.

Referring to FIGS. 22-24, valves 351 for controlling the flow of hydraulic fluid to the actuators 275 and 276 of the clamp assemblies 205 are mounted on the shelf framework 219 of each clamp stand 211 and 212. Controllers 353 for controlling the operation of the valves 351 are mounted in boxes or cabinets 355 supported on opposite sides of the catwalk 226. A hand held radio controller 361, as shown in FIG. 39, communicates with the controllers 353 to control the flow of hydraulic fluid between the double acting hydraulic actuators 275 and 276 and a hydraulic fluid reservoir 363 and through pump 364 which are mounted on a tie down car 201 as shown generally in FIG. 24. A generator 365 and a battery pack 366 are also mounted to the tie-down car 201 for supplying power to the pump 364 and controllers 353. Solar panels 367 mounted on the tie-down car 201 replenish the batteries 365.

The radio controller 361 includes means for selecting the valve assemblies 351 associated with one or more clamp assemblies 205 to cause the clamp assembly 205 to clamp one or more rails 3 to the tie down car 201 or release selected clamp assemblies 205 from clamping engagement with the associated rails 3. The radio controller 361 includes a row selection knob 376 and a clamp assembly toggle switch 378 for each clamp assembly 205 associated with a rail 3 that can be supported on each vertically aligned set of shelves 209a-f and 210a-f respectively. The row selection knob 376 is used to select the horizontally aligned shelves for which the clamp hooks 215 and 216 are to be advanced into or out of clamping engagement with associated rails 3. The clamp assembly toggle switches 378 are used to control the advancement of pairs of clamp hooks 215 and 216 into or out of clamping engagement with the rail 3 threaded therebetween. Indicator lights, 379 and 380 are associated with each toggle switch 378 to provide a visual indication of whether the associated clamp assembly is in a clamping or release position respectively. A lock down button 382 is provided to allow an operator to simultaneously advance all of the clamp assemblies 205 into clamping engagement with a rail 3 associated therewith. The radio controller 361 may also provide additional controls to allow the user to turn the hydraulic pump 364 on or off, to turn a generator on or off and to turn the radio controller 361 on or off.

Rails 3 may be threaded into the tie-down car 13 or the rail support cars 15 from either end depending on how the cars are oriented on the train 1 relative to the tunnel cars 11 or 12. Tunnel cars 11 or 12 are used to facilitate loading and unloading rails 3 onto the train 1.

FIGS. 40-73 disclose a plurality of alternative embodiments of a clamping assembly in which the clamping members are not rotatably mounted on shafts and therefore do not rotate about the shafts as the clamping members are advanced between clamping and non-clamping engagement with a rail. By removing the pivoting of the clamping members the clamping assemblies can be made narrower and therefore, more clamping assemblies can be used on each shelf and more rails can be secured on each shelf of the rail train.

FIGS. 40-46 show a first embodiment of a non-rotating rail clamp assembly 401. Two of the clamp assemblies 401 oriented in opposite directions, as shown in FIGS. 42 and 43, form a rail clamp 402 for securing a single rail 3 to a rail train such as rail train 1. Each clamp assembly 401 includes a base plate or clamp plate 403 to which the rest of the components are attached, including hook assembly 404. Each base plate 403 in a rail clamp 402 comprising two clamp assemblies 401 may be referred to as a clamp base section or base plate section 405.

The base plate 403 of each clamp assembly 401 includes a longitudinal receiving section 407 on which the base flange 6 of the respective rail 3 rests. Two elongate clamp slots 409 and 410 are formed through the base plate 403 adjacent to and on opposite sides of the receiving section 407. Each clamp slot 409 and 410 is defined by inner and outer edges 411 and 412 relative to a longitudinal axis extending through the receiving section 407 and inner and outer end walls 413 and 414 extending transverse to the longitudinal axis extending through the receiving section 407. The inner end wall 413 may be referred to as a clamping end or clamping end wall and the outer end wall 414 may be referred to as a release end or release end wall.

The bottom of each base plate 403, below the longitudinal receiving section 407, is formed as a wedge 417 with a wedge surface 418 that slopes downward from the outer ends 414 to the inner ends 413 of the adjacent clamp slots 409 and 410. The wedge 417 functions to urge the hook assembly 404 downward and in clamping engagement with a rail 3 supported on the receiving section 407 as the hook assembly 404 is advanced toward the inner end of the base plate 403. An inner stanchion 421 depends from the base plate 403, below wedge 417, just past the inner ends 413 of clamp slots 409 and 410 and an outer stanchion 422 depends from the base plate 403, below wedge 417, just past the outer ends 414 of clamp slots 409 and 410. A pair of support plates or straps 424 are bolted to and extend between the undersides of the inner and outer stanchions 421 and 422. The support straps 424 extend parallel to the wedge surface 418, sloping downward from the inner stanchion 421 to the outer stanchion 422. A downwardly sloping guide slot 426 is thereby formed between the wedge 417 and the support straps 424. It is to be understood that a single plate or strap 424 could be used instead of two as shown.

The hook assembly 404 comprises a base plate or hook base 427 and a pair of inwardly facing hooks 429 and 430 projecting upward on opposite sides thereof. Each hook 429 and 430 includes a shank 432 projecting from the hook base 427 and a clamping flange 433 which is positioned at an upper end of the shank 432. The clamping flange 433 extends perpendicularly inward from the shank 432 and over the hook base 427 in spaced relation thereto.

Upper and lower surfaces of the hook base 427 slope downward toward the inner end of the clamp base 427 at the same slope as wedge surface 418 of wedge 417 and the upper surface of each support strap 424. A sloping gap 435 is thereby formed between the hook base 427 and the clamping flange 433 of each hook 429 and 430. The gap 435 opens inward toward the base plate longitudinal receiving section 407 and is wider at a first end 436 of each hook 429 and 430, extending closest to the inner end of the clamp base 403. The angle of the gap 435 corresponds to the angle or downward slope of the associated wedge 417.

The hook assembly 404 is secured to the clamp assembly 401 such that the hooks 429 and 430 extend through the clamp slots 409 and 410 with the clamping flanges 433 extending in spaced relation over the rail receiving section 407. The clamp slots 409 and 410 are formed wide enough along the inner edges 411 thereof proximate the outer end 414 to permit the clamping flange 433 of hooks 429 and 430 to be inserted through slots 409 and 410 respectively. The hook base 427 of hook assembly 404 extends in or through the guide slot 426 with an upper surface of the hook base 427 abutting the wedge surface 418 and the lower surface of the hook base 427 extending above and in engagement with upper surfaces of the support straps 424. A first or inner actuator mount 439 projects outward from the shank 432 of each hook 429 and 430 for connection of a first end of a linear actuator 441 thereto. Second or outer actuator mounts 443 are formed on and project downward from a bottom of the clamp plate 403 for connection of second ends of the linear actuators 441 thereto.

The linear actuators 441 shown, comprise double acting hydraulic actuators connected between the hook assembly 404 and clamp plate 403. Each actuator 441 is a conventional actuator and includes a cylinder barrel 445 in which a piston (not shown) connected to a piston rod 447 moves back and forth depending on changes in differential pressure of hydraulic fluid acting on opposite sides of the piston. A cap end 448 of each actuator barrel 445 has a clevis 449 mounted thereon for pivotally connecting the actuator 441 to one of the outer actuator mounts 443. Each clevis 449 and outer actuator mount 443 are oriented so that the cap end of the actuator 441 pivots about horizontal axis allowing the actuator 441 to pivot vertically. A distal end of each piston rod 447 has a clevis 450 mounted thereon for pivotally connecting the piston rod 447 to the corresponding inner actuator mount 439 on hook assembly 404. A compression spring 452 is positioned around the piston rod 447 of each actuator 441, between the piston rod clevis 450 and a head end 453 of the cylinder barrel 445. A washer 454 is positioned on the piston rod 447 between the clevis 450 and the spring 452 to form a stop for the end of the spring 452. The compression springs 452 urge the associated piston rods 450 outward and the hook assembly 404 attached thereto toward the clamping end walls 414 of the clamp slots 409 and 410, which may also be referred to as toward the clamping position.

Springs 452 function to advance and hold hooks 429 and 430 in the clamping position when the supply of pressurized hydraulic fluid to actuators 441 is shut-off, such as during transport of the rails 3 on the train 1, which may take days or weeks, or if a hydraulic line supplying hydraulic fluid to either actuator 441 is severed. It is to be understood that different types of actuators other than the hydraulic actuators might be utilized, including pneumatic actuators or solenoids. The actuators shown are linear actuators, but it is foreseen that other types of actuators, mechanisms or linkages may be used for acting on and moving the hooks 429 and 430 remotely.

The actuators 441 are operable to draw the hook assembly 404 and the hooks 429 and 430 mounted thereon, against the biasing force of the springs 452, from a clamping position to an open position, toward the opposite end of the slots 409 and 410 proximate the release end walls 414 thereof. The actuators 441 are also operable to advance or drive the clamp assembly 404 and clamp hooks 429 and 430 to the clamping position.

As the clamp hooks 429 and 430 are advanced to the clamping position toward the inner end of each clamp plate 403 the hook base 427 is urged downward by wedge surface 418 drawing the clamping flanges 433 on each hook 429 and 430 downward toward the receiving section 407 of the clamp base 403 to engage and clamp the base flange of a rail 3 therebetween. With reference to the rail clamp 402 as shown in FIG. 45, if the rail 3 begins to slide to the right, the rail 3 will draw the clamping flange 433 of hooks 429 and 430 of the left clamp assembly 401 to the right such that the wedge 417 urges the hook assembly 404 and clamping flanges 433 further downward to more firmly clamp the rail base flange between the clamping flanges 433 and the receiving section 407 of the left clamp base plate 403. Similarly, if the rail 3 begins to slide to the left, the rail 3 will draw the clamping flange 433 of hooks 429 and 430 of the right clamp assembly 401 to the left such that the wedge 417 urges the hook assembly 404 and clamping flanges 433 further downward to more firmly clamp the rail base flange between the clamping flanges 433 and the receiving section 407 of the right clamp base plate 403.

Pairs of inner and outer rail guides 455 and 456 are formed on an upper surface of each clamp base plate 403 to help guide a rail 3 between the hooks 429 and 430. An inner edge 458 of each outer rail guide 456 extends in generally planar alignment with an inner surface 459 of the shank 432 of the hook 429 or 430 with which the guide 456 is associated. A distal end 460 of the outer rail guides 456 slope inward from a respective side of the clamp base plate 403 toward the straight portion of the inner edge 458 to form a funnel for funneling an end of a rail 3 between the rail guides 456 and between the hooks 429 and 430 when the rail 3 is threaded from the outer end of the clamp base plate 403. The inner rail guides 455 as shown, are shorter than the outer rail guides 456 and generally comprise a triangular structure with an inwardly sloping surface 462 sloping inward from a respective side of the clamp base plate 403 toward the inner end 413 of the respective clamp slot 409 and 410 to form a funnel for funneling an end of a rail 3 between the rail guides 455 and between the hooks 429 and 430 when the rail is threaded from the inner end of the clamp base 403.

Referring to FIGS. 48-53, a modified version 465 of the clamp assembly 401 is shown which is adapted to engage the upper surface of the head 5 of a rail 3 supported on the rail receiving section 407 of the clamp base plate 403. The clamp assemblies 465 are similar in construction as clamp assemblies 401 except that the hooks 429 and 430 are replaced with a box assembly 467 which is taller than a rail 3. In general, the box assembly 467 is formed by lengthening the shanks and interconnecting the clamping flanges of the opposed hooks 429 and 430. The box assembly 467 includes legs 469 and 470 extending upward from the hook base 427 and through clamp slots 409 and 410. An inverted U-shaped cross-member 472 is connected to and extends between the legs 469 and 470. More specifically, depending legs 473 and 474 on cross-member 472 are connected to upstanding legs 469 and 470 by pins 475 extending through overlapping, annular knuckles 476 and 477 formed on the upstanding legs 469 and 470 and depending legs 473 and 474 respectively.

The cross-member 472 further comprises a clamp plate 479 extending between and interconnecting depending legs 473 and 474. An underside or lower surface of clamp plate 479 has a recess 480 formed therein which is shaped to conform to the upper surface of a rail head 5 extending therebelow on rail receiving section 407.

The upstanding legs 469 and 470 and depending legs 473 and 474 are sized tall enough so that clamp plate 479 extends in spaced relation above the rail head 5 in the unclamped or release position and engages the upper surface of the rail head 5 in the clamped position. As shown in FIG. 53, because clamp plate 479 engages the upper surface of the rail head 5 and not the feet 8 or 9, the clamp plate 479 does not obstruct passage of a joint bar 482 between the legs 469 and 470 which can be sized to minimize the likelihood of interfering with a joint bar 482. The U-shaped cross-member 472 may be replaced with alternative cross-members with longer or shorter legs, or no legs to accommodate rails 3 of different heights.

Referring to FIG. 54-60, there is shown a further alternative embodiment of a non-rotating clamp assembly 501 which may be described as a t-clamp assembly and which are adapted to engage the feet 8 and 9 of adjacent rails 3. Each clamp assembly 501 includes a base plate 503 to which the rest of the components are attached, including a t-shaped hook assembly 504 for simultaneously engaging the feet 8 and 9 of two adjacent rails 3 supported on adjacent clamp assemblies 501. Each base plate 503 may be referred to as a clamp base section or base plate section 505.

The base plate 503 of each clamp assembly 501 includes a portion 507 of a longitudinal rail receiving section 508 extending on opposite sides thereof. The portions 507 of the longitudinal rail receiving sections 508 of two adjacent clamp assemblies 501 form the rail receiving section 508 on which the base flange 6 of a rail 3 rests. A single, elongate clamp slot 510 is formed through the base plate 503 generally along a central longitudinal axis thereof and toward an inner end thereof. The clamp slot 510 is defined by opposed, parallel, side edges 512 extending on opposite sides of the central longitudinal axis and inner and outer end walls 513 and 514 extending transverse to the central longitudinal axis. The inner end wall 513 may be referred to as a clamping end or clamping end wall and the outer end wall 514 may be referred to as a release end or release end wall.

The bottom of each base plate 503, below each portion 507 of the rail receiving section 508 is formed as a wedge 517 and 518 with a wedge surface 519 that slopes downward from the outer ends 514 to the inner ends 513 of the adjacent clamp slot 510. The wedges 517 and 518 function to urge the t-shaped hook assembly 504 downward and into clamping engagement with the feet 8 and 9 of adjacent rails 3 supported on the receiving sections 507 on either side of the hook assembly 504 as the hook assembly 504 is advanced toward the inner end of the base plate 503. An inner stanchion 521 depends from the base plate 503, below wedges 517 and 518, just past the inner end wall 513 of clamp slot 510 and a pair of outer stanchions 522 depend from the base plate 503, below wedges 517 and 518, just past the outer end wall 514 of clamp slot 510.

A pair of support plates or straps 524 are bolted to and extend between the undersides of the inner and outer stanchions 521 and 522 below the wedges 517 and 518. The support straps 524 extend parallel to the wedge surface 519 of wedges 517 and 518, sloping downward from the inner stanchions 521 to the outer stanchion 522. Downwardly sloping guide slots 526 and 527 are thereby formed between the wedges 517 and 518 and the respective support straps 524.

The hook assembly 504 comprises a central spine 528 with a pair of guide flanges 530 and 531 projecting from opposite sides thereof and into respective guide slots 526 and 527. A longitudinally oriented hook shank 532 projects upward from the central spine 528 through the clamp slot 510. A clamp plate or cross-member 533 is hingedly connected to the hook shank 532 at an upper end thereof by hinge 534. The clamp plate 533 comprises a pair of clamping flanges 535 and 536 projecting outward from opposite side of the hook shank 523 and in spaced relation over the respective portion 507 of the adjacent rail receiving sections 508. A lower surface 537 of each clamping flange 535 and 536 slopes at an acute angle upward and outward from the shank 532 toward the adjacent rail receiving section 508. The slope of the lower surface 537 generally matches the downward and outward slope of the rail foot 8 or 9 of a rail 3 positioned on an adjacent rail receiving section 508.

Upper and lower surfaces of the guide flanges 530 and 531 slope downward toward the inner end of the clamp base 503 at the same slope as wedge surface 519 of wedges 517 and 518 and the upper surface of the support straps 524. A sloping gap is thereby formed between each guide flange 530 and 531 and vertically aligned clamping flange 535 and 536 respectively. The gaps open outwards toward the rail receiving sections 508 and are wider at a first end 542 of the hook assembly 504, extending closest to the inner end of the clamp base 503. The angle of the gaps correspond to the angle or downward slope of the associated wedges 517 and 518.

As indicated, the guide flanges 539 and 540 extend into respective guide slots 526 and 527 with an upper surface of each guide flange 539 and 540 abutting the wedge surface 519 and a lower surface of each guide flange extending above and in engagement with upper an upper surface of the respective support strap 524 extending therebelow. A first or inner actuator mount 544 projects rearward from the central spine 528 of hook assembly 504 for connection of a first end of a linear actuator 545 thereto. A second or outer actuator mount 546 is formed on and projects downward from a bottom of the clamp base plate 503 for connection of a second end of the linear actuator 545 thereto.

The linear actuator 545 shown, comprises a double acting hydraulic actuator connected between the hook assembly 504 and clamp plate 503. Actuator 545 is a conventional actuator and includes a cylinder barrel 547 in which a piston (not shown) connected to a piston rod 548 moves back and forth depending on changes in differential pressure of hydraulic fluid acting on opposite sides of the piston. A cap end 548 of each actuator barrel 547 has a clevis 550 mounted thereon for pivotally connecting the cap end of the actuator 545 to the outer actuator mount 546. The clevis 550 and outer actuator mount 546 are oriented so that the cap end of the actuator 545 pivots about a horizontal axis allowing the actuator 545 to pivot vertically.

A distal end of piston rod 548 has a clevis 551 mounted thereon for pivotally connecting the piston rod 548 to the inner actuator mount 544 on hook assembly 504. The clevis 550 and inner actuator mount 544 are also oriented so that the rod end of the actuator 545 pivots about a horizontal axis allowing the hook assembly 504 to pivot vertically relative to the actuator 545. A compression spring 552 is positioned around the piston rod 548 of actuator 545, between the piston rod clevis 551 and a head end 553 of the actuator barrel 547. A washer 554 is positioned on the piston rod 548 between the clevis 551 and the spring 552 to form a stop for the end of the spring 552. The compression spring 552 urge the piston rod 548 outward and the hook assembly 504 attached thereto toward the outer end wall 514 of clamp slot 510, which may also be referred to as toward the clamping position.

Spring 552 functions to advance and hold clamping flanges 535 and 536 in the clamping position when the supply of pressurized hydraulic fluid to actuator 545 is shut-off, such as during transport of the rails 3 on the train 1, which may take days or weeks, or if a hydraulic line supplying hydraulic fluid to either actuator 545 is severed. It is to be understood that different types of actuators other than the hydraulic actuators might be utilized, including pneumatic actuators or solenoids. The actuators shown are linear actuators, but it is foreseen that other types of actuators, mechanisms or linkages may be used for acting on and moving the hook assembly 504 remotely.

The actuator 545 is operable to draw the hook assembly 504 and the clamping flanges 535 and 536 mounted thereon, against the biasing force of the spring 552, from a clamping position to an open position, toward the opposite end of the slot 510 proximate the outer end wall 514 thereof. The actuators 545 are also operable to advance or drive the clamp assembly 504 and clamping flanges 535 and 536 to the clamping position.

As the clamping flanges 535 and 536 are advanced to the clamping position toward the inner end of each clamp plate 503 the guide flanges 530 and 531 of the hook assembly 504 are urged downward by wedge surfaces 519 drawing the clamping flanges 535 and 536 downward toward the portions 507 of adjacent receiving sections 508 therebelow to engage and clamp the feet 8 and 9 of adjacent rails between the clamping flanges 535 and 536 and the clamp base plate 503. It is noted that two pairs of adjacent clamp assemblies 501 are utilized to clamp a single rail 3 in position. Each adjacent pair of clamp assemblies 501 engages the opposed feet 8 and 9 of the rail 3 positioned therebetween. The hinged connection between the cross member 533 of hook assembly 504 to shank 532 allows the clamping flanges 535 and 536 to pivot laterally to accommodate different sized feet 8 or 9 of adjacent rails 3 engaged by the clamping flanges 535 and 536 of cross member 533.

Figure 59:
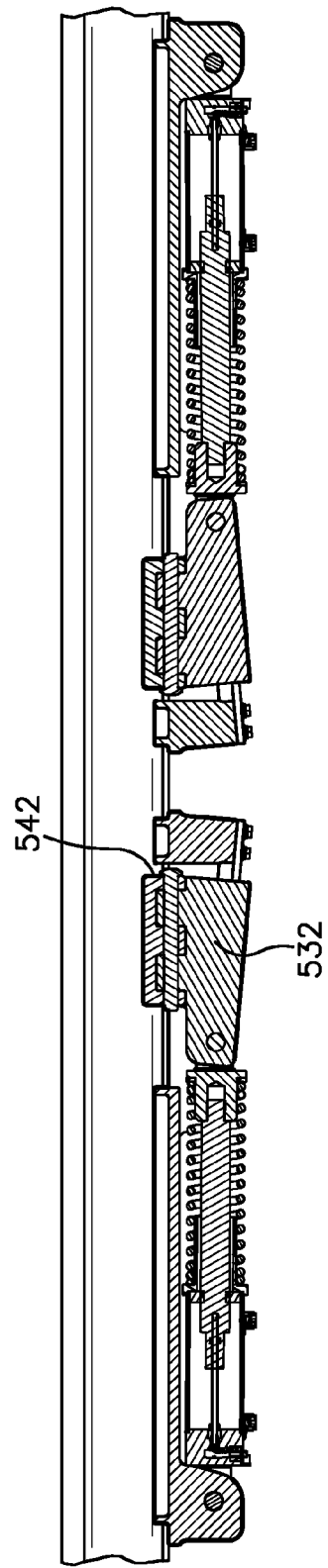
FIG. 59 is a view similar to FIG. 57 showing the T-shaped clamping assembly in a clamping position.

As shown in FIGS. 56 and 59, one of the pairs of clamp assemblies 501, may be oriented in a first direction with the second pair of clamp assemblies 501 longitudinally aligned therewith but oriented in an opposite direction. For example, as shown in FIG. 56, the two pairs of adjacent clamp assemblies 501 are oriented with the clamping ends directed toward each other and the release ends directed away from each other. If the rail 3 secured therebetween begins to slide to the right (as shown in FIG. 59), the rail 3 will draw the clamping flanges 535 and 536 of adjacent pairs of hook assemblies 504 of the left most pair of clamp assemblies 501 to the right such that the wedges 517 and 518 urge the hook assemblies 504 and clamping flanges 535 and 536 further downward to more firmly clamp the rail feet 8 and 9 between the clamping flanges 535 and 536 and the rail receiving section 508. Similarly, if the rail 3 begins to slide to the left, the rail 3 will draw the clamping flanges 535 and 536 of adjacent hook assemblies 504 of the rightmost pair of clamp assemblies 501 to the left such that the wedges 517 and 518 urge the pair of hook assemblies 504 and clamping flanges 535 and 536 further downward to more firmly clamp the rail feet 8 and 9 between the clamping flanges 535 and 536 and the rail receiving section 508.

Alternatively, each laterally adjacent clamp assembly 501 may be oriented in an opposite direction so that only a single clamping flange 535 or 536 engages each rail foot 8 or 9. In such a configuration, only one clamping flange 535 or 536 restrains movement of the rail 3 in each longitudinal direction.

An inner and outer rail guide 555 and 556 are formed on an upper surface of each clamp base plate 503 to help guide a rail 3 between the shanks 532 of adjacent hook assemblies 504. Opposed longitudinal sides or edges 558 of each outer rail guide 556 extend in generally planar alignment with the side edges 512 of the clamp slot 510. A distal end 560 of the outer rail guide 556 tapers to a point proximate the outer end of the clamp base plate 503. The distal ends 560 of outer rail guides 556 on adjacent clamp assemblies 501 form a funnel for funneling an end of a rail 3 between the adjacent rail guides 556 and between the shanks 532 of adjacent clamp assemblies 501 when the rail 3 is threaded from the outer end of the clamp base plates 503. The inner rail guides 555 as shown, are shorter than the outer rail guides 556 and generally comprise a triangular structure with sides that taper toward the inner end of the clamp base plate 503. The inner rail guides 555 on adjacent clamp assemblies 501 form a funnel for funneling an end of a rail 3 between the rail guides 555 and between the shanks 532 of adjacent clamp assemblies 501 when the rail 3 is threaded from the inner end of the clamp base 503.

Referring to FIGS. 61-67, there is shown an alternative version of the T-clamp clamp assembly 565 adapted to engage the upper surface of the heads 5 of adjacent rails 3. The clamp assemblies 565 are similar in construction as t-clamp assemblies 501 except that hook assembly 567 of clamp assembly 565 has a longer or taller shank 569 and a wider cross-member or clamp plate 571 than clamp assembly 501. In addition, the underside 573 of clamp plate 571 is contoured to provide mating surfaces for the heads 5 of two adjacent rails 3 extending on opposite sides of the shank 569.

The shank 569 is sized tall enough so that clamping flanges 575 and 576 projecting on either side of the shank extend in spaced relation above the rail heads 5 in the unclamped or release position and engage the upper surface of the rail heads 5 in the clamped position. The clamping flange 575 and 576 of the embodiment shown are long enough to extend across and cover substantially all of the associated rail head 5. As with clamp assemblies 501, the clamp plate 571 is pivotally or hingedly connected to shank 569 about a longitudinal axis so that the clamping flanges 575 and 576 can pivot to accommodate rails 3 of different heights.

Figure 63:
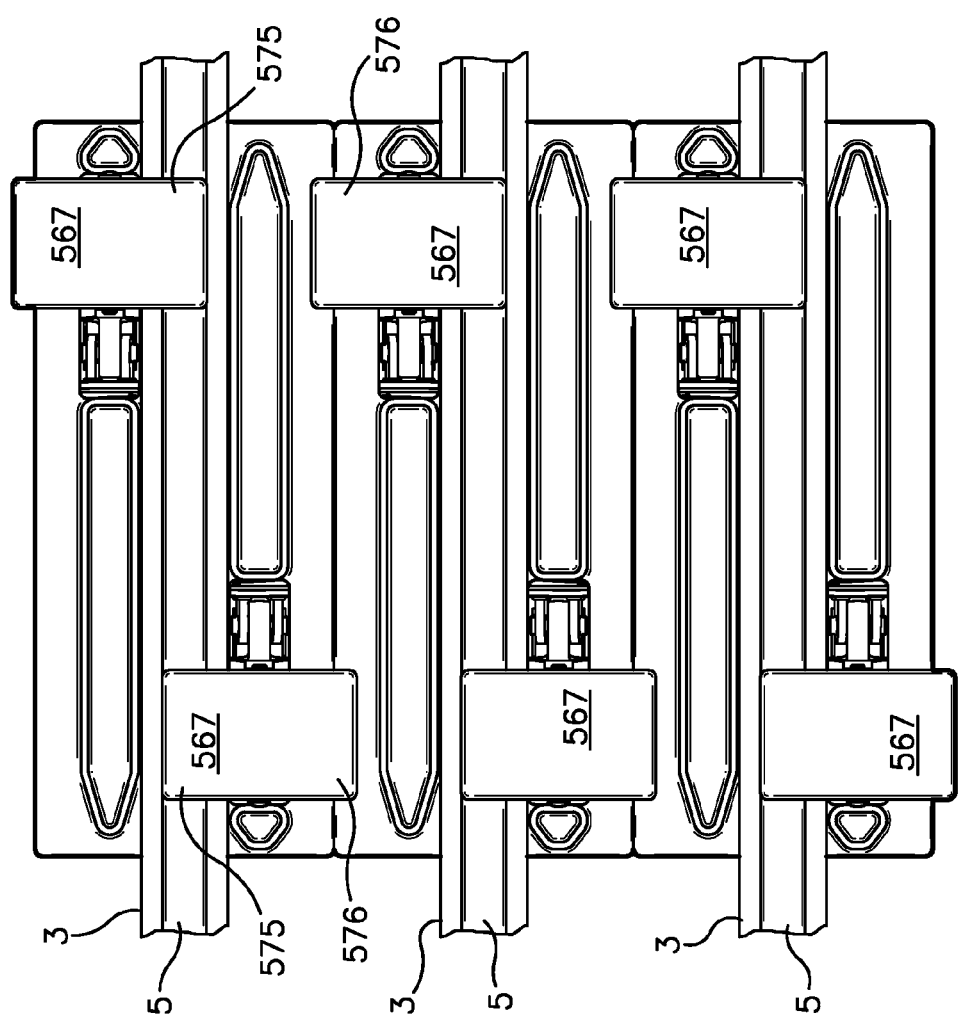
FIG. 63 is a top plan view of a plurality of clamping assemblies as shown in FIG. 61 shown engaging a plurality of rails supported thereon.

The clamp assemblies 565 may be oriented as generally shown in FIG. 63 with each laterally adjacent clamp assembly 565 oriented in an opposite longitudinal direction, so that only one clamping flange 575 or 576 restrains movement of the rail 3 in each longitudinal direction.

Figure 65:
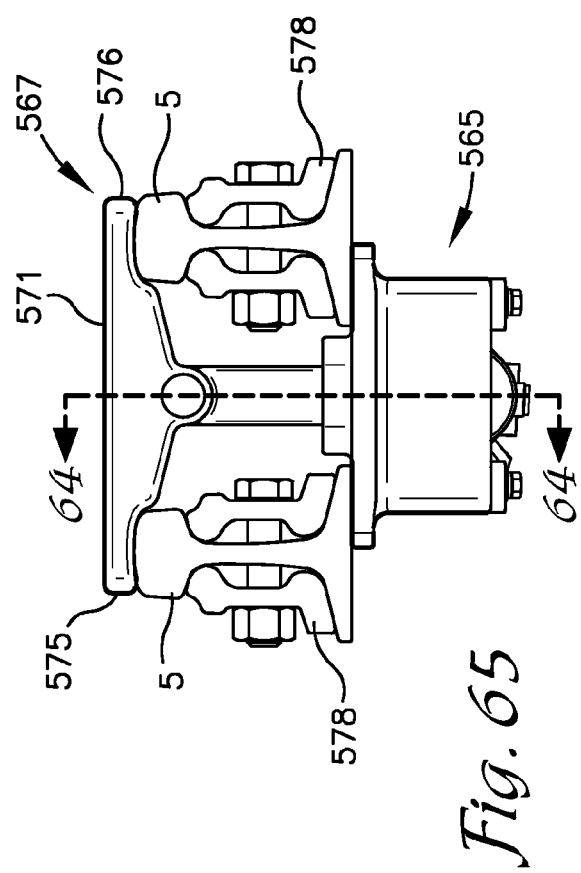
FIG. 65 is a left side elevational view of the rightmost clamping assembly shown in FIG. 64 with a pair of rails shown supported thereon and the T-shaped clamp assembly in the clamping position.
Figure 64:
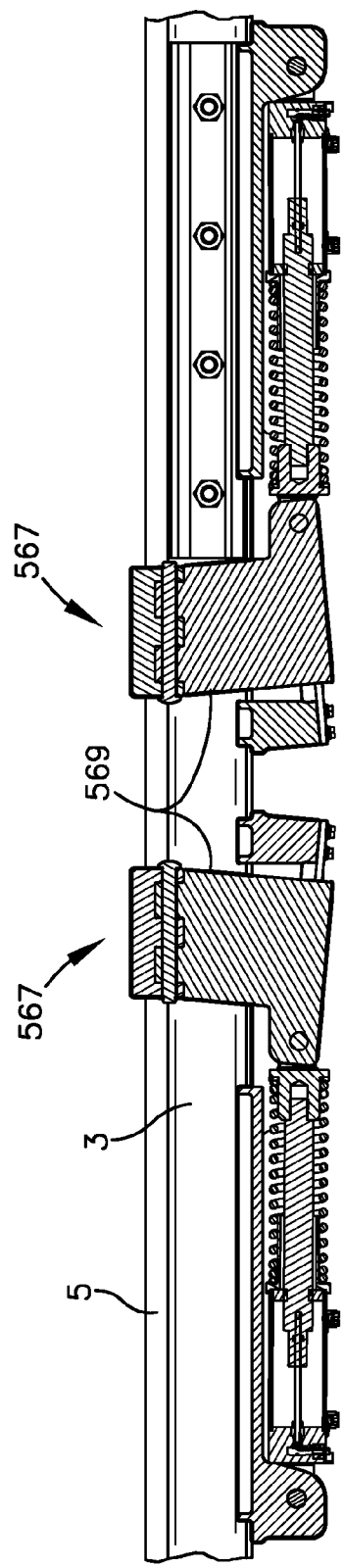
FIG. 64 is a cross-sectional view of the rail clamp taken along line 64-64 of FIG. 65 with the T-shaped clamp assemblies in a clamping position on a rail supported thereon.
Figure 70:
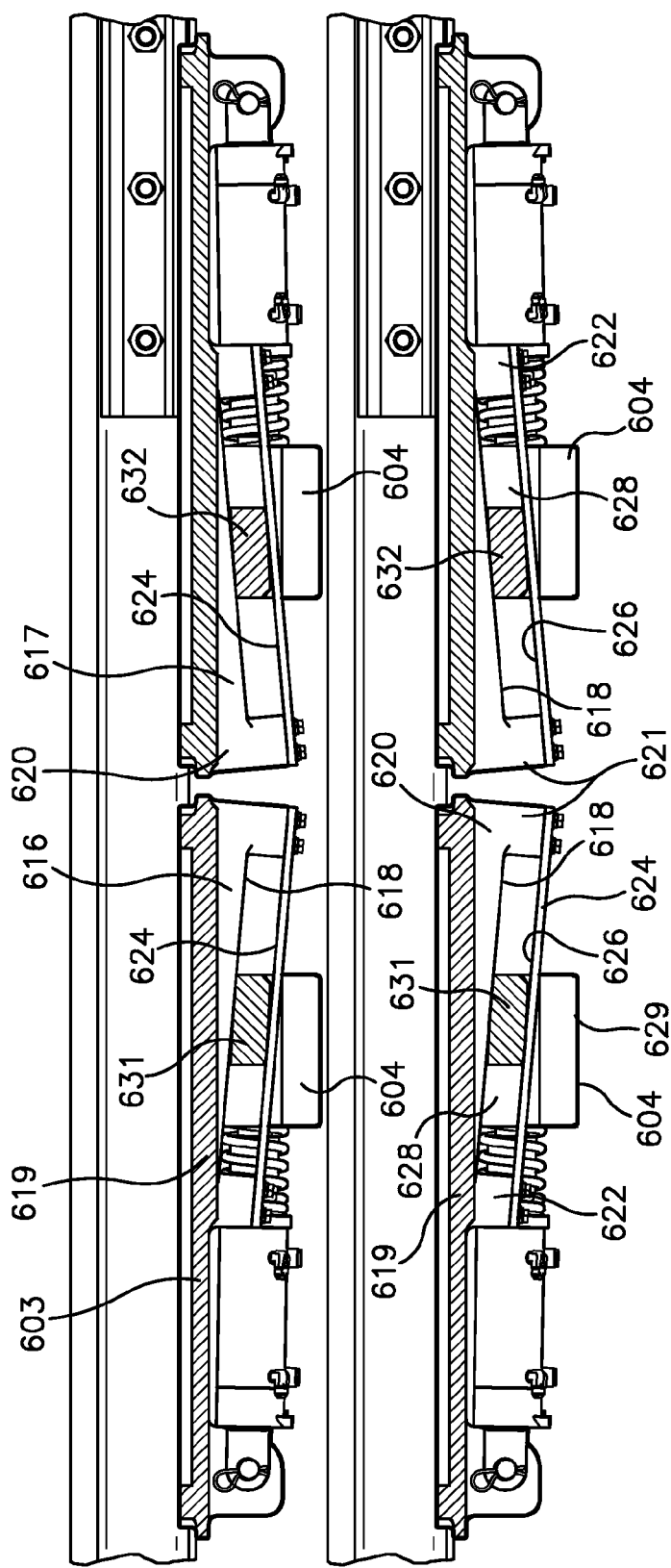
FIG. 70 is a cross-sectional view taken generally along line 70-70 of FIG. 71 of two vertically aligned rail clamps each comprising two clamping assemblies as shown in FIGS. 68 and 69 with the depending clamping members in a release position.
Figure 74:
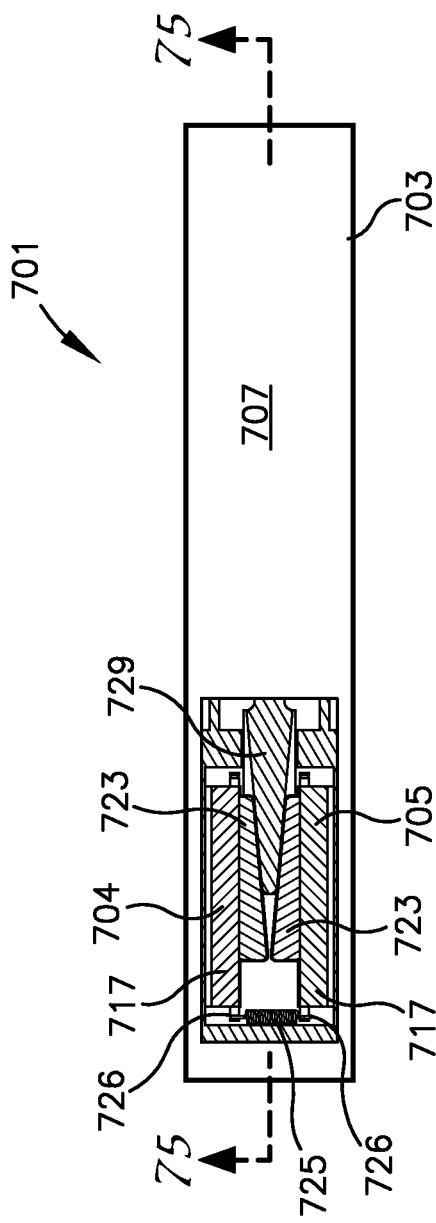
FIG. 74 is a top plan view of an alternative clamping assembly mounted above a rail (not shown) to be clamped thereby with a pair of clamping jaws adapted to clamp onto the side of the head of a rail and with portions broken away to show detail thereof.
Figure 75:
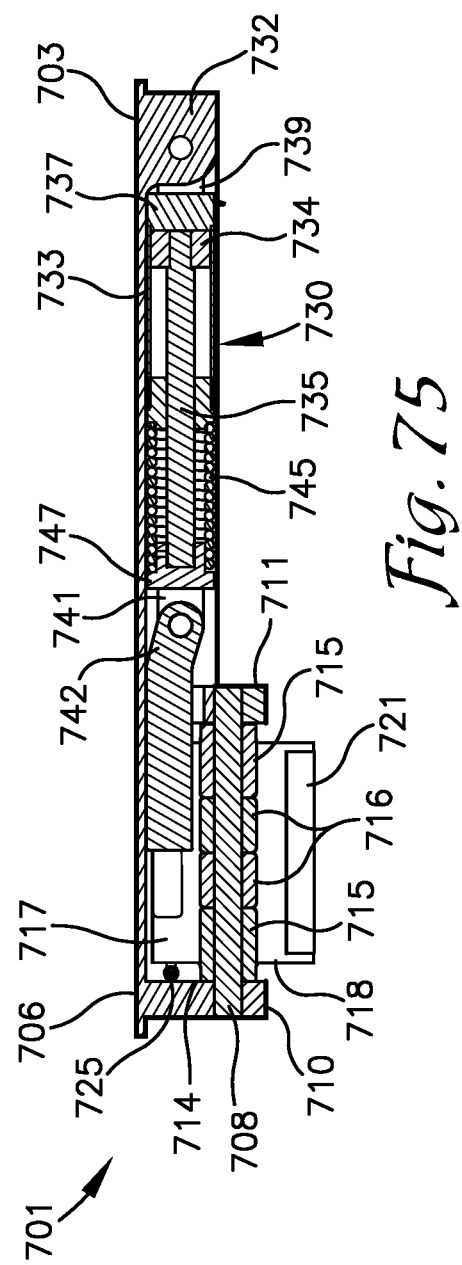
FIG. 75 is a cross-sectional view taken along line 75-75 of FIG. 74.

As seen in FIG. 65, by extending the length of shank 569 so that the clamping flanges 575 and 576 extend above the rail heads 5, the clamping flanges 575 and 576, joint bars 578 connecting two sections of rail 3 together can pass between adjacent clamp assemblies 565. For clamp assemblies 501, the joint bars 578 would hit the clamping flanges 535 and 536 preventing passage of the rail 3 therebetween.

FIGS. 68-73 disclose another embodiment of a clamping assembly 601 which may be referred to as a top mounted clamping assembly. The clamping assembly 601 is mounted on and extends below a first tie down car shelf (not shown) to act on a rail 3 supported on the next lower shelf (not shown). The clamping assembly 601 includes a clamp base or base plate 603 and a clamping member 604 slidably mounted on and depending from the clamp base plate 603. An upper surface 606 of the clamp base plate 603 forms a rail receiving section 607 for supporting a rail 3 below the clamping member 604 of the clamping assembly 601 positioned thereabove. When the clamping member 601 on a first shelf, is advanced into engagement with a rail 3 supported on the upper surface 606 of the clamping assembly 601 on the next lower shelf (as generally shown in FIGS. 71 and 73), the clamping member 604 clamps the rail 3 between it and the rail receiving section 607 of the clamping assembly 601 therebelow.

A pair of wedges 616 and 617, each with a lower wedge surface 618, are formed on or project downward from the bottom of each clamp base plate 603. The wedge surfaces 618 slope downward from approximately the center 619 of the base plate to a clamping end 620 thereof. The wedges 616 and 617 function to urge the clamping member downward and in clamping engagement with a rail 3 supported on the receiving section 607 of the next lowest clamp assembly 601 as the clamping member 604 is advanced toward the clamping end 620 of the base plate 603. A first stanchion 621 depends from the base plate 603, below wedges 616 and 617 at their lower ends, nearest the clamping end 620, and a second stanchion 622 depends from the base plate 603, below wedges 616 and 617 at their highest ends, near the middle of base plate 603. A pair of support plates or straps 624 are bolted to and extend between the undersides of the first and second stanchions 621 and 622. The support straps 624 extend parallel to the wedge surfaces 618, sloping downward from the first stanchion 621 to the second stanchion 622. A downwardly sloping guide slot 626 is thereby formed between wedges 616 and 617 and support straps 624. It is to be understood that the wedges 616 and 617 could be formed as a single wedge and that a single support plate or strap 624 could be used instead of two as shown.

The clamping member 604 comprises a central body 628 with a foot 629 depending therefrom and a pair of guide members or wings 631 and 632 projecting outward from opposite sides of the body 628. The guide members 631 and 632 are supported in the guide slots 626 between the wedges 616 and 617 and the straps 624 with the foot 629 depending between and below the straps 624. Upper and lower surfaces of the guide members 631 and 632 slope downward toward the clamping end of the clamp base 603 at the same slope as wedge surfaces 618 and the upper surface of each support strap 624. A lower surface 634 of the clamping member foot 629 extends generally parallel to upper surface 606 of the base plate 603 and is concave along a longitudinal axis to generally conform to the shape of the upper surface of a rail head 5. A longitudinal spline or fin 636 projects upward from the clamping member body 628 and into a longitudinal slot 637 formed between wedges 616 and 617 and extending through the base plate 603 between the wedges 616 and 617.

A first actuator mount 639 projects outward from each guide member or wing 631 and 632, past guide slots 626, for connection of a first end of a linear actuator 641 thereto. Second actuator mounts 643 are formed on and project downward from a bottom of the clamp plate 603, past the higher ends of wedges 616 and 617, for connection of second ends of the linear actuators 641 thereto.

The linear actuators 641 shown, comprise double acting hydraulic actuators connected between the clamping member 604 and clamp plate 603. Each actuator 641 is a conventional actuator and includes a cylinder barrel 645 in which a piston (not shown) connected to a piston rod 647 moves back and forth depending on changes in differential pressure of hydraulic fluid acting on opposite sides of the piston. A cap end 648 of each actuator barrel 645 has a clevis 649 mounted thereon for pivotally connecting the actuator 641 to one of the second actuator mounts 643. Each clevis 649 and second actuator mount 643 are oriented so that the cap end 648 of the actuator 641 pivots about a horizontal axis allowing the actuator 641 to pivot vertically. A distal end of each piston rod 647 has a clevis 650 mounted thereon for pivotally connecting the piston rod 647 to the corresponding first actuator mount 639 on clamping member 604.

A compression spring 652 is positioned around the piston rod 647 of each actuator 641, between the piston rod clevis 650 and a head end 653 of the cylinder barrel 645. A washer 654 is positioned on the piston rod 647 between the clevis 650 and the spring 652 to form a stop for the end of the spring 652. The compression springs 652 urge the associated piston rods 650 outward and the clamping member 604 attached thereto toward the clamping end of the base plate 603, which may also be referred to as toward the clamping position.

Springs 652 function to advance and hold clamping member 604 and clamp foot 629 in the clamping position when the supply of pressurized hydraulic fluid to actuators 641 is shut-off, such as during transport of the rails 3 on the train 1, which may take days or weeks, or if a hydraulic line supplying hydraulic fluid to either actuator 641 is severed. It is to be understood that different types of actuators other than the hydraulic actuators might be utilized, including pneumatic actuators or solenoids. The actuators shown are linear actuators, but it is foreseen that other types of actuators, mechanisms or linkages may be used for acting on and moving the clamping member 604 remotely.

The actuators 641 are operable to draw the clamping member 604 and clamp foot 629, against the biasing force of the springs 652, from a clamping position to an open position, toward the opposite end of the base plate 603 to which it is attached. The actuators 641 are also operable to advance or drive the clamp member 604 and clamp foot 629 to the clamping position.

As the clamp foot 629 is advanced to the clamping position toward the clamp end of the clamp plate 603, the guide members 631 and 632 of the clamping member 604 are urged downward by the wedge surface 618 of wedges 616 and 617, driving or pushing the clamp foot 629 downward toward the receiving section 607 of the clamp assembly 601 positioned therebelow, to engage and clamp a rail 3 therebetween. Because the clamp members 604 engage the rail head 5 from above, the clamp members 604 do not obstruct or interfere with passage of joint bars 655 past the clamping members 604.

With reference to the rail clamping assemblies 601 as shown in FIG. 72, if the rail 3 begins to slide to the right, the rail 3 will draw the clamping member 604 and clamp foot 629 of the left clamp assembly 601 to the right such that the wedges 616 and 617 urge the clamping member 604 and clamp foot 629 further downward to more firmly clamp the rail 3 between the clamp foot 629 and the receiving section 607 of the clamp base plate 603 positioned therebelow. Similarly, if the rail 3 begins to slide to the left, the rail 3 will draw the clamping member 604 and clamp foot 629 of the right clamp assembly 601 to the left such that the wedges 616 and 617 urge the clamp foot 629 further downward to more firmly clamp the rail 3 between the clamp foot 629 and the receiving section 607 of the clamp base plate 603 positioned therebelow.

Two rail guides 656 are formed on an upper surface 606 of each clamp base plate 603 to help guide a rail 3 onto the rail receiving section 607 and in position below a clamp foot 629 of the clamp assembly 601 positioned thereabove. The rail guides 656 generally comprise an upstanding wall or ridge 657 extending in parallel relation on opposite sides of the rail receiving section 607 with outwardly flared ends 659 to form a funnel for funneling an end of a rail 3 between the rail guides 656 as it is loaded onto the rail train 1.

FIGS. 74-77 disclose a further alternative embodiment of a clamping assembly 701 adapted to clamp onto the head 5 of a rail 3 supported on a shelf or other support structure of a rail tie down car 13 or the like. Clamping assembly 701 may be referred to as a top mounted side-head clamping assembly. The clamping assembly 701 is mounted on and extends below a tie down car shelf to act on a rail 3 supported on the next lower shelf. The clamping assembly 701 includes a clamp base or base plate 703 and a pair of clamping members or jaws 704 and 705 mounted to and depending from the clamp base plate 703. The clamping assembly 701 is supported on a shelf such that an upper surface 706 of the clamp base plate 703 may form a rail receiving section 707 for supporting a rail 3 thereon and below the clamping jaws 704 and 705 of the clamping assembly 701 positioned thereabove. Two or more clamping assemblies 701 may be used to secure a rail 3 in place on a rail train 1.

The clamping jaws 704 and 705 are each pivotally mounted on a shaft 708 supported on inner and outer stanchions 710 and 711 projecting downward from the clamp base plate 703. Shaft 708 extends in generally parallel relationship relative to the upper surface 706 of the clamp base 703. Each clamping jaw 704 and 705 includes a hub 714 formed as a pair of knuckles 715 and 716 formed across a center of the jaws 704 and 705 and which are secured around the shaft 708. Upper and lower legs 717 and 718 project upward from and depend from the knuckles 715 and 716 generally tangentially thereto.

The lower legs 718 have a rail head gripping surface or strip 721 formed on or mounted on an inner surface thereof. A wedge 723 is formed on or mounted on an inner surface of each upper leg 717 of the clamping jaws 704 and 705. The wedges 723 on upper legs 717 of clamping jaws 704 and 705 are generally horizontally aligned below the clamp base plate 703 with the wedges 723 being angled inward toward a first end or clamping end 724 of the clamp base plate 703 and toward each other. A return spring 725 which may comprise a tension spring or coil spring is connected between posts 726 extending from the ends of the upper leg 717 of each clamping jaw 704 and 705. The return spring 725 normally draws the upper legs 717 toward each other advancing the lower legs 718 and associated gripping surfaces 721 to a disengaged position.

A wedge shaped driver or piston head 729 is mounted on the end of a linear actuator 730 and is operable to engage the wedges 723 on respective upper legs 717 of clamping jaws 704 and 705 to urge the upper legs 717 outward against the biasing force of the return spring 725 as the wedge shaped piston head 729 is advanced toward the clamping end of the clamp base plate 703. Outward pivoting of the upper legs 717 causes the lower legs 718 and the associated gripping surfaces 721 to pivot towards each other, clamping against any structure, such as the head 5 of a rail 3, positioned therebetween. Upon withdrawal of the wedge shaped piston head 729 from between the wedges 723, by retraction of the linear actuator 730, return spring 725 pulls the upper legs 717 toward one another which in turn pivots the lower legs 718 outward, away from the item such as a rail head 5 clamped therebetween.

Each linear actuator 730 may comprise a double acting hydraulic actuator connected between the wedge shaped piston head or driver 729 and an actuator mount 732 projecting downward from the clamp base plate 703. The actuator 730 shown includes a cylinder barrel 733 in which a piston 734 connected to a piston rod 735 moves back and forth depending on changes in differential pressure of hydraulic fluid acting on opposite sides of the piston. A cap end 737 of each actuator barrel 733 is connected to a clevis 739 mounted thereon for pivotally connecting the cap end 737 of the actuator 730 to the actuator mount 732. The clevis 739 and actuator mount 732 are oriented so that the cap end 737 of the actuator 730 pivots about a horizontal axis allowing the actuator 730 to pivot vertically. A clevis 741 on the distal end of piston rod 735 is pivotally mounted to an actuator mount 742 on wedge shaped piston head or clamping wedge 729. The clevis 741 and actuator mount 742 are also oriented so that the rod end of the actuator 730 pivots about a horizontal axis.

A compression spring 745 is positioned around the piston rod 735 of actuator 730, between the piston rod clevis 741 and a head end 746 of the actuator barrel 733. A stop 747 is formed on the clevis 551 against which the end of the spring 745 abuts. The compression spring 745 urge the piston rod 735 outward and the attached wedge shaped piston head 729 toward the clamping end 724.

Spring 745 functions retain the piston head 729 advanced toward the clamping end 724 thereby holding the clamping jaws 704 and 705 in a clamping position when the supply of pressurized hydraulic fluid to actuator 730 is shut-off, such as during transport of the rails 3 on the train 1, which may take days or weeks, or if a hydraulic line supplying hydraulic fluid to either actuator 730 is severed. It is to be understood that different types of actuators other than the hydraulic actuators might be utilized, including pneumatic actuators or solenoids. The actuators shown are linear actuators, but it is foreseen that other types of actuators, mechanisms or linkages may be used for acting on and moving the piston head 729 and jaws 704 and 705 remotely.

The actuator 730 is operable to draw the piston head 729 against the biasing force of the spring 745, away from the clamping end 724 drawing the wider end of the wedge shaped piston head 729 out from between wedges 723 allowing return spring 725 to pivot jaws 704 and 705 out of clamping engagement with a rail head 5 positioned therebetween or to spread the jaws 704 and 705 wide enough to allow a rail 3 to be threaded therebetween. The actuator 730 is also operable to advance or drive the piston head 729 toward the clamping end 724 so that the wider portion of the wedge shaped head 729 advances between the wedges 723 on upper legs 717 and toward the clamping end 724 pivoting the jaws 704 and 705 to the clamping position.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A clamp assembly for securing a rail comprising:
 a) a clamp base;
 b) a first wedge having a first wedge surface sloping downward relative to said clamp base along a first longitudinal direction and a second wedge having a second wedge surface sloping downward relative to said clamp base along a second longitudinal direction opposite said first longitudinal direction;
 c) a first clamping member having a first rail engaging member and a first wedge engaging surface, wherein advancement of said first wedge engaging surface in said first longitudinal direction across said first wedge surface toward a lower end thereof draws said first rail engaging member downward against a rail positioned between said first rail engaging member and said clamp base to restrain the rail from sliding in said first longitudinal direction; and d) a second clamping member having a second rail engaging member and a second wedge engaging surface, wherein advancement of said second wedge engaging surface in said second longitudinal direction across said second wedge surface toward a lower end thereof draws said second rail engaging member downward against a rail positioned between said second rail engaging member and said clamp base to restrain the rail from sliding in said second longitudinal direction.

2. The clamp assembly as in claim 1 wherein said first and second clamping members are normally urged toward the lower end of said first and second wedge surfaces by a spring.

3. The clamp assembly as in claim 2 further comprising a linear actuator for drawing said first and second clamping members toward an upper end of said first and second wedge surfaces respectively.

4. The clamp assembly as in claim 1 wherein said first clamping member is positioned to be drawn against a head of the rail when said first wedge engaging surface is advanced toward a lower end of said first wedge surface and said second clamping member is positioned to be drawn against the head of the rail when said second wedge engaging surface is advanced toward a lower end of said second wedge surface.

5. The clamp assembly as in claim 1 wherein said first clamping member is positioned to be drawn against a foot of the rail when said first wedge engaging surface is advanced toward a lower end of said first wedge surface and said second clamping member is positioned to be drawn against the foot of the rail when said second wedge engaging surface is advanced toward a lower end of said second wedge surface.

6. A clamp assembly for securing a rail comprising first and second wedges and first and second clamping members and wherein one of the first wedge or the first clamping member is advanceable relative to the other in a first direction to advance the first clamping member into clamping engagement with the rail to restrain the rail from sliding in a first longitudinal direction and wherein one of the second wedge or the second clamping member is advanceable relative to the other in a second direction, opposite the first direction, to restrain the rail from sliding in a second longitudinal direction opposite said first longitudinal direction, the clamp assembly further comprising biasing means acting on the first wedge or the first clamping member and on the second wedge or the second clamping member to normally urge the first wedge or the first clamping member in the first direction and the second wedge or the second clamping member in the second direction.

7. A clamp assembly for securing a rail comprising first and second wedges and first and second clamping members and wherein one of the first wedge or the first clamping member is advanceable relative to the other in a first direction to advance the first clamping member into clamping engagement with the rail to restrain the rail from sliding in a first longitudinal direction and wherein one of the second wedge or the second clamping member is advanceable relative to the other in a second direction, opposite the first direction, to restrain the rail from sliding in a second longitudinal direction opposite said first longitudinal direction, the clamp assembly further comprising a first spring acting on the first wedge or the first clamping member to normally urge the first wedge or the first clamping member in the first direction and a second spring acting on the second wedge or the second clamping member to normally urge the second wedge or the second clamping member in the second direction.

8. A clamp assembly for securing a rail comprising first and second wedges and first and second clamping members and wherein one of the first wedge or the first clamping member is advanceable relative to the other in a first direction to advance the first clamping member into clamping engagement with the rail to restrain the rail from sliding in a first longitudinal direction and wherein one of the second wedge or the second clamping member is advanceable relative to the other in a second direction, opposite the first direction, to restrain the rail from sliding in a second longitudinal direction opposite said first longitudinal direction, wherein said first clamping member comprises a pair of pivotally mounted first clamping members and advancement of said first wedge in said first direction relative to first ends of said first clamping members pivots second ends of said first clamping members into engagement with the rail and wherein said second clamping member comprises a pair of pivotally mounted second clamping members and advancement of said second wedge in said second direction relative to first ends of said second clamping members pivots second ends of said second clamping members into engagement with the rail.

9. The clamp assembly as in claim 6 wherein advancement of the first clamping member into clamping engagement with the rail advances the first clamping member into clamping engagement with the head of the rail and advancement of the second clamping member into clamping engagement with the rail advances the second clamping member into clamping engagement with the head of the rail.

10. A clamp assembly for securing a rail comprising first and second wedges and first and second clamping members and wherein one of the first wedge or the first clamping member is advanceable relative to the other in a first direction to advance the first clamping member into clamping engagement with the rail to restrain the rail from sliding in a first longitudinal direction and wherein one of the second wedge or the second clamping member is advanceable relative to the other in a second direction, opposite the first direction, to restrain the rail from sliding in a second longitudinal direction opposite said first longitudinal direction, the clamp assembly further comprising a rail support on which the rail is supported and wherein said first and second clamping members are positioned above the rail and advanceable downward against the head of the rail for clamping the rail between each of said first and second clamping members and said rail support.

11. The clamp assembly as in claim 6 further comprising at least one first actuator connected to said first and second clamping members and remotely operable for selectively drawing said first and second clamping members out of clamping engagement with the rail.

12. The clamp assembly as in claim 7 further comprising at least one first actuator connected to said first and second clamping members and remotely operable for selectively drawing said first and second clamping embers out of clamping engagement with the rail.

* * * * *